(12) United States Patent
Gee et al.

(10) Patent No.: US 9,580,636 B2
(45) Date of Patent: Feb. 28, 2017

(54) SECONDARY ESTERS, METHODS OF MAKING, AND USES THEREOF

(71) Applicant: Chevron Phillips Chemical Company LP, The Woodlands, TX (US)

(72) Inventors: Jeffery C. Gee, Kingwood, TX (US); Brooke L. Small, Kingwood, TX (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 187 days.

(21) Appl. No.: 14/700,923

(22) Filed: Apr. 30, 2015

(65) Prior Publication Data

US 2016/0319178 A1    Nov. 3, 2016

(51) Int. Cl.
C09K 8/32      (2006.01)
C09K 8/06      (2006.01)
C09K 8/035     (2006.01)

(52) U.S. Cl.
CPC ............. *C09K 8/32* (2013.01); *C09K 8/035* (2013.01); *C09K 8/06* (2013.01)

(58) Field of Classification Search
None
See application file for complete search history.

(56) References Cited

U.S. PATENT DOCUMENTS

| | | | |
|---|---|---|---|
| 4,123,275 A * | 10/1978 | Karino | G03C 8/54 430/215 |
| 4,631,136 A | 12/1986 | Jones, III | |
| 5,106,516 A | 4/1992 | Mueller et al. | |
| 5,190,675 A * | 3/1993 | Gross | C09K 8/64 44/268 |
| 5,232,910 A | 8/1993 | Mueller et al. | |
| 5,252,554 A | 10/1993 | Mueller et al. | |
| 5,318,954 A | 6/1994 | Mueller et al. | |
| 5,403,822 A | 4/1995 | Mueller et al. | |
| 6,100,223 A | 8/2000 | Gee | |
| 6,180,572 B1 | 1/2001 | Mueller et al. | |
| 6,191,076 B1 | 2/2001 | Gee | |
| 6,716,799 B1 | 4/2004 | Mueller et al. | |
| 7,238,647 B2 | 7/2007 | Hayet et al. | |
| 7,259,130 B2 | 8/2007 | Griffith et al. | |
| 7,666,820 B2 * | 2/2010 | Mueller | C09K 8/34 175/65 |
| 9,115,303 B2 | 8/2015 | Miller et al. | |
| 9,115,326 B2 | 8/2015 | Elomari et al. | |
| 9,115,556 B2 | 8/2015 | Miller et al. | |
| 2003/0036484 A1 | 2/2003 | Kirsner et al. | |
| 2006/0073981 A1 | 4/2006 | Gee | |
| 2010/0267592 A1 | 10/2010 | Brazzel | |
| 2010/0308260 A1 * | 12/2010 | Maki | C11D 1/83 252/186.41 |
| 2012/0071368 A1 | 3/2012 | Fefer | |
| 2012/0329682 A1 | 12/2012 | Fefer | |
| 2014/0171346 A1 | 6/2014 | Fefer | |
| 2014/0249062 A1 | 9/2014 | Elomari et al. | |

FOREIGN PATENT DOCUMENTS

| | | |
|---|---|---|
| EP | 0770661 A1 | 5/1997 |
| EP | 1914288 A1 | 4/2008 |
| GB | 2251447 A | 7/1992 |
| WO | 9323491 A1 | 11/1993 |
| WO | 9515364 A1 | 6/1995 |
| WO | 9530818 A1 | 11/1995 |

OTHER PUBLICATIONS

"Group notation revised in periodic table," Feb. 4, 1985, C&EN, pp. 26-27.
McNaught, Alan D., et al., "Compendium of Chemical Terminology," International Union of Pure and Applied Chemistry, Second edition, 1997, Wiley-Blackwell.
Foreign communication from a related counterpart application—International Search Report and Written Opinion, PCT/US2016/029429, Aug. 1, 2016, 10 pages.

* cited by examiner

*Primary Examiner* — John J Figueroa
(74) *Attorney, Agent, or Firm* — Conley Rose, P.C.; Rodney B. Carroll; Lynda Jolly

(57) ABSTRACT

A composition comprising at least 75 mol % $C_6$ to $C_9$ monocarboxylic acid secondary $C_6$ to $C_{12}$ esters, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof.

23 Claims, No Drawings

US 9,580,636 B2

SECONDARY ESTERS, METHODS OF MAKING, AND USES THEREOF

TECHNICAL FIELD

The present disclosure relates to secondary esters compositions and methods of making and using same. More specifically, the present disclosure relates to secondary esters compositions and processes of making same by using olefin derived monocarboxylic acids and monoolefins.

BACKGROUND

Secondary esters can be used for a variety of products, such as base fluids for wellbore treatment fluids, drilling fluids, etc. The use of a particular secondary ester product in a particular application can depend on the type of physical properties displayed by the secondary ester, as well as on the toxicity of the secondary ester, and such properties can be a result of the process used for producing a particular secondary ester, e.g., reactants, ratios of reactants, catalyst, etc. Thus, there is an ongoing need to develop and improve secondary esters compositions and methods for producing these secondary esters.

BRIEF SUMMARY

Disclosed herein is a composition comprising at least 75 mol % $C_6$ to $C_9$ monocarboxylic acid secondary $C_6$ to $C_{12}$ esters, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof.

Also disclosed herein is a process comprising a) contacting i) a carboxylic acid feedstock comprising a $C_6$ to $C_9$ monocarboxylic acid, ii) an olefin feedstock comprising $C_6$ to $C_{12}$ monoolefins, and iii) a solid acid catalyst, b) forming, in the substantial absence of water, a mixture comprising $C_6$ to $C_9$ monocarboxylic acid secondary $C_6$ to $C_{12}$ esters, and c) isolating a composition comprising at least 75 mol % $C_6$ to $C_9$ monocarboxylic acid secondary $C_6$ to $C_{12}$ esters from the mixture, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof.

Further disclosed herein is a wellbore treatment fluid comprising a composition comprising at least 75 mol % $C_6$ to $C_9$ monocarboxylic acid secondary $C_6$ to $C_{12}$ esters, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof.

Further disclosed herein is a process for preparing a wellbore treatment fluid comprising a) contacting i) a carboxylic acid feedstock comprising a $C_6$ to $C_9$ monocarboxylic acid, ii) an olefin feedstock comprising $C_6$ to $C_{12}$ monoolefins, and iii) a solid acid catalyst, to form, in the substantial absence of water, a composition comprising at least 75 mol % $C_6$ to $C_9$ monocarboxylic acid secondary $C_6$ to $C_{12}$ esters, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof, and b) using the composition comprising at least 75 mol % $C_6$ to $C_9$ monocarboxylic acid secondary $C_6$ to $C_{12}$ esters to prepare the wellbore treatment fluid.

DETAILED DESCRIPTION

Disclosed herein are compositions comprising at least 75 mol % $C_6$ to $C_9$ monocarboxylic acid secondary $C_6$ to $C_{12}$ esters. In an embodiment, the $C_6$ to $C_9$ monocarboxylic acid secondary $C_6$ to $C_{12}$ esters can have desirable properties. In an embodiment, a process for producing the composition comprising at least 75 mol % $C_6$ to $C_9$ monocarboxylic acid secondary $C_6$ to $C_{12}$ esters can comprise: (a) contacting i) a carboxylic acid feedstock comprising a $C_6$ to $C_9$ monocarboxylic acid, ii) an olefin feedstock comprising $C_6$ to $C_{12}$ monoolefins, and iii) a solid acid catalyst; (b) forming, in the substantial absence of water, a mixture comprising $C_6$ to $C_9$ monocarboxylic acid secondary $C_6$ to $C_{12}$ esters; and (c) isolating a composition comprising at least 75 mol % $C_6$ to $C_9$ monocarboxylic acid secondary $C_6$ to $C_{12}$ esters.

Disclosed herein are wellbore treatment fluids comprising compositions comprising at least 75 mol % $C_6$ to $C_9$ monocarboxylic acid secondary $C_6$ to $C_{12}$ esters. In an embodiment, the wellbore treatment fluid comprising compositions comprising at least 75 mol % $C_6$ to $C_9$ monocarboxylic acid secondary $C_6$ to $C_{12}$ esters can be a drilling fluid. In some embodiments, the drilling fluid comprising compositions comprising at least 75 mol % $C_6$ to $C_9$ monocarboxylic acid secondary $C_6$ to $C_{12}$ esters can be a water-based drilling fluid or a non-aqueous-based drilling fluid.

In an embodiment, a process for preparing a wellbore treatment fluid can comprise (a) contacting i) a carboxylic acid feedstock comprising a $C_6$ to $C_9$ monocarboxylic acid, ii) an olefin feedstock comprising $C_6$ to $C_{12}$ monoolefins, and iii) a solid acid catalyst; (b) forming, in the substantial absence of water, a mixture comprising $C_6$ to $C_9$ monocarboxylic acid secondary $C_6$ to $C_{12}$ esters; (c) isolating a composition comprising at least 75 mol % $C_6$ to $C_9$ monocarboxylic acid secondary $C_6$ to $C_{12}$ esters; and (d) using the composition comprising at least 75 mol % $C_6$ to $C_9$ monocarboxylic acid secondary $C_6$ to $C_{12}$ esters to prepare the wellbore treatment fluid. In some embodiments, the wellbore treatment fluid can be a non-aqueous-based drilling fluid and the composition comprising at least 75 mol % $C_6$ to $C_9$ monocarboxylic acid secondary $C_6$ to $C_{12}$ esters can be contacted with a weighting material and water to form the drilling fluid.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Groups of elements of the Periodic Table are indicated using the numbering scheme indicated in the version of the Periodic Table of elements published in *Chemical and Engineering News*, 63(5), 27, 1985. In some instances a group of elements can be indicated using a common name assigned to the group; for example alkali earth metals (or alkali metals) for Group 1 elements, alkaline earth metals (or alkaline metals) for Group 2 elements, transition metals for Group 3-12 elements, and halogens for Group 17 elements.

A chemical "group" is described according to how that group is formally derived from a reference or "parent" compound, for example, by the number of hydrogen atoms formally removed from the parent compound to generate the group, even if that group is not literally synthesized in this manner. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and materials have three or more hydrogens atoms, as necessary for the situation, removed from the alkane. Throughout, the disclosure of a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedure, unless specified otherwise or the context requires otherwise.

The term "substituted" when used to describe a compound or group, for example, when referring to a substituted analog of a particular compound or group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. "Substituted" is intended to be non-limiting and include inorganic substituents or organic substituents.

Unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms. Moreover, other identifiers or qualifying terms can be utilized to indicate the presence or absence of a particular substituent, a particular regiochemistry and/or stereochemistry, or the presence or absence of a branched underlying structure or backbone.

Within this disclosure the normal rules of organic nomenclature will prevail. For instance, when referencing substituted compounds or groups, references to substitution patterns are taken to indicate that the indicated group(s) is (are) located at the indicated position and that all other non-indicated positions are hydrogen. For example, reference to a 4-substituted phenyl group indicates that there is a non-hydrogen substituent located at the 4 position and hydrogens located at the 2, 3, 5, and 6 positions. By way of another example, reference to a 3-substituted naphth-2-yl indicates that there is a non-hydrogen substituent located at the 3 position and hydrogens located at the 1, 4, 5, 6, 7, and 8 positions. References to compounds or groups having substitutions at positions in addition to the indicated position will be referenced using comprising or some other alternative language. For example, a reference to a phenyl group comprising a substituent at the 4 position refers to a group having a non-hydrogen atom at the 4 position and hydrogen or any non-hydrogen group at the 2, 3, 5, and 6 positions.

Regarding claim transitional terms or phrases, the transitional term "comprising", which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. The term "consisting essentially of" occupies a middle ground between closed terms like "consisting of" and fully open terms like "comprising." Absent an indication to the contrary, when describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to feature class to which is utilized and it is possible to have different transitional terms or phrases utilized with different features within a claim. For example a method can comprise several recited steps (and other non-recited steps) but utilize a catalyst system preparation consisting of specific or alternatively consisting essentially of specific steps but utilize a catalyst system comprising recited components and other non-recited components.

While compositions and methods are described in terms of "comprising" (or other broad term) various components and/or steps, the compositions and methods can also described using narrower terms such as "consist essentially of" or "consist of" the various components and/or steps.

Use of the term "optionally" with respect to any element of a claim is intended to mean that the subject element is required, or alternatively, is not required. Both alternatives are intended to be within the scope of the claim.

The terms "a," "an," and "the" are intended, unless specifically indicated otherwise, to include plural alternatives, e.g., at least one. For any particular compound or group disclosed herein, any name or structure presented is intended to encompass all conformational isomers, regioisomers, and stereoisomers that can arise from a particular set of substituents, unless otherwise specified. For example, a general reference to pentane includes n-pentane, 2-methylbutane, and 2,2-dimethylpropane; a general reference to a heptanoic acid includes any monocarboxylic acid having the molecular formula $C_7H_{14}O_2$; and a general reference to a butyl group includes an n-butyl group, a sec-butyl group, an iso-butyl group, and a t-butyl group or tert-butyl group. The name or structure also encompasses all enantiomers, diastereomers, and other optical isomers whether in enantiomeric or racemic forms, as well as mixtures of stereoisomers, as would be recognized by a skilled artisan, unless otherwise specified.

The term "olefin" whenever used in this specification and claims refers to hydrocarbons that have at least one carbon-carbon double bond that is not part of an aromatic ring or an aromatic ring system. The term "olefin" includes aliphatic and aromatic, cyclic and acyclic, and/or linear and branched hydrocarbons having at least one carbon-carbon double bond that is not part of an aromatic ring or ring system unless specifically stated otherwise. Olefins having only one, only two, only three, etc. . . . carbon-carbon double bonds can be identified by use of the term "mono," "di," "tri," etc. . . . within the name of the olefin. The olefins can be further identified by the position of the carbon-carbon double bond(s).

The term "alkene" whenever used in this specification and claims refers to a linear or branched aliphatic hydrocarbon olefin that has one or more carbon-carbon double bonds. Alkenes having only one, only two, only three, etc. . . . such multiple bonds can be identified by use of the term "mono," "di," "tri," etc. . . . within the name. For example, alkamonoenes, alkadienes, and alkatrienes refer to a linear or branched acyclic hydrocarbon olefins having only one carbon-carbon double bond (acyclic having a general formula of $C_nH_{2n}$), only two carbon-carbon double bonds (acyclic having a general formula of $C_nH_{2n-2}$), and only three carbon-carbon double bonds (acyclic having a general formula of $C_nH_{2n-4}$), respectively. Alkenes can be further identified by the position of the carbon-carbon double bond(s). Other identifiers can be utilized to indicate the presence or absence of particular groups within an alkene. For example, a haloalkene refers to an alkene having one or more hydrogen atoms replaced with a halogen atom.

The term "alpha olefin" as used in this specification and claims refers to an olefin that has a carbon-carbon double bond between the first and second carbon atoms of the longest contiguous chain of carbon atoms. The term "alpha olefin" includes linear and branched alpha olefins unless expressly stated otherwise. In the case of branched alpha olefins, a branch can be at the 2-position (a vinylidene) and/or the 3-position or higher with respect to the olefin double bond. The term "vinylidene" whenever used in this specification and claims refers to an alpha olefin having a branch at the 2-position with respect to the olefin double bond. By itself, the term "alpha olefin" does not indicate the presence or absence of other carbon-carbon double bonds unless explicitly indicated.

The term "linear alpha olefin" as used herein refers to a linear olefin having a carbon-carbon double bond between the first and second carbon atoms. The term "linear alpha olefin" by itself does not indicate the presence or absence of other carbon-carbon double bonds, unless explicitly indicated.

The term "normal alpha olefin" whenever used in this specification and claims refers to a linear aliphatic mono-olefin having a carbon-carbon double bond between the first and second carbon atoms. It is noted that "normal alpha olefin" is not synonymous with "linear alpha olefin" as the term "linear alpha olefin" can include linear olefinic compounds having a double bond between the first and second carbon atoms.

The terms "room temperature" or "ambient temperature" are used herein to describe any temperature from 15° C. to 35° C. wherein no external heat or cooling source is directly applied to the reaction vessel. Accordingly, the terms "room temperature" and "ambient temperature" encompass the individual temperatures and any and all ranges, subranges, and combinations of subranges of temperatures from 15° C. to 35° C. wherein no external heating or cooling source is directly applied to the reaction vessel. The term "atmospheric pressure" is used herein to describe an earth air pressure wherein no external pressure modifying means is utilized. Generally, unless practiced at extreme earth altitudes, "atmospheric pressure" is about 1 atmosphere (alternatively, about 14.7 psi or about 101 kPa).

Features within this disclosure that are provided as a minimum values can be alternatively stated as "at least" or "greater than or equal to" any recited minimum value for the feature disclosed herein. Features within this disclosure that are provided as a maximum values can be alternatively stated as "less than or equal to" or "below" any recited maximum value for the feature disclosed herein.

Processes and/or methods described herein utilize steps, features, and compounds which are independently described herein. The process and methods described herein may or may not utilize step identifiers (e.g., 1), 2), etc., a), b), etc., or i), ii), etc.), features (e.g., 1), 2), etc., a), b), etc., or i), ii), etc.), and/or compound identifiers (e.g., first, second, etc.). However, it should be noted that processes and/or methods described herein can have multiple steps, features (e.g. reagent ratios, formation conditions, among other considerations), and/or multiple compounds having the same general descriptor. Consequently, it should be noted that the processes and/or methods described herein can be modified to use an appropriate step or feature identifier (e.g., 1), 2), etc., a), b), etc., or i), ii), etc.) and/or compound identifier (e.g., first, second, etc.) regardless of step, feature, and/or compound identifier utilized in the a particular aspect and/or embodiment described herein and that step or feature identifiers can be added and/or modified to indicate individual different steps/features/compounds utilized within the process and/or methods without detracting from the general disclosure.

Embodiments disclosed herein can provide the materials listed as suitable for satisfying a particular feature of the embodiment delimited by the term "or." For example, a particular feature of the disclosed subject matter may be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

In an embodiment, the compositions described herein can comprise $C_6$ to $C_9$ monocarboxylic acid secondary $C_6$ to $C_{12}$ esters. Generally, a secondary ester is an ester having the oxygen atom of the alkoxy portion of the ester attached to a secondary carbon (i.e., the non-carboxyl group carbon atom attached to the divalent oxygen atom of the ester carboxyl group is attached to two and only two other carbon atoms).

In an embodiment, the compositions described herein can comprise at least 75 mol %, at least 80 mol %, at least 85 mol %, at least 90 mol %, or at least 92 mol % $C_6$ to $C_9$ monocarboxylic acid secondary $C_6$ to $C_{12}$ esters. In an embodiment, the $C_6$ to $C_9$ monocarboxylic acid secondary $C_6$ to $C_{12}$ esters can comprise $C_6$ to $C_9$ monocarboxylic acid linear secondary $C_6$ to $C_{12}$ esters. In an embodiment, the $C_6$ to $C_9$ monocarboxylic acid secondary $C_6$ to $C_{12}$ esters can comprise at least 90 mol %, at least 92 mol %, at least 94 mol %, at least 96 mol %, or at least 98 mol % $C_6$ to $C_9$ monocarboxylic acid linear secondary $C_6$ to $C_{12}$ esters.

In an embodiment, the $C_6$ to $C_9$ monocarboxylic acid secondary $C_6$ to $C_{12}$ esters can comprise, consist essentially of, or can be, $C_6$ to $C_9$ monocarboxylic acid secondary $C_6$ esters (e.g., secondary hexyl esters), $C_6$ to $C_9$ monocarboxylic acid secondary $C_7$ esters (e.g., secondary heptyl esters), $C_6$ to $C_9$ monocarboxylic acid secondary $C_8$ esters (e.g., secondary octyl esters), $C_6$ to $C_9$ monocarboxylic acid secondary $C_9$ esters (e.g., secondary nonyl esters), $C_6$ to $C_9$ monocarboxylic acid secondary $C_{10}$ esters (e.g., secondary decyl esters), $C_6$ to $C_9$ monocarboxylic acid secondary $C_{11}$ esters (e.g., secondary undecyl esters), $C_6$ to $C_9$ monocarboxylic acid secondary $C_{12}$ esters (e.g., secondary dodecyl esters), or combinations thereof. In an embodiment, the $C_6$ to $C_9$ monocarboxylic acid secondary $C_6$ to $C_{12}$ esters can comprise, consist essentially of, or can be, $C_6$ to $C_9$ monocarboxylic acid secondary hexyl esters, $C_6$ to $C_9$ monocarboxylic acid secondary octyl esters, $C_6$ to $C_9$ monocarboxylic acid secondary decyl esters, $C_6$ to $C_9$ monocarboxylic acid secondary dodecyl esters, or combinations thereof. In an embodiment, the $C_6$ to $C_9$ monocarboxylic acid secondary $C_6$ to $C_{12}$ esters can comprise, consist essentially of, or can be, $C_6$ to $C_9$ monocarboxylic acid secondary hexyl esters; alternatively, $C_6$ to $C_9$ monocarboxylic acid secondary octyl esters; alternatively, $C_6$ to $C_9$ monocarboxylic acid secondary decyl esters; or alternatively, $C_6$ to $C_9$ monocarboxylic acid secondary dodecyl esters.

In an embodiment, the $C_6$ to $C_9$ monocarboxylic acid secondary $C_6$ esters can comprise, consist essentially of, or can be, a $C_6$ to $C_9$ monocarboxylic acid 2-hexyl ester and/or a $C_6$ to $C_9$ monocarboxylic acid 3-hexyl ester. In an embodiment, the $C_6$ to $C_9$ monocarboxylic acid secondary $C_7$ esters can comprise, consist essentially of, or can be, a $C_6$ to $C_9$ monocarboxylic acid 2-heptyl ester, a $C_6$ to $C_9$ monocarboxylic acid 3-heptyl ester, and/or a $C_6$ to $C_9$ monocarboxylic acid 4-heptyl ester. In an embodiment, the $C_6$ to $C_9$ monocarboxylic acid secondary $C_8$ esters can comprise, consist essentially of, or can be, a $C_6$ to $C_9$ monocarboxylic acid 2-octyl ester, a $C_6$ to $C_9$ monocarboxylic acid 3-octyl ester, and/or a $C_6$ to $C_9$ monocarboxylic acid 4-octyl ester. In an embodiment, the $C_6$ to $C_9$ monocarboxylic acid secondary $C_9$ esters can comprise, consist essentially of, or can be, a $C_6$ to $C_9$ monocarboxylic acid 2-nonyl ester, a $C_6$ to $C_9$ monocarboxylic acid 3-nonyl ester, a $C_6$ to $C_9$ monocarboxylic acid 4-nonyl ester, and/or a $C_6$ to $C_9$ monocarboxylic acid 5-nonyl ester. In an embodiment, the $C_6$ to $C_9$ monocarboxylic acid secondary $C_{10}$ esters can comprise, consist essentially of, or can be, a $C_6$ to $C_9$ monocarboxylic acid 2-decyl ester, a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester. In an embodiment, the $C_6$ to $C_9$ monocarboxylic acid secondary $C_{11}$ esters can comprise, consist essentially of, or can be, a $C_6$ to $C_9$ monocarboxylic acid 2-undecyl ester, a $C_6$ to $C_9$ monocarboxylic acid 3-undecyl ester, a $C_6$ to $C_9$ monocarboxylic acid 4-undecyl ester, a $C_6$ to $C_9$ monocarboxylic acid 5-undecyl ester, and/or a $C_6$ to $C_9$ monocarboxylic acid 6-undecyl ester. In an embodiment, the $C_6$ to $C_9$ monocarboxylic acid secondary $C_{12}$ esters can comprise, consist essentially of, or can be, a $C_6$ to $C_9$ monocarboxylic acid 2-dodecyl ester, a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester.

In an embodiment, the $C_6$ to $C_9$ monocarboxylic acid secondary $C_6$ to $C_{12}$ esters can comprise at least 20 mol %, at least 25 mol %, or at least 30 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof; alternatively, a $C_6$ to $C_9$ monocarboxylic acid 2-hexyl ester, a $C_6$ to $C_9$ monocarboxylic acid 2-octyl ester, a $C_6$ to $C_9$ monocarboxylic acid 2-decyl ester, a $C_6$ to $C_9$ monocarboxylic acid 2-dodecyl ester, or combinations thereof; alternatively, a $C_6$ to $C_9$ monocarboxylic acid 2-hexyl ester; alternatively, a $C_6$ to $C_9$ monocarboxylic acid 2-octyl ester; alternatively, a $C_6$ to $C_9$ monocarboxylic acid 2-decyl ester; or alternatively, a $C_6$ to $C_9$ monocarboxylic acid 2-dodecyl ester. In some embodiments, the $C_6$ to $C_9$ monocarboxylic acid secondary $C_6$ to $C_{12}$ esters can further comprise at least 10 mol %, at least 15 mol %, or at least 20 mol % of a $C_6$ to $C_9$ monocarboxylic acid 3-hexyl ester, a $C_6$ to $C_9$ monocarboxylic acid 3-heptyl ester, a $C_6$ to $C_9$ monocarboxylic acid 3-octyl ester, a $C_6$ to $C_9$ monocarboxylic acid 3-nonyl ester, a $C_6$ to $C_9$ monocarboxylic acid 3-decyl ester, a $C_6$ to $C_9$ monocarboxylic acid 3-undecyl ester, a $C_6$ to $C_9$ monocarboxylic acid 3-dodecyl ester, or combinations thereof; alternatively, a $C_6$ to $C_9$ monocarboxylic acid 3-hexyl ester, a $C_6$ to $C_9$ monocarboxylic acid 3-octyl ester, a $C_6$ to $C_9$ monocarboxylic acid 3-decyl ester, a $C_6$ to $C_9$ monocarboxylic acid 3-dodecyl ester, or combinations thereof; alternatively, a $C_6$ to $C_9$ monocarboxylic acid 3-hexyl ester; alternatively, a $C_6$ to $C_9$ monocarboxylic acid 3-octyl ester; alternatively, a $C_6$ to $C_9$ monocarboxylic acid 3-decyl ester; or alternatively, a $C_6$ to $C_9$ monocarboxylic acid 3-dodecyl ester. In other embodiments, the $C_6$ to $C_9$ monocarboxylic acid secondary $C_6$ to $C_{12}$ esters can further comprise at least 7 mol %, at least 10 mol %, or at least 15 mol % of a $C_6$ to $C_9$ monocarboxylic acid 4-heptyl ester, a $C_6$ to $C_9$ monocarboxylic acid 4-octyl ester, a $C_6$ to $C_9$ monocarboxylic acid 4-nonyl ester, a $C_6$ to $C_9$ monocarboxylic acid 4-decyl ester, a $C_6$ to $C_9$ monocarboxylic acid 4-undecyl ester, a $C_6$ to $C_9$ monocarboxylic acid 4-dodecyl ester, or combinations thereof; alternatively, a $C_6$ to $C_9$ monocarboxylic acid 4-octyl ester, a $C_6$ to $C_9$ monocarboxylic acid 4-decyl ester, a $C_6$ to $C_9$ monocarboxylic acid 4-dodecyl ester, or combinations thereof; alternatively, a $C_6$ to $C_9$ monocarboxylic acid 4-octyl ester; alternatively, a $C_6$ to $C_9$ monocarboxylic acid 4-decyl ester; or alternatively, a $C_6$ to $C_9$ monocarboxylic acid 4-dodecyl ester. In a further embodiment, the $C_6$ to $C_9$ monocarboxylic acid secondary $C_6$ to $C_{12}$ esters can further comprise at least 7 mol %, at least 8 mol %, at least 9 mol %, or at least 10 mol % of a $C_6$ to $C_9$ monocarboxylic acid 5-nonyl ester, a $C_6$ to $C_9$ monocarboxylic acid 5-decyl ester, a $C_6$ to $C_9$ monocarboxylic acid 5-undecyl ester, a $C_6$ to $C_9$ monocarboxylic acid 5-dodecyl ester, or combinations thereof; alternatively, a $C_6$ to $C_9$ monocarboxylic acid 5-decyl ester, a $C_6$ to $C_9$ monocarboxylic acid 5-dodecyl ester, or combinations thereof; alternatively, a $C_6$ to $C_9$ monocarboxylic acid 5-decyl ester; or alternatively, a $C_6$ to $C_9$ monocarboxylic acid 5-dodecyl ester. In yet another embodiment, the $C_6$ to $C_9$ monocarboxylic acid secondary $C_6$ to $C_{12}$ esters can further comprise at least 7 mol %, at least 8 mol %, or at least 9 mol % of a $C_6$ to $C_9$ monocarboxylic acid 6-undecyl ester, a $C_6$ to $C_9$ monocarboxylic acid 6-dodecyl ester, or combinations thereof; or alternatively, a $C_6$ to $C_9$ monocarboxylic acid 6-dodecyl ester.

In an embodiment, the $C_6$ to $C_9$ monocarboxylic acid secondary $C_6$ to $C_{12}$ esters can comprise at least 20 mol %, at least 25 mol %, or at least 30 mol % of a $C_6$ to $C_9$ monocarboxylic acid 2-hexyl ester, a $C_6$ to $C_9$ monocarboxylic acid 2-octyl ester, a $C_6$ to $C_9$ monocarboxylic acid 2-decyl ester, a $C_6$ to $C_9$ monocarboxylic acid 2-dodecyl ester, or combinations thereof; and at least 10 mol %, at least 15 mol %, or at least 20 mol % of a $C_6$ to $C_9$ monocarboxylic acid 3-hexyl ester, a $C_6$ to $C_9$ monocarboxylic acid 3-octyl ester, a $C_6$ to $C_9$ monocarboxylic acid 3-decyl ester, a $C_6$ to $C_9$ monocarboxylic acid 3-dodecyl ester, or combinations thereof.

In an embodiment, the $C_6$ to $C_9$ monocarboxylic acid secondary $C_6$ to $C_{12}$ esters can comprise at least 20 mol %, at least 25 mol %, or at least 30 mol % of a $C_6$ to $C_9$ monocarboxylic acid 2-hexyl ester, a $C_6$ to $C_9$ monocarboxylic acid 2-octyl ester, a $C_6$ to $C_9$ monocarboxylic acid 2-decyl ester, a $C_6$ to $C_9$ monocarboxylic acid 2-dodecyl ester, or combinations thereof; at least 10 mol %, at least 15 mol %, or at least 20 mol % of a $C_6$ to $C_9$ monocarboxylic acid 3-hexyl ester, a $C_6$ to $C_9$ monocarboxylic acid 3-octyl ester, a $C_6$ to $C_9$ monocarboxylic acid 3-decyl ester, a $C_6$ to $C_9$ monocarboxylic acid 3-dodecyl ester, or combinations thereof; and optionally at least 7 mol %, at least 10 mol %, or at least 15 mol % of a $C_6$ to $C_9$ monocarboxylic acid 4-octyl ester, a $C_6$ to $C_9$ monocarboxylic acid 4-decyl ester, a $C_6$ to $C_9$ monocarboxylic acid 4-dodecyl ester, or combinations thereof.

In an embodiment, the $C_6$ to $C_9$ monocarboxylic acid secondary $C_6$ to $C_{12}$ esters can comprise at least 20 mol %, at least 25 mol %, or at least 30 mol % of a $C_6$ to $C_9$ monocarboxylic acid 2-hexyl ester, a $C_6$ to $C_9$ monocarboxylic acid 2-octyl ester, a $C_6$ to $C_9$ monocarboxylic acid 2-decyl ester, a $C_6$ to $C_9$ monocarboxylic acid 2-dodecyl ester, or combinations thereof; at least 10 mol %, at least 15 mol %, or at least 20 mol % of a $C_6$ to $C_9$ monocarboxylic acid 3-hexyl ester, a $C_6$ to $C_9$ monocarboxylic acid 3-octyl ester, a $C_6$ to $C_9$ monocarboxylic acid 3-decyl ester, a $C_6$ to $C_9$ monocarboxylic acid 3-dodecyl ester, or combinations thereof; optionally at least 7 mol %, at least 10 mol %, or at least 15 mol % of a $C_6$ to $C_9$ monocarboxylic acid 4-octyl ester, a $C_6$ to $C_9$ monocarboxylic acid 4-decyl ester, a $C_6$ to $C_9$ monocarboxylic acid 4-dodecyl ester, or combinations thereof; and optionally at least 7 mol %, at least 8 mol %, at least 9 mol %, or at least 10 mol % of a $C_6$ to $C_9$ monocarboxylic acid 5-decyl ester, a $C_6$ to $C_9$ monocarboxylic acid 5-dodecyl ester, or combinations thereof.

In an embodiment, the $C_6$ to $C_9$ monocarboxylic acid secondary $C_6$ to $C_{12}$ esters can comprise at least 20 mol %, at least 25 mol %, or at least 30 mol % of a $C_6$ to $C_9$ monocarboxylic acid 2-hexyl ester, a $C_6$ to $C_9$ monocarboxylic acid 2-octyl ester, a $C_6$ to $C_9$ monocarboxylic acid 2-decyl ester, a $C_6$ to $C_9$ monocarboxylic acid 2-dodecyl ester, or combinations thereof; at least 10 mol %, at least 15 mol %, or at least 20 mol % of a $C_6$ to $C_9$ monocarboxylic acid 3-hexyl ester, a $C_6$ to $C_9$ monocarboxylic acid 3-octyl ester, a $C_6$ to $C_9$ monocarboxylic acid 3-decyl ester, a $C_6$ to $C_9$ monocarboxylic acid 3-dodecyl ester, or combinations thereof; optionally at least 7 mol %, at least 10 mol %, or at least 15 mol % of a $C_6$ to $C_9$ monocarboxylic acid 4-octyl ester, a $C_6$ to $C_9$ monocarboxylic acid 4-decyl ester, a $C_6$ to $C_9$ monocarboxylic acid 4-dodecyl ester, or combinations thereof; optionally at least 7 mol %, at least 8 mol %, at least 9 mol %, or at least 10 mol % of a $C_6$ to $C_9$ monocarboxylic acid 5-decyl ester, a $C_6$ to $C_9$ monocarboxylic acid 5-dodecyl ester, or combinations thereof; and optionally at least 7 mol %, at least 8 mol %, or at least 9 mol % of a $C_6$ to $C_9$ monocarboxylic acid 6-dodecyl ester.

In an embodiment, the compositions described herein can comprise (i) $C_6$ to $C_9$ monocarboxylic acid secondary $C_6$ esters comprising a $C_6$ to $C_9$ monocarboxylic acid 2-hexyl ester, and a $C_6$ to $C_9$ monocarboxylic acid 3-hexyl ester; (ii) $C_6$ to $C_9$ monocarboxylic acid secondary $C_7$ esters comprising a $C_6$ to $C_9$ monocarboxylic acid 2-heptyl ester, a $C_6$ to $C_9$ monocarboxylic acid 3-heptyl ester, and a $C_6$ to $C_9$ monocarboxylic acid 4-heptyl ester; (iii) $C_6$ to $C_9$ monocarboxylic acid secondary $C_8$ esters comprising a $C_6$ to $C_9$ monocarboxylic acid 2-octyl ester, a $C_6$ to $C_9$ monocarboxylic acid 3-octyl ester, and a $C_6$ to $C_9$ monocarboxylic acid 4-octyl ester; (iv) $C_6$ to $C_9$ monocarboxylic acid secondary $C_9$ esters comprising a $C_6$ to $C_9$ monocarboxylic acid 2-nonyl ester, a $C_6$ to $C_9$ monocarboxylic acid 3-nonyl ester, a $C_6$ to $C_9$ monocarboxylic acid 4-nonyl ester, and a $C_6$ to $C_9$ monocarboxylic acid 5-nonyl ester; (v) $C_6$ to $C_9$ monocarboxylic acid secondary $C_{10}$ esters comprising a $C_6$ to $C_9$ monocarboxylic acid 2-decyl ester, a $C_6$ to $C_9$ monocarboxylic acid 3-decyl ester, a $C_6$ to $C_9$ monocarboxylic acid 4-decyl ester, and a $C_6$ to $C_9$ monocarboxylic acid 5-decyl ester; (vi) $C_6$ to $C_9$ monocarboxylic acid secondary $C_{11}$ esters comprising a $C_6$ to $C_9$ monocarboxylic acid 2-undecyl ester, a $C_6$ to $C_9$ monocarboxylic acid 3-undecyl ester, a $C_6$ to $C_9$ monocarboxylic acid 4-undecyl ester, a $C_6$ to $C_9$ monocarboxylic acid 5-undecyl ester, and a $C_6$ to $C_9$ monocarboxylic acid 6-undecyl ester; and/or (vii) $C_6$ to $C_9$ monocarboxylic acid secondary $C_{12}$ esters comprising a $C_6$ to $C_9$ monocarboxylic acid 2-dodecyl ester, a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and a $C_6$ to $C_9$ monocarboxylic acid 6-dodecyl ester.

In an embodiment, the compositions described herein can comprise less than 5 mol %, less than 4 mol %, less than 3 mol %, less than 2 mol %, or less than 1 mol % of a $C_6$ to $C_9$ monocarboxylic acid primary $C_6$ to $C_{12}$ ester; or alternatively, a $C_6$ to $C_9$ monocarboxylic acid linear primary $C_6$ to $C_{12}$ ester. Generally, a primary ester is an ester having the oxygen atom of the alkoxy portion of the ester attached to a primary carbon (i.e., the non-carboxyl group carbon atom attached to the divalent oxygen atom of the ester carboxyl group is attached to one and only one carbon atom).

In an embodiment, the compositions described herein can comprise less than 5 mol %, less than 4 mol %, less than 3 mol %, less than 2 mol %, or less than 1 mol % of a $C_6$ to $C_9$ monocarboxylic acid 1-hexyl ester, a $C_6$ to $C_9$ monocarboxylic acid 1-heptyl ester, a $C_6$ to $C_9$ monocarboxylic acid 1-octyl ester, a $C_6$ to $C_9$ monocarboxylic acid 1-nonyl ester, a $C_6$ to $C_9$ monocarboxylic acid 1-decyl ester, a $C_6$ to $C_9$ monocarboxylic acid 1-undecyl ester, a $C_6$ to $C_9$ monocarboxylic acid 1-dodecyl ester, or combinations thereof; alternatively, a $C_6$ to $C_9$ monocarboxylic acid 1-hexyl ester, a $C_6$ to $C_9$ monocarboxylic acid 1-octyl ester, a $C_6$ to $C_9$ monocarboxylic acid 1-decyl ester, a $C_6$ to $C_9$ monocarboxylic acid 1-dodecyl ester, or combinations thereof; alternatively, a $C_6$ to $C_9$ monocarboxylic acid 1-hexyl ester; alternatively, a $C_6$ to $C_9$ monocarboxylic acid 1-octyl ester; alternatively, a $C_6$ to $C_9$ monocarboxylic acid 1-decyl ester; or alternatively, a $C_6$ to $C_9$ monocarboxylic acid 1-dodecyl ester.

In an embodiment, the compositions described herein can comprise less than or equal to 14 mol %, less than or equal to 12 mol %, less than or equal to 10 mol %, less than or equal to 8 mol %, or less than or equal to 6 mol % $C_{12}$ to $C_{24}$ olefins; alternatively, $C_{16}$ to $C_{24}$ olefins; alternatively, $C_{12}$ to $C_{16}$ olefins; alternatively, $C_{16}$ to $C_{20}$ olefins; alternatively; $C_{20}$ to $C_{24}$ olefins; alternatively, $C_{12}$ olefins; alternatively, $C_{16}$ olefins; alternatively, $C_{20}$ olefins; or alternatively, $C_{24}$ olefins. In some embodiments, the compositions described herein can comprise from 1 mol % to 14 mol %, from 1 mol % to 12 mol %, from 2 mol % to 12 mol %, from 2 mol % to 10 mol, from 3 mol % to 10 mol %, or from 3 mol % to 8 mol % $C_{12}$ to $C_{24}$ olefins; alternatively, $C_{16}$ to $C_{24}$ olefins; alternatively, $C_{12}$ to $C_{16}$ olefins; alternatively, $C_{16}$ to $C_{20}$ olefins; alternatively, $C_{20}$ to $C_{24}$ olefins; alternatively, $C_{12}$ olefins; alternatively, $C_{16}$ olefins; alternatively, $C_{20}$ olefins; or alternatively, $C_{24}$ olefins. In other embodiments, the compositions described herein comprising $C_6$ to $C_9$ monocarboxylic acid secondary $C_6$ to $C_{12}$ esters can comprise less than or equal to 5 mol %, less than or equal to 4 mol %, less than or equal to 3 mol %, less than or equal to 2 mol %, less than or equal to 1 mol %, less than or equal to 0.5 mol %, or less than or equal to 0.25 mol % $C_{12}$ to $C_{24}$ olefins; alternatively, $C_{16}$ to $C_{24}$ olefins; alternatively, $C_{12}$ to $C_{16}$ olefins; alternatively, $C_{16}$ to $C_{20}$ olefins; alternatively, $C_{20}$ to $C_{24}$ olefins; alternatively, $C_{12}$ olefins; alternatively, $C_{16}$ olefins; alternatively, $C_{20}$ olefins; or alternatively, $C_{24}$ olefins.

In an embodiment, the compositions described herein can comprise $C_6$ to $C_9$ monocarboxylic acid secondary hexyl esters, wherein the $C_6$ to $C_9$ monocarboxylic acid secondary hexyl esters comprise from 45 mol % to 75 mol % of a $C_6$ to $C_9$ monocarboxylic acid 2-hexyl ester, and from 25 mol % to 55 mol % of a $C_6$ to $C_9$ monocarboxylic acid 3-hexyl ester; alternatively, from 50 mol % to 70 mol % of a $C_6$ to $C_9$ monocarboxylic acid 2-hexyl ester, and from 30 mol % to 50 mol % of a $C_6$ to $C_9$ monocarboxylic acid 3-hexyl ester; or alternatively, from 55 mol % to 65 mol % of a $C_6$ to $C_9$ monocarboxylic acid 2-hexyl ester, and from 35 mol % to 45 mol % of a $C_6$ to $C_9$ monocarboxylic acid 3-hexyl ester. In embodiments, the compositions described herein comprising $C_6$ to $C_9$ monocarboxylic acid secondary hexyl esters can comprise less than 5 mol %, less than 4 mol %, less than 3 mol %, less than 2 mol %, or less than 1 mol % $C_6$ to $C_9$ monocarboxylic acid primary $C_6$ esters; or alternatively, a $C_6$ to $C_9$ monocarboxylic acid 1-hexyl ester. In some embodiments, the compositions described herein comprising $C_6$ to $C_9$ monocarboxylic acid secondary hexyl esters can comprise less than or equal to 14 mol %, less than or equal to 12 mol %, less than or equal to 10 mol %, less than or equal to 8 mol %, or less than or equal to 6 mol % $C_{12}$ olefins. In other embodiments, the compositions described herein comprising $C_6$ to $C_9$ monocarboxylic acid secondary hexyl esters can comprise from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{12}$ olefins. In yet other embodiments, the compositions described herein comprising $C_6$ to $C_9$ monocarboxylic acid secondary hexyl esters can comprise less than or equal to 5 mol %, less than or equal to 4 mol %, less than or equal to 3 mol %, less than or equal to 2 mol %, less than or equal to 1 mol %, less than or equal to 0.5 mol %, or less than or equal to 0.25 mol % $C_{12}$ olefins.

In some embodiments, the compositions described herein can comprise $C_6$ to $C_9$ monocarboxylic acid secondary octyl esters, wherein the $C_6$ to $C_9$ monocarboxylic acid secondary octyl esters comprise (a) from 30 mol % to 60 mol %, 35 mol % to 55 mol %, or from 40 mol % to 50 mol % of a $C_6$ to $C_9$ monocarboxylic acid 2-octyl ester and (b) from 40 mol % to 70 mol %, from 45 mol % to 65 mol %, or from 50 mol % to 60 mol % of a $C_6$ to $C_9$ monocarboxylic acid 3-octyl ester, and/or a $C_6$ to $C_9$ monocarboxylic acid 4-octyl ester. In other embodiments, the compositions described herein can comprise $C_6$ to $C_9$ monocarboxylic acid secondary octyl esters, wherein the $C_6$ to $C_9$ monocarboxylic acid secondary octyl esters comprise from 30 mol % to 60 mol % of a $C_6$ to $C_9$ monocarboxylic acid 2-octyl ester, from 20 mol % to 40 mol % of a $C_6$ to $C_9$ monocarboxylic acid 3-octyl ester, and from 15 mol % to 30 mol % of a $C_6$ to $C_9$ monocarboxylic acid 4-octyl ester; alternatively, from 35 mol % to 55 mol % of a $C_6$ to $C_9$ monocarboxylic acid 2-octyl ester, from 22.5 mol % to 37.5 mol % of a $C_6$ to $C_9$ monocarboxylic acid 3-octyl ester, and from 17.5 mol % to 27.5 mol % of a $C_6$ to $C_9$ monocarboxylic acid 4-octyl ester; or alternatively, from 40 mol % to 50 mol % of a $C_6$ to $C_9$ monocarboxylic acid 2-octyl ester, from 25 mol % to 35 mol % of a $C_6$ to $C_9$ monocarboxylic acid 3-octyl ester, and from 20 mol % to 25 mol % of a $C_6$ to $C_9$ monocarboxylic acid 4-octyl ester. In embodiments, the compositions described herein comprising $C_6$ to $C_9$ monocarboxylic acid secondary octyl esters can comprise less than 5 mol %, less than 4 mol %, less than 3 mol %, less than 2 mol %, or less than 1 mol % $C_6$ to $C_9$ monocarboxylic acid primary $C_8$ esters; or a $C_6$ to $C_9$ monocarboxylic acid 1-octyl ester. In some embodiments, the compositions described herein comprising $C_6$ to $C_9$ monocarboxylic acid secondary octyl esters can comprise less than or equal to 14 mol %, less than or equal to 12 mol %, less than or equal to 10 mol %, less than or equal to 8 mol %, or less than or equal to 6 mol % $C_{16}$ olefins. In other embodiments, the compositions described herein comprising $C_6$ to $C_9$ monocarboxylic acid secondary octyl esters can comprise from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{16}$ olefins.

In some embodiments, the compositions described herein can comprise $C_6$ to $C_9$ monocarboxylic acid secondary decyl esters, wherein the $C_6$ to $C_9$ monocarboxylic acid secondary decyl esters comprise (a) from 25 mol % to 55 mol %, from 30 mol % to 50 mol %, or from 35 mol % to 45 mol % of a $C_6$ to $C_9$ monocarboxylic acid 2-decyl ester and (b) from 45 mol % to 75 mol %, from 50 mol % to 70 mol %, or from 55 mol % to 65 mol % of a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester. In other embodiments, the compositions described herein can comprise $C_6$ to $C_9$ monocarboxylic acid secondary decyl esters, wherein the $C_6$ to $C_9$ monocarboxylic acid secondary decyl esters comprise from 25 mol % to 55 mol % of a $C_6$ to $C_9$ monocarboxylic acid 2-decyl ester, from 15 mol % to 35 mol % of a $C_6$ to $C_9$ monocarboxylic acid 3-decyl ester, from 10 mol % to 30 mol % of a $C_6$ to $C_9$ monocarboxylic acid 4-decyl ester, and from 5 mol % to 25 mol % of a $C_6$ to $C_9$ monocarboxylic acid 5-decyl ester; alternatively, from 30 mol % to 50 mol % of a $C_6$ to $C_9$ monocarboxylic acid 2-decyl ester, from 17.5 mol % to 32.5 mol % of a $C_6$ to $C_9$ monocarboxylic acid 3-decyl ester, from 12.5 mol % to 27.5 mol % of a $C_6$ to $C_9$ monocarboxylic acid 4-decyl ester, and from 7.5 mol % to 22.5 mol % of a $C_6$ to $C_9$ monocarboxylic acid 5-decyl ester; or alternatively, from 35 mol % to 45 mol % of a $C_6$ to $C_9$ monocarboxylic acid 2-decyl ester, from 20 mol % to 30 mol % of a $C_6$ to $C_9$ monocarboxylic acid 3-decyl ester, from 15 mol % to 25 mol % of a $C_6$ to $C_9$ monocarboxylic acid 4-decyl ester, and from 10 mol % to 20 mol % of a $C_6$ to $C_9$ monocarboxylic acid 5-decyl ester. In embodiments, the compositions described herein comprising $C_6$ to $C_9$ monocarboxylic acid secondary decyl esters can comprise less than 5 mol %, less than 4 mol %, less than 3 mol %, less than 2 mol %, or less than 1 mol % $C_6$ to $C_9$ monocarboxylic acid primary $C_{10}$ esters; or alternatively, a $C_6$ to $C_9$ monocarboxylic acid 1-decyl ester. In some embodiments, the compositions described herein comprising $C_6$ to $C_9$ monocarboxylic acid secondary decyl esters can comprise less than or equal to 14 mol %, less than or equal to 12 mol %, less than or equal to 10 mol %, less than or equal to 8 mol %, or less than or equal to 6 mol % $C_{20}$ olefins. In other embodiments, the compositions described herein comprising $C_6$ to $C_9$ monocarboxylic acid secondary decyl esters can comprise from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{20}$ olefins.

In some embodiments, the compositions described herein can comprise $C_6$ to $C_9$ monocarboxylic acid secondary dodecyl esters, wherein the $C_6$ to $C_9$ monocarboxylic acid secondary dodecyl esters comprise (a) from 20 mol % to 50 mol %, from 25 mol % to 45 mol %, or from 30 mol % to 40 mol % of a $C_6$ to $C_9$ monocarboxylic acid 2-dodecyl ester and (b) from 50 mol % to 80 mol %, from 55 mol % to 75 mol %, or from 60 mol % to 70 mol % of a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester. In other embodiments, the compositions described herein can comprise $C_6$ to $C_9$ monocarboxylic acid secondary dodecyl esters, wherein the $C_6$ to $C_9$ monocarboxylic acid secondary dodecyl esters comprise from 20 mol % to 50 mol % of a $C_6$ to $C_9$ monocarboxylic acid 2-dodecyl ester, from 10 mol % to 30 mol % of a $C_6$ to $C_9$ monocarboxylic acid 3-dodecyl ester, from 5 mol % to 25 mol % of a $C_6$ to $C_9$ monocarboxylic acid 4-dodecyl ester, from 5 mol % to 25 mol % of a $C_6$ to $C_9$ monocarboxylic acid 5-dodecyl ester, and from 5 mol % to 25 mol % of a $C_6$ to $C_9$ monocarboxylic acid 6-dodecyl ester; alternatively, from 25 mol % to 45 mol % of a $C_6$ to $C_9$ monocarboxylic acid 2-dodecyl ester, from 12.5 mol % to 27.5 mol % of a $C_6$ to $C_9$ monocarboxylic acid 3-dodecyl ester, from 7.5 mol % to 22.5 mol % of a $C_6$ to $C_9$ monocarboxylic acid 4-dodecyl ester, from 7.5 mol % to 22.5 mol % of a $C_6$ to $C_9$ monocarboxylic acid 5-dodecyl ester, and from 7.5 mol % to 22.5 mol % of a $C_6$ to $C_9$ monocarboxylic acid 6-dodecyl ester; or alternatively, from 30 mol % to 40 mol % of a $C_6$ to $C_9$ monocarboxylic acid 2-dodecyl ester, from 15 mol % to 25 mol % of a $C_6$ to $C_9$ monocarboxylic acid 3-dodecyl ester, from 10 mol % to 20 mol % of a $C_6$ to $C_9$ monocarboxylic acid 4-dodecyl ester, from 10 mol % to 20 mol % of a $C_6$ to $C_9$ monocarboxylic acid 5-dodecyl ester, and from 10 mol % to 20 mol % of a $C_6$ to $C_9$ monocarboxylic acid 6-dodecyl ester. In embodiments, the compositions described herein comprising $C_6$ to $C_9$ monocarboxylic acid secondary dodecyl esters can comprise less than 5 mol %, less than 4 mol %, less than 3 mol %, less than 2 mol %, or less than 1 mol % $C_6$ to $C_9$ monocarboxylic acid primary $C_{12}$ esters; or alternatively, a $C_6$ to $C_9$ monocarboxylic acid 1-dodecyl ester. In some embodiments, the compositions described herein comprising $C_6$ to $C_9$ monocarboxylic acid secondary dodecyl esters can comprise less than or equal to 14 mol %, less than or equal to 12 mol %, less than or equal to 10 mol %, less than or equal to 8 mol %, or less than or equal to 6 mol % $C_{24}$ olefins. In other embodiments, the compositions described herein comprising $C_6$ to $C_9$ monocarboxylic acid secondary dodecyl esters can comprise from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{24}$ olefins.

In an embodiment, the $C_6$ to $C_9$ monocarboxylic acid secondary $C_6$ to $C_{12}$ esters can comprise, consist essentially of, or can be, (i) $C_6$ to $C_9$ monocarboxylic acid secondary $C_6$ esters, (ii) $C_6$ to $C_9$ monocarboxylic acid secondary $C_8$ esters, (iii) $C_6$ to $C_9$ monocarboxylic acid secondary $C_{10}$ esters, (iv) $C_6$ to $C_9$ monocarboxylic acid secondary $C_{12}$ esters, or combinations thereof. In some embodiments, the $C_6$ to $C_9$ monocarboxylic acid secondary $C_6$ esters can have any composition described herein, the $C_6$ to $C_9$ monocarboxylic acid secondary $C_8$ esters can have any composition described herein, the $C_6$ to $C_9$ monocarboxylic acid secondary $C_{10}$ esters can have any composition described herein, and/or the $C_6$ to $C_9$ monocarboxylic acid secondary $C_{12}$ esters can have any composition described herein. For example, in some embodiments, (i) the $C_6$ to $C_9$ monocarboxylic acid secondary $C_6$ esters can comprise from 45 mol % to 75 mol % of a $C_6$ to $C_9$ monocarboxylic acid 2-hexyl ester, and from 25 mol % to 55 mol % of a $C_6$ to $C_9$ monocarboxylic acid 3-hexyl ester; (ii) the $C_6$ to $C_9$ monocarboxylic acid secondary $C_8$ esters can comprise (a) from 30 mol % to 60 mol % of a $C_6$ to $C_9$ monocarboxylic acid 2-octyl ester and (b) from 40 mol % to 70 mol % of a $C_6$ to $C_9$ monocarboxylic acid 3-octyl ester, and/or a $C_6$ to $C_9$ monocarboxylic acid 4-octyl ester; (iii) the $C_6$ to $C_9$ monocarboxylic acid secondary $C_{10}$ esters can comprise (a) from 25 mol % to 55 mol % of a $C_6$ to $C_9$ monocarboxylic acid 2-decyl ester and (b) from 45 mol % to 75 mol % of a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester; and (iv) the $C_6$ to $C_9$ monocarboxylic acid secondary $C_{12}$ esters can comprise (a) from 20 mol % to 50 mol % of a $C_6$ to $C_9$ monocarboxylic acid 2-dodecyl ester and (b) from 50 mol % to 80 mol % of a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester. Other mixtures of $C_6$ to $C_9$ monocarboxylic acid secondary $C_6$ esters, mixtures of $C_6$ to $C_9$ monocarboxylic acid secondary $C_8$ esters, mixtures of $C_6$ to $C_9$ monocarboxylic acid secondary $C_{10}$ esters, and/or mixtures of $C_6$ to $C_9$ monocarboxylic acid secondary $C_{12}$ esters which can be utilized for the $C_6$ to $C_9$ monocarboxylic acid secondary $C_6$ to $C_{12}$ esters are readily apparent to one of skill in the art and are fully contemplated by the present disclosure.

In an embodiment, the compositions described herein can comprise (i) at least 75 mol % heptanoic acid secondary hexyl esters, less than 5 mol % heptanoic acid 1-hexyl ester, and less than or equal to 14 mol % $C_{12}$ olefins, wherein the heptanoic acid secondary hexyl esters comprise from 45 mol % to 75 mol % of a heptanoic acid 2-hexyl ester, and from 25 mol % to 55 mol % of a heptanoic acid 3-hexyl ester; (ii) at least 75 mol % heptanoic acid secondary octyl esters, less than 5 mol % heptanoic acid 1-octyl ester, and less than or equal to 14 mol % $C_{16}$ olefins, wherein the heptanoic acid secondary octyl esters comprise from 30 mol % to 60 mol % of a heptanoic acid 2-octyl ester, from 20 mol % to 40 mol % of a heptanoic acid 3-octyl ester, and from 15 mol % to 30 mol % of a heptanoic acid 4-octyl ester; (iii) at least 75 mol % heptanoic acid secondary decyl esters, less than 5 mol % heptanoic acid 1-decyl ester, and less than or equal to 14 mol % $C_{20}$ olefins, wherein the heptanoic acid secondary decyl esters comprise from 25 mol % to 55 mol % of a heptanoic acid 2-decyl ester, from 15 mol % to 35 mol % of a heptanoic acid 3-decyl ester, from 10 mol % to 30 mol % of a heptanoic acid 4-decyl ester, and from 5 mol % to 25 mol % of a heptanoic acid 5-decyl ester; or (iv) at least 75 mol % heptanoic acid secondary dodecyl esters, less than 5 mol % heptanoic acid 1-dodecyl ester, and less than or equal to 14 mol % $C_{24}$ olefins, wherein the heptanoic acid secondary dodecyl esters comprise from 20 mol % to 50 mol % of a heptanoic acid 2-dodecyl ester, from 10 mol % to 30 mol % of a heptanoic acid 3-dodecyl ester, from 5 mol % to 25 mol % of a heptanoic acid 4-dodecyl ester, from 5 mol % to 25 mol % of a heptanoic acid 5-dodecyl ester, and from 5 mol % to 25 mol % of a heptanoic acid 6-dodecyl ester.

In an embodiment, the monocarboxylic acid of the $C_6$ to $C_9$ monocarboxylic acid secondary $C_6$ to $C_{12}$ esters can comprise, consist essentially of, or can be, a hexanoic acid, a heptanoic acid, an octanoic acid, a nonanoic acid, or combinations thereof; alternatively, a heptanoic acid, an octanoic acid, a nonanoic acid, or combinations thereof; alternatively, a hexanoic acid; alternatively, a heptanoic acid; alternatively, an octanoic acid; or alternatively, a nonanoic acid. In an embodiment, the monocarboxylic acid of the $C_6$ to $C_9$ monocarboxylic acid secondary $C_6$ to $C_{12}$ esters can comprise, consist essentially of, or can be, a heptanoic acid, a nonanoic acid, or combinations thereof; alternatively, a heptanoic acid; or alternatively, a nonanoic acid.

In an embodiment, the monocarboxylic acid of the $C_6$ to $C_9$ monocarboxylic acid secondary $C_6$ to $C_{12}$ esters can comprise at least 80 mol %, at least 85 mol %, at least 90 mol %, or at least 95 mol % n-hexanoic acid, n-heptanoic acid, n-octanoic acid, n-nonanoic acid, or combinations thereof; alternatively, n-heptanoic acid, n-octanoic acid, n-nonanoic acid, or combinations thereof; alternatively, n-hexanoic acid; alternatively, n-heptanoic acid; alternatively, n-octanoic acid; or alternatively, n-nonanoic acid. In some embodiments, the monocarboxylic acid of the $C_6$ to $C_9$ monocarboxylic acid secondary $C_6$ to $C_{12}$ esters can comprise at least 80 mol %, at least 85 mol %, at least 90 mol %, or at least 95 mol % n-heptanoic acid, n-nonanoic acid, or combinations thereof.

In an embodiment, the $C_6$ to $C_9$ monocarboxylic acid secondary $C_6$ to $C_{12}$ esters can comprise, consist essentially of, or can be, heptanoic acid secondary $C_6$ to $C_{12}$ esters, nonanoic acid secondary $C_6$ to $C_{12}$ esters, or combinations thereof; alternatively, heptanoic acid secondary $C_6$ to $C_{12}$ esters; or alternatively, nonanoic acid secondary $C_6$ to $C_{12}$ esters.

In an embodiment, the compositions described herein can comprise at least 75 mol %, at least 80 mol %, at least 85 mol %, at least 90 mol %, or at least 92 mol % heptanoic acid secondary $C_6$ to $C_{12}$ esters. In an embodiment, the heptanoic acid secondary $C_6$ to $C_{12}$ esters can comprise, consist essentially of, or can be, a heptanoic acid secondary hexyl ester, a heptanoic acid secondary heptyl ester, a heptanoic acid secondary octyl ester, a heptanoic acid secondary nonyl ester, a heptanoic acid secondary decyl ester, a heptanoic acid secondary undecyl ester, a heptanoic acid secondary dodecyl ester, or combinations thereof; alternatively, a heptanoic acid secondary hexyl ester, a heptanoic acid secondary octyl ester, a heptanoic acid secondary decyl ester, a heptanoic acid secondary dodecyl ester, or combinations thereof; alternatively, a heptanoic acid secondary hexyl ester; alternatively, a heptanoic acid secondary octyl ester; alternatively, a heptanoic acid secondary decyl ester; or alternatively, a heptanoic acid secondary dodecyl ester. In some embodiments, the heptanoic acid secondary $C_6$ to $C_{12}$ esters can comprise, consist essentially of, or can be, a heptanoic acid secondary octyl ester, a heptanoic acid secondary decyl ester, a heptanoic acid secondary dodecyl ester, or combinations thereof; alternatively, a heptanoic acid secondary octyl ester, a heptanoic acid secondary decyl ester, or combinations thereof; alternatively, a heptanoic acid secondary octyl ester, a heptanoic acid secondary dodecyl ester, or combinations thereof; or alternatively, a heptanoic acid secondary decyl ester, a heptanoic acid secondary dodecyl ester, or combinations thereof.

In an embodiment, the heptanoic acid secondary $C_6$ to $C_{12}$ esters can comprise heptanoic acid linear secondary $C_6$ to $C_{12}$ esters. In an embodiment, the heptanoic acid secondary $C_6$ to $C_{12}$ esters can comprise at least 90 mol %, at least 92 mol %, at least 94 mol %, at least 96 mol %, or at least 98 mol % heptanoic acid linear secondary $C_6$ to $C_{12}$ esters.

In an embodiment, the heptanoic acid secondary hexyl esters can comprise, consist essentially of, or can be, a heptanoic acid secondary 2-hexyl ester and/or a heptanoic acid secondary 3-hexyl ester. In an embodiment, the heptanoic acid secondary heptyl esters can comprise, consist essentially of, or can be, a heptanoic acid 2-heptyl ester, a heptanoic acid 3-heptyl ester, and/or a heptanoic acid 4-heptyl ester. In an embodiment, the heptanoic acid secondary octyl esters can comprise, consist essentially of, or can be, a heptanoic acid 2-octyl ester, a heptanoic acid 3-octyl ester, and/or a heptanoic acid 4-octyl ester. In an embodiment, the heptanoic acid secondary nonyl esters can comprise, consist essentially of, or can be, a heptanoic acid 2-nonyl ester, a heptanoic acid 3-nonyl ester, a heptanoic acid 4-nonyl ester, and/or a heptanoic acid 5-nonyl ester. In an embodiment, the heptanoic acid secondary decyl esters can comprise, consist essentially of, or can be, a heptanoic acid 2-decyl ester, a heptanoic acid 3-decyl ester, a heptanoic acid 4-decyl ester, and/or a heptanoic acid 5-decyl ester. In an embodiment, the heptanoic acid secondary undecyl esters can comprise, consist essentially of, or can be, a heptanoic acid 2-undecyl ester, a heptanoic acid 3-undecyl ester, a heptanoic acid 4-undecyl ester, heptanoic acid 5-undecyl ester, and/or a heptanoic acid 6-undecyl ester. In an embodiment, the heptanoic acid secondary dodecyl esters can comprise, consist essentially of, or can be, a heptanoic acid 2-dodecyl ester, a heptanoic acid 3-dodecyl ester, a heptanoic acid 4-dodecyl ester, heptanoic acid 5-dodecyl ester, and/or a heptanoic acid 6-dodecyl ester.

In an embodiment, the compositions described herein comprising heptanoic acid secondary $C_6$ to $C_{12}$ esters can comprise less than 5 mol %, less than 4 mol %, less than 3 mol %, less than 2 mol %, or less than 1 mol % of heptanoic acid primary $C_6$ to $C_{12}$ esters; or alternatively, heptanoic acid linear primary $C_6$ to $C_{12}$ esters. In some embodiments, the compositions described herein comprising heptanoic acid secondary $C_6$ to $C_{12}$ esters can comprise less than 5 mol %, less than 4 mol %, less than 3 mol %, less than 2 mol %, or less than 1 mol % of a heptanoic acid 1-hexyl ester, a heptanoic acid 1-heptyl ester, a heptanoic acid 1-octyl ester, a heptanoic acid 1-nonyl ester, a heptanoic acid 1-decyl ester, a heptanoic acid 1-undecyl ester, a heptanoic acid 1-dodecyl ester, or combinations thereof; alternatively, a heptanoic acid 1-hexyl ester, a heptanoic acid 1-octyl ester, a heptanoic acid 1-decyl ester, a heptanoic acid 1-dodecyl ester, or combinations thereof; alternatively, a heptanoic acid 1-hexyl ester; alternatively, a heptanoic acid 1-octyl ester; alternatively, a heptanoic acid 1-decyl ester; or alternatively, a heptanoic acid 1-dodecyl ester. In some embodiments, the compositions described herein comprising heptanoic acid secondary $C_6$ to $C_{12}$ esters can comprise less than 5 mol %, less than 4 mol %, less than 3 mol %, less than 2 mol %, or less than 1 mol % of a heptanoic acid 1-octyl ester, a heptanoic acid 1-decyl ester, a heptanoic acid 1-dodecyl ester, or combinations thereof; alternatively, a heptanoic acid 1-octyl ester, a heptanoic acid 1-decyl ester, or combinations thereof; alternatively, a heptanoic acid 1-octyl ester, a heptanoic acid 1-dodecyl ester, or combinations thereof; or alternatively, a heptanoic acid 1-decyl ester, a heptanoic acid 1-dodecyl ester, or combinations thereof. In further embodiments, the compositions described herein comprising heptanoic acid secondary $C_6$ to $C_{12}$ esters can comprise less than or equal to 14 mol %, less than or equal to 12 mol %, less than or equal to 10 mol %, less than or equal to 8 mol %, or less than or equal to 6 mol % $C_{12}$ to $C_{24}$ olefins; alternatively, $C_{16}$ to $C_{24}$ olefins; alternatively, $C_{12}$ to $C_{16}$ olefins; alternatively, $C_{16}$ to $C_{20}$ olefins; alternatively; $C_{20}$ to $C_{24}$ olefins; alternatively, $C_{12}$ olefins; alternatively, $C_{16}$ olefins; alternatively, $C_{20}$ olefins; or alternatively, $C_{24}$ olefins.

In an embodiment, the compositions described herein can comprise at least 75 mol %, at least 80 mol %, at least 85 mol %, at least 90 mol %, or at least 92 mol % heptanoic acid secondary hexyl esters. In an embodiment, the heptanoic acid secondary hexyl esters can comprise from 45 mol % to 75 mol % of a heptanoic acid 2-hexyl ester and from 25 mol % to 55 mol % of a heptanoic acid 3-hexyl ester; alternatively, from 50 mol % to 70 mol % of a heptanoic acid 2-hexyl ester and from 30 mol % to 50 mol % of a heptanoic acid 3-hexyl ester; or alternatively, from 55 mol % to 65 mol % of a heptanoic acid 2-hexyl ester and from 35 mol % to 45 mol % of a heptanoic acid 3-hexyl ester. In some embodiments, the compositions described herein comprising heptanoic acid secondary hexyl esters can comprise less than 5 mol %, less than 4 mol %, less than 3 mol %, less than 2 mol %, or less than 1 mol % of a heptanoic acid primary hexyl ester; or alternatively, a heptanoic acid 1-hexyl ester. In a further embodiment, the compositions described herein comprising heptanoic acid secondary hexyl esters can comprise less than or equal to 14 mol %, less than or equal to 12 mol %, less than or equal to 10 mol %, less than or equal to 8 mol %, or less than or equal to 6 mol % $C_{12}$ olefins. In still a further embodiment, the compositions described herein comprising heptanoic acid secondary hexyl esters can comprise from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{12}$ olefins.

In an embodiment, the compositions described herein can comprise at least 75 mol %, at least 80 mol %, at least 85 mol %, at least 90 mol %, or at least 92 mol % heptanoic acid secondary octyl esters. In an embodiment, the heptanoic acid secondary octyl esters can comprise (a) from 30 mol % to 60 mol %, from 35 mol % to 55 mol %, or from 40 mol % to 50 mol % of a heptanoic acid 2-octyl ester and (b) from 40 mol % to 70 mol %, from 45 mol % to 65 mol %, or from 50 mol % to 60 mol % of a heptanoic acid 3-octyl ester and/or a heptanoic acid 4-octyl ester; alternatively, from 30 mol % to 60 mol % of a heptanoic acid 2-octyl ester, from 20 mol % to 40 mol % of a heptanoic acid 3-octyl ester, and from 15 mol % to 30 mol % of a heptanoic acid 4-octyl ester; alternatively, from 35 mol % to 55 mol % of a heptanoic acid 2-octyl ester, from 22.5 mol % to 37.5 mol % of a heptanoic acid 3-octyl ester, and from 17.5 mol % to 27.5 mol % of a heptanoic acid 4-octyl ester; or alternatively, from 40 mol % to 50 mol % of a heptanoic acid 2-octyl ester, from 25 mol % to 35 mol % of a heptanoic acid 3-octyl ester, and from 20 mol % to 25 mol % of a heptanoic acid 4-octyl ester. In some embodiments, the compositions described herein comprising heptanoic acid secondary octyl esters can comprise less than 5 mol %, less than 4 mol %, less than 3 mol %, less than 2 mol %, or less than 1 mol % of a heptanoic acid primary octyl ester; or alternatively, a heptanoic acid 1-decyl ester. In a further embodiment, the compositions described herein comprising heptanoic acid secondary octyl esters can comprise less than or equal to 14 mol %, less than or equal to 12 mol %, less than or equal to 10 mol %, less than or equal to 8 mol %, or less than or equal to 6 mol % $C_{16}$ olefins. In still a further embodiment, the compositions described herein comprising heptanoic acid secondary octyl esters can comprise from 1 mol % to 14 mol %, from 1 mol % to 12 mol %, from 2 mol % to 12 mol %, from 2 mol % to 10 mol %, from 3 mol % to 10 mol % $C_{16}$, or from 3 mol % to 8 mol % $C_{16}$ olefins.

In an embodiment, the compositions described herein can comprise at least 75 mol %, at least 80 mol %, at least 85 mol %, at least 90 mol %, or at least 92 mol % heptanoic acid secondary decyl esters. In an embodiment, the heptanoic acid secondary decyl esters can comprise (a) from 25 mol % to 55 mol %, from 30 mol % to 50 mol %, or from 35 mol % to 45 mol % of a heptanoic acid 2-decyl ester and (b) from 45 mol % to 75 mol %, from 50 mol % to 70 mol %, or from 55 mol % to 65 mol % of a heptanoic acid 3-decyl ester, a heptanoic acid 4-decyl ester, and/or a heptanoic acid 5-decyl ester; alternatively, from 25 mol % to 55 mol % of a heptanoic acid 2-decyl ester, from 15 mol % to 35 mol % of a heptanoic acid 3-decyl ester, from 10 mol % to 30 mol % of a heptanoic acid 4-decyl ester, and from 5 mol % to 25 mol % of a heptanoic acid 5-decyl ester; alternatively, from 30 mol % to 50 mol % of a heptanoic acid 2-decyl ester, from 17.5 mol % to 32.5 mol % of a heptanoic acid 3-decyl ester, from 12.5 mol % to 27.5 mol % of a heptanoic acid 4-decyl ester, and from 7.5 mol % to 22.5 mol % of a heptanoic acid 5-decyl ester; or alternatively, from 35 mol % to 45 mol % of a heptanoic acid 2-decyl ester, from 20 mol % to 30 mol % of a heptanoic acid 3-decyl ester, from 15 mol % to 25 mol % of a heptanoic acid 4-decyl ester, and from 10 mol % to 20 mol % of a heptanoic acid 5-decyl ester. In some embodiments, the compositions described herein comprising heptanoic acid secondary decyl esters can comprise less than 5 mol %, less than 4 mol %, less than 3 mol %, less than 2 mol %, or less than 1 mol % of a heptanoic acid primary decyl ester; or alternatively, a heptanoic acid 1-decyl ester. In a further embodiment, the compositions described herein comprising heptanoic acid secondary decyl esters can comprise less than or equal to 14 mol %, less than or equal to 12 mol %, less than or equal to 10 mol %, less than or equal to 8 mol %, or less than or equal to 6 mol % $C_{20}$ olefins. In still a further embodiment, the compositions described herein comprising heptanoic acid secondary decyl esters can comprise from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{20}$ olefins.

In an embodiment, the compositions described herein can comprise at least 75 mol %, at least 80 mol %, at least 85 mol %, at least 90 mol %, or at least 92 mol % heptanoic acid secondary dodecyl esters. In an embodiment, the heptanoic acid secondary dodecyl esters can comprise from (a) 20 mol % to 50 mol %, from 25 mol % to 45 mol %, or from 30 mol % to 40 mol % of a heptanoic acid 2-dodecyl ester and (b) from 50 mol % to 80 mol %, from 55 mol % to 75 mol %, or from 60 mol % to 70 mol % of a heptanoic acid 3-dodecyl ester, a heptanoic acid 4-dodecyl ester, a heptanoic acid 5-dodecyl ester, and/or a heptanoic acid 6-dodecyl ester; alternatively, from 20 mol % to 50 mol % of a heptanoic acid 2-dodecyl ester, from 10 mol % to 30 mol % of a heptanoic acid 3-dodecyl ester, from 5 mol % to 25 mol % of a heptanoic acid 4-dodecyl ester, from 5 mol % to 25 mol % of a heptanoic acid 5-dodecyl ester, and from 5 mol % to 25 mol % of a heptanoic acid 6-dodecyl ester; alternatively, from 25 mol % to 45 mol % of a heptanoic acid 2-dodecyl ester, from 12.5 mol % to 27.5 mol % of a heptanoic acid 3-dodecyl ester, from 7.5 mol % to 22.5 mol % of a heptanoic acid 4-dodecyl ester, from 7.5 mol % to 22.5 mol % of a heptanoic acid 5-dodecyl ester, and from 7.5 mol % to 22.5 mol % of a heptanoic acid 6-dodecyl ester; or alternatively, from 30 mol % to 40 mol % of a heptanoic acid 2-dodecyl ester, from 15 mol % to 25 mol % of a heptanoic acid 3-dodecyl ester, from 10 mol % to 20 mol % of a heptanoic acid 4-dodecyl ester, from 10 mol % to 20 mol % of a heptanoic acid 5-dodecyl ester, and from 10 mol % to 20 mol % of a heptanoic acid 6-dodecyl ester. In some embodiments, the compositions described herein comprising heptanoic acid secondary dodecyl esters can comprise less than 5 mol %, less than 4 mol %, less than 3 mol %, less than 2 mol %, or less than 1 mol % of a heptanoic acid primary decyl ester; or alternatively, a heptanoic acid 1-decyl ester. In a further embodiment, the compositions described herein comprising heptanoic acid secondary dodecyl esters can comprise less than or equal to 14 mol %, less than or equal to 12 mol %, less than or equal to 10 mol %, less than or equal to 8 mol %, or less than or equal to 6 mol % $C_{24}$ olefins. In still a further embodiment, the compositions described herein comprising heptanoic acid secondary dodecyl esters can comprise from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{24}$ olefins.

In an embodiment, the compositions described herein can comprise at least 75 mol %, at least 80 mol %, at least 85 mol %, at least 90 mol %, or at least 92 mol % nonanoic acid secondary $C_6$ to $C_{12}$ esters. In an embodiment, the nonanoic acid secondary $C_6$ to $C_{12}$ esters can comprise, consist essentially of, or can be, a nonanoic acid secondary hexyl ester, a nonanoic acid secondary heptyl ester, a nonanoic acid secondary octyl ester, a nonanoic acid secondary nonyl ester, a nonanoic acid secondary decyl ester, a nonanoic acid secondary undecyl ester, a nonanoic acid secondary dodecyl ester, or combinations thereof; alternatively, a nonanoic acid secondary hexyl ester, a nonanoic acid secondary octyl ester, a nonanoic acid secondary decyl ester, a nonanoic acid secondary dodecyl ester, or combinations thereof; alternatively, a nonanoic acid secondary hexyl ester; alternatively, a nonanoic acid secondary octyl ester; alternatively, a nonanoic acid secondary decyl ester, or alternatively, a nonanoic acid secondary dodecyl ester. In some embodiments, the nonanoic acid secondary $C_6$ to $C_{12}$ esters can comprise, consist essentially of, or can be, a nonanoic acid secondary octyl ester, a nonanoic acid secondary decyl ester, a nonanoic acid secondary dodecyl ester, or combinations thereof; alternatively, a nonanoic acid secondary octyl ester, a nonanoic acid secondary decyl ester, or combinations thereof; alternatively, a nonanoic acid secondary octyl ester, a nonanoic acid secondary dodecyl ester, or combinations thereof; or alternatively, a nonanoic acid secondary decyl ester, a nonanoic acid secondary dodecyl ester, or combinations thereof.

In an embodiment, the nonanoic acid secondary $C_6$ to $C_{12}$ esters can comprise nonanoic acid linear secondary $C_6$ to $C_{12}$ esters. In an embodiment, the nonanoic acid secondary $C_6$ to $C_{12}$ esters can comprise at least 90 mol %, at least 92 mol %, at least 94 mol %, at least 96 mol %, or at least 98 mol % nonanoic acid linear secondary $C_6$ to $C_{12}$ esters.

In an embodiment, the nonanoic acid secondary hexyl esters can comprise, consist essentially of, or can be, a nonanoic acid secondary 2-hexyl ester and/or a nonanoic acid 3-hexyl ester. In an embodiment, the nonanoic acid secondary heptyl esters can comprise, consist essentially of, or can be, a nonanoic acid 2-heptyl ester, a nonanoic acid 3-heptyl ester, and/or a nonanoic acid 4-heptyl ester. In an embodiment, the nonanoic acid secondary octyl esters can comprise, consist essentially of, or can be, a nonanoic acid 2-octyl ester, a nonanoic acid 3-octyl ester, and/or a nonanoic acid 4-octyl ester. In an embodiment, the nonanoic acid secondary nonyl esters can comprise, consist essentially of, or can be, a nonanoic acid 2-nonyl ester, a nonanoic acid 3-nonyl ester, a nonanoic acid 4-nonyl ester, and/or a nonanoic acid 5-nonyl ester. In an embodiment, the nonanoic acid secondary decyl esters can comprise, consist essentially of, or can be, a nonanoic acid 2-decyl ester, a nonanoic acid 3-decyl ester, a nonanoic acid 4-decyl ester, and/or a nonanoic acid 5-decyl ester. In an embodiment, the nonanoic acid secondary undecyl esters can comprise, consist essentially of, or can be, a nonanoic acid 2-undecyl ester, a nonanoic acid 3-undecyl ester, a nonanoic acid 4-undecyl ester, nonanoic acid 5-undecyl ester, and/or a nonanoic acid 6-undecyl ester. In an embodiment, the nonanoic acid secondary dodecyl esters can comprise, consist essentially of, or can be, a nonanoic acid 2-dodecyl ester, a nonanoic acid 3-dodecyl ester, a nonanoic acid 4-dodecyl ester, nonanoic acid 5-dodecyl ester, and/or a nonanoic acid 6-dodecyl ester.

In an embodiment, the compositions described herein comprising nonanoic acid secondary $C_6$ to $C_{12}$ esters can comprise less than 5 mol %, less than 4 mol %, less than 3 mol %, less than 2 mol %, or less than 1 mol % of nonanoic acid primary $C_6$ to $C_{12}$ esters; or alternatively, nonanoic acid linear primary $C_6$ to $C_{12}$ esters. In an embodiment, the compositions described herein comprising heptanoic acid secondary $C_6$ to $C_{12}$ esters can comprise less than 5 mol %, less than 4 mol %, less than 3 mol %, less than 2 mol %, or less than 1 mol % of a nonanoic acid primary $C_6$ to $C_{12}$ ester; or alternatively, a nonanoic acid linear primary $C_6$ to $C_{12}$ ester. In an embodiment, the compositions described herein comprising heptanoic acid secondary $C_6$ to $C_{12}$ esters can comprise less than 5 mol %, less than 4 mol %, less than 3 mol %, less than 2 mol %, or less than 1 mol % of a nonanoic acid 1-hexyl ester, a nonanoic acid 1-heptyl ester, a nonanoic acid 1-octyl ester, a nonanoic acid 1-nonyl ester, a nonanoic acid 1-decyl ester, a nonanoic acid 1-undecyl ester, a nonanoic acid 1-dodecyl ester, or combinations thereof; alternatively, a nonanoic acid 1-hexyl ester, a nonanoic acid 1-octyl ester, a nonanoic acid 1-decyl ester, a nonanoic acid 1-dodecyl ester, or combinations thereof; alternatively, a nonanoic acid 1-hexyl ester; alternatively, a nonanoic acid 1-octyl ester; alternatively, a nonanoic acid 1-decyl ester; or alternatively, a nonanoic acid 1-dodecyl ester. In some embodiments, the compositions described herein comprising nonanoic acid secondary $C_6$ to $C_{12}$ esters can comprise less than 5 mol %, less than 4 mol %, less than 3 mol %, less than 2 mol %, or less than 1 mol % of a nonanoic acid 1-octyl ester, a nonanoic acid 1-decyl ester, a nonanoic acid 1-dodecyl ester, or combinations thereof; alternatively, a nonanoic acid 1-octyl ester, a nonanoic acid 1-decyl ester, or combinations thereof; alternatively, a nonanoic acid 1-octyl ester, a nonanoic acid 1-dodecyl ester, or combinations thereof; or alternatively, a nonanoic acid 1-decyl ester, a nonanoic acid 1-dodecyl ester, or combinations thereof. In further embodiments, the compositions described herein comprising nonanoic acid secondary $C_6$ to $C_{12}$ esters can comprise less than or equal to 14 mol %, less than or equal to 12 mol %, less than or equal to 10 mol %, less than or equal to 8 mol %, or less than or equal to 6 mol % $C_{12}$ to $C_{24}$ olefins; alternatively, $C_{16}$ to $C_{24}$ olefins; alternatively, $C_{12}$ to $C_{16}$ olefins; alternatively, $C_{16}$ to $C_{20}$ olefins; alternatively;

$C_{20}$ to $C_{24}$ olefins; alternatively, $C_{12}$ olefins; alternatively, $C_{16}$ olefins; alternatively, $C_{20}$ olefins; or alternatively, $C_{24}$ olefins.

In an embodiment, the compositions described herein can comprise at least 75 mol %, at least 80 mol %, at least 85 mol %, at least 90 mol %, or at least 92 mol % nonanoic acid secondary hexyl esters. In an embodiment, the nonanoic acid secondary hexyl esters can comprise from 45 mol % to 75 mol % of a nonanoic acid 2-hexyl ester and from 25 mol % to 55 mol % of a nonanoic acid 3-hexyl ester; alternatively, from 50 mol % to 70 mol % of a nonanoic acid 2-hexyl ester and from 30 mol % to 50 mol % of a nonanoic acid 3-hexyl ester; or alternatively, from 55 mol % to 65 mol % of a nonanoic acid 2-hexyl ester and from 35 mol % to 45 mol % of a nonanoic acid 3-hexyl ester. In some embodiments, the compositions described herein comprising nonanoic acid secondary hexyl esters can comprise less than 5 mol %, less than 4 mol %, less than 3 mol %, less than 2 mol %, or less than 1 mol % of a nonanoic acid primary hexyl ester; or alternatively, a nonanoic acid 1-hexyl ester. In a further embodiment, the compositions described herein comprising nonanoic acid secondary hexyl esters can comprise less than or equal to 14 mol %, less than or equal to 12 mol %, less than or equal to 10 mol %, less than or equal to 8 mol %, or less than or equal to 6 mol % $C_{12}$ olefins. In still a further embodiment, the compositions described herein comprising nonanoic acid secondary hexyl esters can comprise from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{12}$ olefins.

In an embodiment, the compositions described herein can comprise at least 75 mol %, at least 80 mol %, at least 85 mol %, at least 90 mol %, or at least 92 mol % nonanoic acid secondary octyl esters. In an embodiment, the nonanoic acid secondary octyl esters can comprise (a) from 30 mol % to 60 mol %, from 35 mol % to 55 mol %, or from 40 mol % to 50 mol % of a nonanoic acid 2-octyl ester and (b) from 40 mol % to 70 mol %, from 45 mol % to 65 mol %, or from 50 mol % to 60 mol % of a nonanoic acid 3-octyl ester and/or a nonanoic acid 4-octyl ester; alternatively, from 30 mol % to 60 mol % of a nonanoic acid 2-octyl ester, from 20 mol % to 40 mol % of a nonanoic acid 3-octyl ester, and from 15 mol % to 30 mol % of a nonanoic acid 4-octyl ester; alternatively, from 35 mol % to 55 mol % of a nonanoic acid 2-octyl ester, from 22.5 mol % to 37.5 mol % of a nonanoic acid 3-octyl ester, and from 17.5 mol % to 27.5 mol % of a nonanoic acid 4-octyl ester; or alternatively, from 40 mol % to 50 mol % of a nonanoic acid 2-octyl ester, from 25 mol % to 35 mol % of a nonanoic acid 3-octyl ester, and from 20 mol % to 25 mol % of a nonanoic acid 4-octyl ester. In some embodiments, the compositions described herein comprising nonanoic acid secondary octyl esters can comprise less than 5 mol %, less than 4 mol %, less than 3 mol %, less than 2 mol %, or less than 1 mol % of a nonanoic acid primary octyl ester; or alternatively, a nonanoic acid 1-octyl ester. In a further embodiment, the compositions described herein comprising nonanoic acid secondary octyl esters can comprise less than or equal to 14 mol %, less than or equal to 12 mol %, less than or equal to 10 mol %, less than or equal to 8 mol %, or less than or equal to 6 mol % $C_{16}$ olefins. In still a further embodiment, the compositions described herein comprising nonanoic acid secondary octyl esters can comprise from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{16}$ olefins.

In an embodiment, the compositions described herein can comprise at least 75 mol %, at least 80 mol %, at least 85 mol %, at least 90 mol %, or at least 92 mol % nonanoic acid secondary decyl esters. In an embodiment, the nonanoic acid secondary decyl esters can comprise (a) from 25 mol % to 55 mol %, from 30 mol % to 50 mol %, or from 35 mol % to 45 mol % of a nonanoic acid 2-decyl ester and (b) from 45 mol % to 75 mol %, from 50 mol % to 70 mol %, or from 55 mol % to 65 mol % of a nonanoic acid 3-decyl ester, a nonanoic acid 4-decyl ester, and/or a nonanoic acid 5-decyl ester; alternatively, from 25 mol % to 55 mol % of a nonanoic acid 2-decyl ester, from 15 mol % to 35 mol % of a nonanoic acid 3-decyl ester, from 10 mol % to 30 mol % of a nonanoic acid 4-decyl ester, and from 5 mol % to 25 mol % of a nonanoic acid 5-decyl ester; alternatively, from 30 mol % to 50 mol % of a nonanoic acid 2-decyl ester, from 17.5 mol % to 32.5 mol % of a nonanoic acid 3-decyl ester, from 12.5 mol % to 27.5 mol % of a nonanoic acid 4-decyl ester, and from 7.5 mol % to 22.5 mol % of a nonanoic acid 5-decyl ester; or alternatively, from 35 mol % to 45 mol % of a nonanoic acid 2-decyl ester, from 20 mol % to 30 mol % of a nonanoic acid 3-decyl ester, from 15 mol % to 25 mol % of a nonanoic acid 4-decyl ester, and from 10 mol % to 20 mol % of a nonanoic acid 5-decyl ester. In some embodiments, the compositions described herein comprising nonanoic acid secondary decyl esters can comprise less than 5 mol %, less than 4 mol %, less than 3 mol %, less than 2 mol %, or less than 1 mol % of a nonanoic acid primary decyl ester; or alternatively, a nonanoic acid 1-decyl ester. In a further embodiment, the compositions described herein comprising nonanoic acid secondary decyl esters can comprise less than or equal to 14 mol %, less than or equal to 12 mol %, less than or equal to 10 mol %, less than or equal to 8 mol %, or less than or equal to 6 mol % $C_{20}$ olefins. In still a further embodiment, the compositions described herein comprising nonanoic acid secondary decyl esters can comprise from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{20}$ olefins.

In an embodiment, the compositions described herein can comprise at least 75 mol %, at least 80 mol %, at least 85 mol %, at least 90 mol %, or at least 92 mol % nonanoic acid secondary dodecyl esters. In an embodiment, the nonanoic acid secondary dodecyl esters can comprise (a) from 20 mol % to 50 mol %, from 25 mol % to 45 mol %, or from 30 mol % to 40 mol % of a nonanoic acid 2-dodecyl ester and (b) from 50 mol % to 80 mol %, from 55 mol % to 75 mol %, or from 60 mol % to 70 mol % of a nonanoic acid 3-dodecyl ester, a nonanoic acid 4-dodecyl ester, a nonanoic acid 5-dodecyl ester, and/or a nonanoic acid 6-dodecyl ester; alternatively, from 20 mol % to 50 mol % of a nonanoic acid 2-dodecyl ester, from 10 mol % to 30 mol % of a nonanoic acid 3-dodecyl ester, from 5 mol % to 25 mol % of a nonanoic acid 4-dodecyl ester, from 5 mol % to 25 mol % of a nonanoic acid 5-dodecyl ester, and from 5 mol % to 25 mol % of a nonanoic acid 6-dodecyl ester; alternatively, from 25 mol % to 45 mol % of a nonanoic acid 2-dodecyl ester, from 12.5 mol % to 27.5 mol % of a nonanoic acid 3-dodecyl ester, from 7.5 mol % to 22.5 mol % of a nonanoic acid 4-dodecyl ester, from 7.5 mol % to 22.5 mol % of a nonanoic acid 5-dodecyl ester, and from 7.5 mol % to 22.5 mol % of a nonanoic acid 6-dodecyl ester; or alternatively, from 30 mol % to 40 mol % of a nonanoic acid 2-dodecyl ester, from 15 mol % to 25 mol % of a nonanoic acid 3-dodecyl ester, from 10 mol % to 20 mol % of a nonanoic acid 4-dodecyl ester, from 10 mol % to 20 mol % of a nonanoic acid 5-dodecyl ester, and from 10 mol % to 20 mol % of a nonanoic acid 6-dodecyl ester. In some embodiments, the compositions described herein comprising nonanoic acid secondary dodecyl esters can comprise less than 5 mol %, less than 4 mol %, less than 3 mol %, less than 2 mol %, or less than 1 mol % of a nonanoic acid primary dodecyl ester; or alternatively, a nonanoic acid 1-dodecyl ester. In a further embodiment, the compositions described herein comprising nonanoic acid secondary dodecyl esters can comprise less than or equal to 14 mol %, less than or equal to 12 mol %, less than or equal to 10 mol %, less than or equal to 8 mol %, or less than or equal to 6 mol % $C_{24}$ olefins. In still a further embodiment, the compositions described herein comprising nonanoic acid secondary dodecyl esters can comprise from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{24}$ olefins.

In an embodiment, any composition comprising $C_6$ to $C_9$ monocarboxylic acid secondary $C_6$ to $C_{12}$ esters (general or specific) disclosed herein can have a pour point of below $-40°$ C.; below $-50°$ C.; below $-60°$ C.; below $-70°$ C.; or below $-80°$ C. Generally, the pour point of a composition (e.g., any composition comprising $C_6$ to $C_9$ monocarboxylic acid secondary $C_6$ to $C_{12}$ esters disclosed herein) is an indication of the lowest temperature of the utility of such product for certain applications. The pour point of a liquid is generally the temperature at which it becomes semi-solid and loses its flow characteristics. The pour point of the compositions described herein can be measured using ASTM D97-12.

In an embodiment, any composition comprising $C_6$ to $C_9$ monocarboxylic acid secondary $C_6$ to $C_{12}$ esters (general or specific) disclosed herein can have a $100°$ C. kinematic viscosity of from 0.7 cSt to 2.5 cSt, from 0.75 cSt to 2.25 cSt, or from 0.8 cSt to 2 cSt. Generally, the viscosity of a fluid (e.g., any composition comprising $C_6$ to $C_9$ monocarboxylic acid secondary $C_6$ to $C_{12}$ esters disclosed herein) is a measure of its resistance to gradual deformation (e.g., flow) by shear stress at a given temperature. Kinematic viscosity generally refers to the ratio of viscosity to density for a particular fluid at a given temperature. The $100°$ C. kinematic viscosity of the compositions described herein can be measured using ASTM D445-12.

In an embodiment, any composition comprising $C_6$ to $C_9$ monocarboxylic acid secondary $C_6$ to $C_{12}$ esters disclosed herein can be characterized by a $LC_{50}$ sediment toxicological ratio less than 1, less than 0.9, less than 0.8, less than 0.7, less than 0.6, or less than 0.5. The $LC_{50}$ sediment toxicological ratio refers to a ratio of an $LC_{50}$ sediment toxicity value for a reference fluid divided by an $LC_{50}$ sediment toxicity value for the studied sample (e.g., any composition comprising $C_6$ to $C_9$ monocarboxylic acid secondary $C_6$ to $C_{12}$ esters disclosed herein). For non-aqueous-based drilling fluids, the reference fluid is the standard synthetic reference fluid "$C_{16}$ and $C_{18}$ Internal Olefin" (i.e., a 65/35 blend, proportioned by mass, of internal hexadecenes (Chemical Abstract Service No. 26952-14-7) and internal octadecenes (Chemical Abstract Service No. 27070-568-2), respectively). The $LC_{50}$ sediment toxicological ratio is determined by separately and simultaneously evaluating the sediment toxicity of the studied sample and the "$C_{16}$ and $C_{18}$ Internal Olefin" standard synthetic reference fluid using ASTM E1367-92. $LC_{50}$ sediment toxicity generally involves tests using estuarine or marine organisms (e.g., marine amphipods) in the laboratory to evaluate the toxicity of contaminants (e.g., secondary esters) in sediments. An $LC_{50}$ sediment toxicological ratio of equal to or less than 1 means that the studied sample is not more toxic than the reference fluid as measured by the $LC_{50}$ sediment toxicity test. The $LC_{50}$ sediment toxicity test and the determination of the $LC_{50}$ sediment toxicological ratio are performed in accordance to the Method for Conducting a Sediment Toxicity Test with *Leptocheirus plumulosus* and Non Aqueous Fluid on Synthetic Base Drilling Muds (Appendix A) of the Requirements for NPDES General Permit for New and Existing Sources and New Dischargers in the Offshore Subcategory of the Oil and Gas Extraction Category for the Western Portion of the Outer Continental Shelf of the Gulf of Mexico (GMG290000) with the exception that the tests are performed on the non-aqueous base fluid rather than a formulated drilling mud.

Disclosed herein are processes for forming any composition comprising $C_6$ to $C_9$ monocarboxylic acid secondary $C_6$ to $C_{12}$ esters described herein. In an embodiment, the process can comprise (a) contacting i) a carboxylic acid feedstock comprising, consisting essentially of, or consisting of, a $C_6$ to $C_9$ monocarboxylic acid (e.g., a carboxylic acid feedstock comprising, consisting essentially of, or consisting of, at least 80 mol %, at least 85 mol %, at least 90 mol %, or at least 95 mol % of $C_6$ to $C_9$ monocarboxylic acids), ii) an olefin feedstock comprising, consisting essentially of, or consisting of, $C_6$ to $C_{12}$ monoolefins (e.g., an olefin feedstock comprising, consisting essentially of, or consisting of, at least 80 mol %, at least 85 mol %, at least 90 mol %, or at least 95 mol % of $C_6$ to $C_{12}$ monoolefins), and iii) a solid acid catalyst; and (b) forming, in the substantial absence of water, a mixture comprising $C_6$ to $C_9$ monocarboxylic acid secondary $C_6$ to $C_{12}$ esters. In some embodiments, the mixture comprising $C_6$ to $C_9$ monocarboxylic acid secondary $C_6$ to $C_{12}$ esters can further comprise $C_6$ to $C_9$ monocarboxylic acid primary $C_6$ to $C_{12}$ esters and/or $C_{12}$ to $C_{24}$ olefins. In yet other embodiments, the mixture can further comprise unconverted feedstock olefins and/or $C_6$ to $C_9$ monocarboxylic acids. In some embodiments, the process can further comprise isolating a composition comprising at least 75 mol %, at least 80 mol %, at least 85 mol %, at least 90 mol %, or at least 92 mol % $C_6$ to $C_9$ monocarboxylic acid secondary $C_6$ to $C_{12}$ esters from the mixture. In some embodiments, the composition comprising at least 75 mol %, at least 80 mol %, at least 85 mol %, at least 90 mol %, or at least 92 mol % $C_6$ to $C_9$ monocarboxylic acid secondary $C_6$ to $C_{12}$ esters isolated from the mixture can further comprise $C_6$ to $C_9$ monocarboxylic acid primary $C_6$ to $C_{12}$ esters and/or $C_{12}$ to $C_{24}$ olefins. The carboxylic acid feedstocks (general or specific), olefin feedstocks (general or specific), solid acid catalysts (general or specific), the $C_6$ to $C_9$ monocarboxylic acid secondary $C_6$ to $C_{12}$ esters (general or specific), the $C_6$ to $C_9$ monocarboxylic acid primary $C_6$ to $C_{12}$ esters (general or specific), the $C_{12}$ to $C_{24}$ olefins (general or specific), and the compositions comprising $C_6$ to $C_9$ monocarboxylic acid secondary $C_6$ to $C_{12}$ esters (general or specific), and conditions for forming the compositions comprising $C_6$ to $C_9$ monocarboxylic acid secondary $C_6$ to $C_{12}$ esters (general or specific), are independently described herein and can be utilized to further describe processes that form the compositions comprising $C_6$ to $C_9$ monocarboxylic acid secondary $C_6$ to $C_{12}$ esters (general or specific) described herein. For purposes of the disclosure herein, the "substantial absence of water" means that the mixture including the carboxylic acid feedstock, olefin feedstock, and the solid acid catalyst contains less than 1 wt. %, less than 0.8 wt. %, less than 0.6 wt. %, less than 0.5 wt. %, less than 0.4 wt. %, less than 0.3 wt.

%, or less than 0.2 wt. % water. Generally, the amount of water in the mixture is based upon the total weight of the mixture.

In an embodiment, the process can comprise (a) contacting i) a carboxylic acid feedstock comprising, consisting essentially of, or consisting of, a heptanoic acid, a nonanoic acid, or combinations thereof, ii) an olefin feedstock comprising, consisting essentially of, or consisting of, $C_6$ to $C_{12}$ monoolefins, and iii) a solid acid catalyst; and (b) forming, in the substantial absence of water, a mixture comprising heptanoic acid secondary $C_6$ to $C_{12}$ esters, nonanoic acid secondary $C_6$ to $C_{12}$ esters, or combinations thereof. In some embodiments, the mixture comprising heptanoic acid secondary $C_6$ to $C_{12}$ esters, nonanoic acid secondary $C_6$ to $C_{12}$ esters, or combinations thereof can further comprise heptanoic acid primary $C_6$ to $C_{12}$ esters, nonanoic acid primary $C_6$ to $C_{12}$ esters, or combinations thereof and/or $C_{12}$ to $C_{24}$ olefins. In yet other embodiments, the mixture can further comprise unconverted feedstock olefins and/or heptanoic acid, nonanoic acid, or combinations thereof. In some embodiments, the process can further comprise isolating from the mixture a composition comprising at least 75 mol %, at least 80 mol %, at least 85 mol %, at least 90 mol %, or at least 92 mol % heptanoic acid secondary $C_6$ to $C_{12}$ esters, nonanoic acid secondary $C_6$ to $C_{12}$ esters, or combinations thereof. In some embodiments, the compositions comprising at least 75 mol %, at least 80 mol %, at least 85 mol %, at least 90 mol %, or at least 92 mol % heptanoic acid secondary $C_6$ to $C_{12}$ esters, nonanoic acid secondary $C_6$ to $C_{12}$ esters, or combinations thereof isolated from the mixture can further comprise heptanoic acid primary $C_6$ to $C_{12}$ esters, nonanoic acid primary $C_6$ to $C_{12}$ esters, or combinations thereof, and/or $C_{12}$ to $C_{24}$ olefins. Heptanoic acids (general and specific), nonanoic acids (general and specific), $C_6$ to $C_{12}$ olefins (general and specific), heptanoic acid secondary $C_6$ to $C_{12}$ esters (general and specific), nonanoic acid secondary $C_6$ to $C_{12}$ esters (general and specific), and compositions comprising at least 75 mol %, at least 80 mol %, at least 85 mol %, at least 90 mol %, or at least 92 mol % heptanoic acid secondary $C_6$ to $C_{12}$ esters (general and specific), nonanoic acid secondary $C_6$ to $C_{12}$ esters (general and specific), or combinations thereof, are independently described herein and can be utilized to further describe processes that form the compositions comprising heptanoic acid secondary $C_6$ to $C_{12}$ esters (general or specific), nonanoic acid secondary $C_6$ to $C_{12}$ esters (general and specific), or combinations thereof, described herein.

In an embodiment, the process can comprise (a) contacting i) a carboxylic acid feedstock comprising, consisting essentially of, or consisting of, a heptanoic acid, ii) an olefin feedstock comprising, consisting essentially of, or consisting of, $C_6$ to $C_{12}$ monoolefins, and iii) a solid acid catalyst; and (b) forming, in the substantial absence of water, a mixture comprising heptanoic acid secondary $C_6$ to $C_{12}$ esters. In some embodiments, the mixture comprising heptanoic acid secondary $C_6$ to $C_{12}$ esters can further comprise heptanoic acid primary $C_6$ to $C_{12}$ esters and/or $C_{12}$ to $C_{24}$ olefins. In yet other embodiments, the mixture can further comprise unconverted feedstock olefins and/or heptanoic acid. In some embodiments, the process can further comprise isolating a composition comprising at least 75 mol %, at least 80 mol %, at least 85 mol %, at least 90 mol %, or at least 92 mol % heptanoic acid secondary $C_6$ to $C_{12}$ esters from the mixture. In some embodiments, the compositions comprising at least 75 mol %, at least 80 mol %, at least 85 mol %, at least 90 mol %, or at least 92 mol % heptanoic acid secondary $C_6$ to $C_{12}$ esters isolated from the mixture can further comprise heptanoic acid primary $C_6$ to $C_{12}$ esters and/or $C_{12}$ to $C_{24}$ olefins. Heptanoic acids (general and specific), $C_6$ to $C_{12}$ olefins (general and specific), heptanoic acid secondary $C_6$ to $C_{12}$ esters (general and specific), and compositions comprising at least 75 mol %, at least 80 mol %, at least 85 mol %, at least 90 mol %, or at least 92 mol % comprising heptanoic acid secondary $C_6$ to $C_{12}$ esters are independently described herein and can be utilized to further describe processes that form the compositions comprising heptanoic acid secondary $C_6$ to $C_{12}$ esters (general or specific) described herein.

In an embodiment, the process can comprise (a) contacting i) a carboxylic acid feedstock comprising, consisting essentially of, or consisting of, a nonanoic acid, ii) an olefin feedstock comprising, consisting essentially of, or consisting of, $C_6$ to $C_{12}$ monoolefins, and iii) a solid acid catalyst; and (b) forming, in the substantial absence of water, a mixture comprising nonanoic acid secondary $C_6$ to $C_{12}$ esters. In some embodiments, the mixture comprising nonanoic acid secondary $C_6$ to $C_{12}$ esters can further comprise nonanoic acid primary $C_6$ to $C_{12}$ esters and/or $C_{12}$ to $C_{24}$ olefins. In yet other embodiments, the mixture can further comprise unconverted feedstock olefins and/or nonanoic acid. In some embodiments, the process can further comprise isolating a composition comprising at least 75 mol %, at least 80 mol %, at least 85 mol %, at least 90 mol %, or at least 92 mol % nonanoic acid secondary $C_6$ to $C_{12}$ esters from the mixture. In some embodiments, the compositions comprising at least 75 mol %, at least 80 mol %, at least 85 mol %, at least 90 mol %, or at least 92 mol % nonanoic acid secondary $C_6$ to $C_{12}$ esters isolated from the mixture can further comprise nonanoic acid primary $C_6$ to $C_{12}$ esters and/or $C_{12}$ to $C_{24}$ olefins. Nonanoic acids (general and specific), $C_6$ to $C_{12}$ olefins (general and specific), nonanoic acid secondary $C_6$ to $C_{12}$ esters (general and specific), and compositions comprising at least 75 mol %, at least 80 mol %, at least 85 mol %, at least 90 mol %, or at least 92 mol % nonanoic acid secondary $C_6$ to $C_{12}$ esters are independently described herein and can be utilized to further describe processes that form the compositions comprising nonanoic acid secondary $C_6$ to $C_{12}$ esters (general or specific) described herein.

In an embodiment, the carboxylic acid feedstock for the process to produce compositions comprising $C_6$ to $C_9$ monocarboxylic acid secondary $C_6$ to $C_{12}$ esters can comprise, consist essentially of, or consist of, a $C_6$ to $C_9$ monocarboxylic acid; alternatively, a hexanoic acid, a heptanoic acid, an octanoic acid, a nonanoic acid, or combinations thereof; alternatively, a heptanoic acid, an octanoic acid, a nonanoic acid, or combinations thereof; alternatively, a hexanoic acid; alternatively, a heptanoic acid; alternatively, an octanoic acid; or alternatively, a nonanoic acid. In some embodiments, the carboxylic acid feedstock can comprise, consist essentially of, or consist of, n-hexanoic acid, n-heptanoic acid, n-octanoic acid, n-nonanoic acid, or combinations thereof; alternatively, n-heptanoic acid, n-octanoic acid, n-nonanoic acid, or combinations thereof; alternatively, n-hexanoic acid; alternatively, n-heptanoic acid; alternatively, n-octanoic acid; or alternatively, n-nonanoic acid. In other embodiments, the carboxylic acid feedstock can comprise, consist essentially of, or consist of, at least 80 mol %, at least 85 mol %, at least 90 mol %, or at least 95 mol % of a hexanoic acid, a heptanoic acid, an octanoic acid, a nonanoic acid, or combinations thereof; alternatively, a heptanoic acid, an octanoic acid, a nonanoic acid, or combinations thereof; alternatively, a hexanoic acid; alternatively, a heptanoic acid; alternatively, an octanoic acid, alternatively, a nonanoic acid; alternatively, n-hexanoic acid, n-heptanoic acid, n-octanoic acid, n-nonanoic acid, or combinations thereof; alternatively, n-heptanoic acid, n-octanoic acid, n-nonanoic acid, or combinations thereof; alternatively, n-hexanoic acid; alternatively, n-heptanoic acid; alternatively, n-octanoic acid; or alternatively, n-nonanoic acid.

In an embodiment, the monocarboxylic acid utilized as the carboxylic acid feedstock can be prepared by hydroformylation of a $C_5$ to $C_8$ monoolefin; alternatively, a linear $C_5$ to $C_8$ monoolefin; alternatively, a linear pentene, a linear hexene, a linear heptene, a linear octene, or combinations thereof; alternatively, a linear hexene, a linear heptene, a linear octene, or combinations thereof; alternatively, a linear hexene, a linear octene, or combinations thereof; alternatively, a linear pentene; alternatively, a linear hexene; alternatively, a linear heptene; alternatively, a linear octene; alternatively, 1-pentene, 1-hexene, 1-heptene, 1-octene, or combinations thereof; alternatively, 1-hexene, 1-heptene, 1-octene, or combinations thereof; alternatively, 1-hexene, 1-octene, or combinations thereof; alternatively, 1-pentene; alternatively, 1-hexene; alternatively, 1-heptene; or alternatively, 1-octene. Generally, hydroformylation, which is also known under the name of "oxo" synthesis or process, is a catalyzed industrial process (typically, but not exclusively, using a cobalt or rhodium catalyst) for the production of aldehydes from olefins and carbon monoxide and hydrogen. The aldehydes obtained from hydroformylation can be further oxidized to carboxylic acids. For example, hydroformylation of 1-pentene followed by oxidation can produce n-hexanoic acid; similarly, 1-hexene can produce n-heptanoic acid, 1-heptene can produce n-octanoic acid, 1-octene can produce n-nonanoic acid, etc.

In an embodiment, the $C_6$ to $C_9$ monocarboxylic acid can be prepared by hydroformylation of a linear $C_5$ to $C_8$ monoolefin. As will be appreciated by one of skill in the art, the hydroformylation of a linear monoolefin (e.g., linear $C_5$ to $C_8$ monoolefin) would produce a monocarboxylic acid (e.g., $C_6$ to $C_9$ monocarboxylic acid) precursor feedstock containing linear and iso aldehydes which would then be converted to a carboxylic acid feedstock (e.g., $C_6$ to $C_9$ monocarboxylic acid) containing linear and iso carboxylic acids. The relative amounts of linear and iso aldehydes (and subsequently the relative amounts of linear and iso carboxylic acids) produced can be dependent on the catalyst system and conditions utilized to perform the hydroformylation.

In an embodiment, the olefin feedstock for the process to produce compositions comprising $C_6$ to $C_9$ monocarboxylic acid secondary $C_6$ to $C_{12}$ esters can comprise, consist essentially of, or consist of, at least 80 mol %, at least 85 mol %, at least 90 mol %, or at least 95 mol % of a $C_6$ to $C_{12}$ monoolefin; alternatively, a $C_6$ to $C_{10}$ monoolefin; alternatively, a $C_6$ to $C_8$ monoolefin; alternatively, a $C_8$ to $C_{12}$ monoolefin; alternatively, a $C_8$ to $C_{10}$ monoolefin; alternatively, a $C_{10}$ to $C_{12}$ monoolefin; alternatively, a $C_6$ monoolefin; alternatively, a $C_8$ monoolefin; alternatively, a $C_{10}$ monoolefin; or alternatively, a $C_{12}$ monoolefin. In some embodiments, the olefin feedstock for the process to produce compositions comprising $C_6$ to $C_9$ monocarboxylic acid secondary $C_6$ to $C_{12}$ esters can comprise, consist essentially of, or consist of, at least 80 mol %, at least 85 mol %, at least 90 mol %, or at least 95 mol % of a hexene, a heptene, an octene, a nonene, a decene, an undecene, a dodecene, or combinations thereof; alternatively, a hexene, an octene, a decene, a dodecene, or combinations thereof; alternatively, an octene, a decene, a dodecene, or combinations thereof; alternatively, a hexene, an octene, or combinations thereof; alternatively, an octene, a decene, or combinations thereof; alternatively, a decene, a dodecene, or combinations thereof; alternatively, a hexene; alternatively, an octene; alternatively, a decene; or alternatively, a dodecene.

In an embodiment, the olefin feedstock for the process to produce compositions comprising $C_6$ to $C_9$ monocarboxylic acid secondary $C_6$ to $C_{12}$ esters can comprise, consist essentially of, or consist of, at least 80 mol %, at least 85 mol %, at least 90 mol %, or at least 95 mol % of a linear $C_6$ to $C_{12}$ monoolefin; alternatively, a linear $C_6$ to $C_{10}$ monoolefin; alternatively, a linear $C_6$ to $C_8$ monoolefin; alternatively, a linear $C_8$ to $C_{12}$ monoolefin; alternatively, a linear $C_8$ to $C_{10}$ monoolefin; alternatively, a linear $C_{10}$ to $C_{12}$ monoolefin; alternatively, a linear $C_6$ monoolefin; alternatively, a linear $C_8$ monoolefin; alternatively, a linear $C_{10}$ monoolefin; or alternatively, a linear $C_{12}$ monoolefin. In some embodiments, the olefin feedstock for the process to produce compositions comprising $C_6$ to $C_9$ monocarboxylic acid secondary $C_6$ to $C_{12}$ esters can comprise, consist essentially of, or consist of, at least 80 mol %, at least 85 mol %, at least 90 mol %, or at least 95 mol % of a linear hexene, a linear heptene, a linear octene, a linear nonene, a linear decene, a linear undecene, a linear dodecene, or combinations thereof; alternatively, a linear hexene, a linear octene, a linear decene, a linear dodecene, or combinations thereof; alternatively, a linear octene, a linear decene, a linear dodecene, or combinations thereof; alternatively, a linear hexene, a linear octene, or combinations thereof; alternatively, an linear octene, a linear decene, or combinations thereof; alternatively, a linear decene, a linear dodecene, or combinations thereof; alternatively, a linear hexene; alternatively, a linear octene; alternatively, a linear decene; or alternatively, a linear dodecene. In an embodiment, the olefin feedstock for the process to produce compositions comprising $C_6$ to $C_9$ monocarboxylic acid secondary $C_6$ to $C_{12}$ esters can comprise, consist essentially of, or consist of, at least 80 mol %, at least 85 mol %, at least 90 mol %, or at least 95 mol % of 1-hexene, 1-heptene, 1-octene, 1-nonene, 1-decene, 1-undecene, 1-dodecene, or combinations thereof; alternatively, 1-hexene, 1-octene, 1-decene, 1-dodecene, or combinations thereof; alternatively, 1-hexene, 1-octene, 1-decene, or combinations thereof; alternatively, 1-octene, 1-decene, 1-dodecene, or combinations thereof; alternatively, 1-hexene, 1-octene, or combinations thereof; alternatively, 1-octene, 1-decene, or combinations thereof; alternatively, 1-decene, 1-dodecene, or combinations thereof; alternatively, 1-hexene; alternatively, 1-octene; alternatively, 1-decene; or alternatively, 1-dodecene.

In an embodiment, the carboxylic acid feedstock can comprise, consist essentially of, or consist of, at least 80 mol %, at least 85 mol %, at least 90 mol %, or at least 95 mol % n-hexanoic acid, n-heptanoic acid, n-octanoic acid, n-nonanoic acid, or combinations thereof and the olefin feedstock can comprise, consist essentially of, or consist of, at least 80 mol %, at least 85 mol %, at least 90 mol %, or at least 95 mol % of a linear $C_6$ to $C_{12}$ monoolefin. In some embodiments, the carboxylic acid feedstock can comprise, consist essentially of, or consist of, at least 80 mol %, at least 85 mol %, at least 90 mol %, or at least 95 mol % n-heptanoic acid, n-nonanoic acid, or combinations thereof and the olefin feedstock can comprise, consist essentially of, or consist of, at least 80 mol %, at least 85 mol %, at least 90 mol %, or at least 95 mol % of a linear $C_6$ to $C_{12}$ monoolefin. In some embodiments, the carboxylic acid feedstock can comprise, consist essentially of, or consist of, at least 80 mol %, at least 85 mol %, at least 90 mol %, or at least 95 mol % n-heptanoic acid and the olefin feedstock can comprise, consist essentially of, or consist of, at least 80 mol %, at least 85 mol %, at least 90 mol %, or at least 95 mol % of a linear $C_6$ to $C_{12}$ monoolefin. In other embodiments, the carboxylic acid feedstock can comprise, consist essentially of, or consist of, at least 80 mol %, at least 85 mol %, at least 90 mol %, or at least 95 mol % n-nonanoic acid and the olefin feedstock can comprise, consist essentially of, or consist of, at least 80 mol %, at least 85 mol %, at least 90 mol %, or at least 95 mol % of a linear $C_6$ to $C_{12}$ monoolefin.

In an embodiment, the solid acid catalyst that can be utilized in any process described herein to form any composition comprising at least 75 mol % $C_6$ to $C_9$ monocarboxylic acid secondary $C_6$ to $C_{12}$ esters described herein can comprise, consist essentially of, or can be, a tetrafluoroethylene polymer resin modified with perfluorovinyl ether groups terminated with sulfonate groups, a macroreticular, sulfonated, crosslinked copolymer of styrene and divinyl benzene, an acid washed clay, or combinations thereof; alternatively, a tetrafluoroethylene polymer resin modified with perfluorovinyl ether groups terminated with sulfonate groups; alternatively, a macroreticular, sulfonated, crosslinked copolymer of styrene and divinyl benzene; or alternatively, an acid washed clay.

In some embodiments, the macroreticular, sulfonated, crosslinked copolymer of styrene and divinyl benzene which can be utilized as the solid acid catalyst in the processes to form a composition comprising $C_6$ to $C_9$ monocarboxylic acid secondary $C_6$ to $C_{12}$ esters can be an AMBERLYST™ ion exchange resin. AMBERLYST™ ion exchange resins are polymeric resins commercially available from Dow Chemical Company. AMBERLYST™ ion exchange resins have acid activity and can be utilized as a heterogeneous catalyst. In other embodiments, the solid acid catalyst can be AMBERLYST™ 15 ion exchange resin, AMBERLYST™ 16 ion exchange resin, AMBERLYST™ 36 ion exchange resin, AMBERLYST™ 39 ion exchange resin, AMBERLYST™ 46 ion exchange resin, AMBERLYST™ 70 ion exchange resin, AMBERLYST™ 131 ion exchange resin, or combinations thereof; alternatively, AMBERLYST™ 15 ion exchange resin; alternatively, AMBERLYST™ 16 ion exchange resin; alternatively, AMBERLYST™ 36 ion exchange resin; alternatively, AMBERLYST™ 39 ion exchange resin; alternatively, AMBERLYST™ 46 ion exchange resin; alternatively, AMBERLYST™ 70 ion exchange resin; or alternatively, AMBERLYST™ 131 ion exchange resin.

In an embodiment, the tetrafluoroethylene polymer resin modified with perfluorovinyl ether groups terminated with sulfonate groups can be a NAFION® resin. NAFION® resins are available from a wide variety of commercial sources, such as Sigma-Aldrich Corporation. NAFION® resins have acid activity and can be utilized as heterogeneous catalysts. In some embodiments, the solid catalyst can be NAFION® NR-50 superacid resin, NAFION® SAC-13 resin, trimethylsilylated NAFION® resin, or combinations thereof; alternatively, NAFION NR-50 superacid resin; alternatively, NAFION® SAC-13 resin; or alternatively, trimethylsilylated NAFION® resin.

In an embodiment, the olefin feedstock and the carboxylic acid feedstock can be contacted at an olefin to carboxylic acid molar ratio ranging from 0.2:1 to 9:1, from 0.4:1 to 6:1, from 0.5:1 to 3:1, from 0.6:1 to 2:1, from 0.7:1 to 1.5:1, from 0.75:1 to 1.25:1, from 0.8:1 to 1.2:1, from 0.85:1 to 1.15:1, from 0.9:1 to 1.1:1, or from 0.95:1 to 1.05:1, to form $C_6$ to $C_9$ monocarboxylic acid secondary $C_6$ to $C_{12}$ esters.

In an embodiment, the $C_6$ to $C_9$ monocarboxylic acid secondary $C_6$ to $C_{12}$ esters can be formed at a temperature (e.g., reaction temperature) of from 40° C. to 120° C., from 50° C. to 110° C., from 60° C. to 105° C., from 70° C. to 100° C., or from 80° C. to 100° C.

In an embodiment, the $C_6$ to $C_9$ monocarboxylic acid secondary $C_6$ to $C_{12}$ esters can be formed in a reaction zone comprising a fixed bed reactor, a continuous stirred tank reactor, a plug flow reactor, or combinations thereof; alternatively, a fixed bed reactor; alternatively, a continuous stirred tank reactor; or alternatively, a plug flow reactor.

Generally, a fixed bed reactor involves the use of a solid catalyst (e.g., solid acid catalyst) that is held in place and does not move about the reactor, wherein the reactants (e.g., carboxylic acid feedstock and olefin feedstock) pass through the catalyst bed and form a reaction product (e.g., $C_6$ to $C_9$ monocarboxylic acid secondary $C_6$ to $C_{12}$ esters). A continuous stirred tank reactor (CSTR) generally refers to a reaction vessel that can be continuously stirred or agitated by using any suitable agitation means, such as for example a rotary agitator; a magnetic stirrer; bubbling or sparging an inert gas through a liquid phase (e.g., carboxylic acid feedstock and olefin feedstock) inside the reaction vessel; etc. In a CSTR, one or more fluid reagents (e.g., carboxylic acid feedstock and olefin feedstock) are introduced into a tank reactor equipped with agitation to produce a product (e.g., $C_6$ to $C_9$ monocarboxylic acid secondary $C_6$ to $C_{12}$ esters). A CSTR can be operated as a batch process or a continuous process (e.g., reagents are periodically or continuously added to the CSTR while reaction mixture is periodically or continuously removed from the CSTR). In a plug flow reactor, generally one or more fluid reagents (e.g., carboxylic acid feedstock and olefin feedstock) are pumped through a pipe or tube; a chemical reaction proceeds as the reagents travel through the plug flow reactor, and a mixture containing the product (e.g., $C_6$ to $C_9$ monocarboxylic acid secondary $C_6$ to $C_{12}$ esters) is collected as a reactor effluent.

In an embodiment, the $C_6$ to $C_9$ monocarboxylic acid secondary $C_6$ to $C_{12}$ esters can be formed in a reaction zone comprising a fixed bed reactor at a weight hourly space velocity (WHSV) of from 0.1 to 5, from 0.1 to 4, from 0.2 to 3, from 0.2 to 2.5, from 0.3 to 2.5, from 0.4 to 3, or from 0.5 to 2. WHSV generally refers to a mass of reagents fed per hour divided by catalyst mass in the fixed bed reactor.

In an embodiment, the mixture containing the reaction product (e.g., $C_6$ to $C_9$ monocarboxylic acid secondary $C_6$ to $C_{12}$ esters) can be separated from catalyst and/or catalyst fines by any suitable methodology of separating a liquid from a solid, such as for example by filtration, to form a separated reaction product mixture (e.g., separated composition comprising $C_6$ to $C_9$ monocarboxylic acid secondary $C_6$ to $C_{12}$ esters). The mixture containing the reaction product (before or after separating the catalyst or catalyst fines) can further comprise unconverted olefin feedstock and/or unconverted carboxylic acid.

In an embodiment, the process for forming compositions comprising $C_6$ to $C_9$ monocarboxylic acid secondary $C_6$ to $C_{12}$ esters described herein can comprise isolating a composition comprising $C_6$ to $C_9$ monocarboxylic acid secondary $C_6$ to $C_{12}$ esters by separating all or at least a portion of the unconverted olefin feedstock and/or all or at least a portion of the unconverted carboxylic acid feedstock from the $C_6$ to $C_9$ monocarboxylic acid secondary $C_6$ to $C_{12}$ esters (e.g., to form a composition comprising $C_6$ to $C_9$ monocarboxylic acid secondary $C_6$ to $C_{12}$ esters). In further embodiments, all or at least a portion of the unconverted olefin feedstock (e.g., recovered unconverted olefin feedstock) and/or all or at least a portion of the unconverted monocarboxylic acid (e.g., recovered unconverted carboxylic acid feedstock) can be recycled to the reaction zone. In an embodiment, all or at least a portion of the unconverted olefin feedstock and all or at least a portion of the unconverted carboxylic acid feedstock can be separated from the $C_6$ to $C_9$ monocarboxylic acid secondary $C_6$ to $C_{12}$ esters by distillation as a stream containing both the unconverted olefin feedstock and all or at least a portion of the unconverted carboxylic acid feedstock; alternatively, the unconverted olefin feedstock and the unconverted carboxylic acid feedstock are separated into separate streams. In an embodiment, all or at least a portion of the unconverted olefin feedstock and/or all or at least a portion of the unconverted carboxylic acid feedstock can be separated from the $C_6$ to $C_9$ monocarboxylic acid secondary $C_6$ to $C_{12}$ esters by distillation.

In an embodiment, the compositions comprising $C_6$ to $C_9$ monocarboxylic acid secondary $C_6$ to $C_{12}$ esters recovered by separating the catalyst and/or unconverted reagents (e.g., unconverted olefin feedstock, unconverted carboxylic acid feedstock) can comprise less than or equal to 14 mol %, less than or equal to 12 mol %, less than or equal to 10 mol %, less than or equal to 8 mol %, or less than or equal to 6 mol % $C_{12}$ to $C_{24}$ olefins; alternatively, $C_{16}$ to $C_{24}$ olefins; alternatively, $C_{12}$ to $C_{16}$ olefins; alternatively, $C_{16}$ to $C_{20}$ olefins; alternatively, $C_{20}$ to $C_{24}$ olefins; alternatively, $C_{12}$ olefins; alternatively, $C_{16}$ olefins; alternatively, $C_{20}$ olefins; or alternatively, $C_{24}$ olefins. As will be appreciated by one of skill in the art, and with the help of this disclosure, the olefins present in the olefin feedstock utilized in the formation of the secondary esters can dimerize under the reaction conditions. As such, these dimer olefins can be present in the compositions comprising $C_6$ to $C_9$ monocarboxylic acid secondary $C_6$ to $C_{12}$ esters. For example, if the olefin feedstock comprises hexene, the compositions comprising $C_6$ to $C_9$ monocarboxylic acid secondary $C_6$ esters can contain any amount of $C_{12}$ olefins disclosed herein; if the olefin feedstock comprises octene, the compositions comprising $C_6$ to $C_9$ monocarboxylic acid secondary $C_8$ esters can contain any amount of $C_{16}$ olefins disclosed herein; if the olefin feedstock comprises decene, the compositions comprising $C_6$ to $C_9$ monocarboxylic acid secondary $C_{10}$ esters can contain any amount of $C_{20}$ olefins disclosed herein; if the olefin feedstock comprises dodecene, the compositions comprising $C_6$ to $C_9$ monocarboxylic acid secondary $C_{12}$ esters can contain any amount of $C_{24}$ olefins disclosed herein; if the olefin feedstock comprises octene and dodecene, the compositions comprising $C_6$ to $C_9$ monocarboxylic acid secondary $C_8$ and $C_{12}$ esters can contain any amount of $C_{16}$ and $C_{24}$ olefins disclosed herein; etc.

In an embodiment, the compositions comprising $C_6$ to $C_9$ monocarboxylic acid secondary $C_6$ to $C_{12}$ esters isolated by separating the catalyst and/or unconverted reagents (e.g., unconverted olefin feedstock, unconverted carboxylic acid feedstock) can comprise less than 5 mol %, less than 4 mol %, less than 3 mol %, less than 2 mol %, or less than 1 mol % of a $C_6$ to $C_9$ monocarboxylic acid primary $C_6$ to $C_{12}$ ester; or a $C_6$ to $C_9$ monocarboxylic acid linear primary $C_6$ to $C_{12}$ ester.

In an embodiment, the compositions comprising $C_6$ to $C_9$ monocarboxylic acid secondary $C_6$ to $C_{12}$ esters isolated by separating the catalyst and/or unconverted reagents (e.g., unconverted olefin feedstock, unconverted carboxylic acid feedstock) can comprise from 1 mol % to 14 mol %, from 1 mol % to 12 mol %, from 2 mol % to 12 mol %, from 2 mol % to 10 mol, from 3 mol % to 10 mol %, or from 3 mol % to 8 mol % $C_{12}$ to $C_{24}$ olefins; alternatively, $C_{16}$ to $C_{24}$ olefins; alternatively, $C_{12}$ to $C_{16}$ olefins; alternatively, $C_{16}$ to $C_{20}$ olefins; alternatively, $C_{20}$ to $C_{24}$ olefins; alternatively, $C_{12}$ olefins; alternatively, $C_{16}$ olefins; alternatively, $C_{20}$ olefins; or alternatively, $C_{24}$ olefins; and can comprise less than 5 mol %, less than 4 mol %, less than 3 mol %, less than 2 mol %, or less than 1 mol % of a $C_6$ to $C_9$ monocarboxylic acid primary $C_6$ to $C_{12}$ ester. In other embodiments, all or a portion of the $C_{12}$ to $C_{24}$ olefins, $C_{16}$ to $C_{24}$ olefins, $C_{12}$ to $C_{16}$ olefins, $C_{16}$ to $C_{20}$ olefins, $C_{20}$ to $C_{24}$ olefins, $C_{12}$ olefins, $C_{16}$ olefins, $C_{20}$ olefins, or $C_{24}$ olefins can be separated from the compositions comprising $C_6$ to $C_9$ monocarboxylic acid secondary $C_6$ to $C_{12}$ esters by using any suitable methodology. As such, in some embodiments, the compositions comprising $C_6$ to $C_9$ monocarboxylic acid secondary $C_6$ to $C_{12}$ esters can comprise less than or equal to 5 mol %, less than or equal to 4 mol %, less than or equal to 3 mol %, less than or equal to 2 mol %, less than or equal to 1 mol %, less than or equal to 0.5 mol %, or less than or equal to 0.25 mol % $C_{12}$ to $C_{24}$ olefins; alternatively, $C_{16}$ to $C_{24}$ olefins; alternatively, $C_{12}$ to $C_{16}$ olefins; alternatively, $C_{16}$ to $C_{20}$ olefins; alternatively, $C_{20}$ to $C_{24}$ olefins; alternatively, $C_{12}$ olefins; alternatively, $C_{16}$ olefins; alternatively, $C_{20}$ olefins; or alternatively, $C_{24}$ olefins.

In an embodiment, the compositions comprising $C_6$ to $C_9$ monocarboxylic acid secondary $C_6$ to $C_{12}$ esters isolated by separating the catalyst and/or unconverted reagents (e.g., unconverted olefin feedstock, unconverted carboxylic acid feedstock) from the mixture comprising $C_6$ to $C_9$ monocarboxylic acid secondary $C_6$ to $C_{12}$ esters can further comprise i) $C_6$ to $C_9$ monocarboxylic acid secondary $C_6$ esters comprising from 45 mol % to 75 mol % of a $C_6$ to $C_9$ monocarboxylic acid 2-hexyl ester and from 25 mol % to 55 mol % of a $C_6$ to $C_9$ monocarboxylic acid 3-hexyl ester; ii) $C_6$ to $C_9$ monocarboxylic acid secondary $C_8$ esters comprising (a) from 30 mol % to 60 mol % of a $C_6$ to $C_9$ monocarboxylic acid 2-octyl ester and (b) from 40 mol % to 70 mol % of a $C_6$ to $C_9$ monocarboxylic acid 3-octyl ester, and/or a $C_6$ to $C_9$ monocarboxylic acid 4-octyl ester; iii) $C_6$ to $C_9$ monocarboxylic acid secondary $C_{10}$ esters comprising (a) from 25 mol % to 55 mol % of a $C_6$ to $C_9$ monocarboxylic acid 2-decyl ester and (b) from 45 mol % to 75 mol % of a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester; iv) $C_6$ to $C_9$ monocarboxylic acid secondary $C_{12}$ esters comprising (a) from 20 mol % to 50 mol % of a $C_6$ to $C_9$ monocarboxylic acid 2-dodecyl ester and (b) from 50 mol % to 80 mol % of a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester; or combinations thereof. In another embodiment, the compositions comprising $C_6$ to $C_9$ monocarboxylic acid secondary $C_6$ to $C_{12}$ esters isolated by separating the catalyst and/or unconverted reagents (e.g., unconverted olefin feedstock, unconverted carboxylic acid feedstock) from the mixture comprising $C_6$ to $C_9$ monocarboxylic acid secondary $C_6$ to $C_{12}$ esters can further comprise i) at least 80 mol % heptanoic acid secondary hexyl esters, less than 5 mol % heptanoic acid 1-hexyl ester, and less than or equal to 14 mol % $C_{12}$ olefins, wherein the heptanoic acid secondary hexyl esters comprise from 45 mol % to 75 mol % of a heptanoic acid 2-hexyl ester, and from 25 mol % to 55 mol % of a heptanoic acid 3-hexyl ester; ii) at least 80 mol % heptanoic acid secondary octyl esters, less than 5 mol % heptanoic acid 1-octyl ester, and less than or equal to 14 mol % $C_{16}$ olefins, wherein the heptanoic acid secondary octyl esters comprise from 30 mol % to 60 mol % of a heptanoic acid 2-octyl ester, from 20 mol % to 40 mol % of a heptanoic acid 3-octyl ester, and from 15 mol % to 30 mol % of a heptanoic acid 4-octyl ester; iii) at least 80 mol % heptanoic acid secondary decyl esters, less than 5 mol % heptanoic acid 1-decyl ester, and less than or equal to 14 mol % $C_{20}$ olefins, wherein the heptanoic acid secondary decyl esters comprise from 25 mol % to 55 mol % of a heptanoic acid 2-decyl ester, from 15 mol % to 35 mol % of a heptanoic acid 3-decyl ester, from 10 mol % to 30 mol % of a heptanoic acid 4-decyl ester, and from 5 mol % to 25 mol % of a heptanoic acid 5-decyl ester; or iv) at least 80 mol % heptanoic acid secondary dodecyl esters, less than 5 mol % heptanoic acid 1-dodecyl ester, and less than or equal to 14 mol % $C_{24}$ olefins, wherein the heptanoic acid secondary dodecyl esters comprise from 20 mol % to 50 mol % of a heptanoic acid 2-dodecyl ester, from 10 mol % to 30 mol % of a heptanoic acid 3-dodecyl ester, from 5 mol % to 25 mol % of a heptanoic acid 4-dodecyl ester, from 5 mol % to 25 mol % of a heptanoic acid 5-dodecyl ester, and from 5 mol % to 25 mol % of a heptanoic acid 6-dodecyl ester. The present disclosure provides further descriptions of the secondary esters that can be present in the compositions comprising $C_6$ to $C_9$ monocarboxylic acid secondary $C_6$ to $C_{12}$ esters, the amounts of primary monocarboxylic acid esters, and the amounts of and carbon number of olefins, and these secondary ester descriptions, amounts of primary monocarboxylic acid esters, and amounts of and carbon number of olefins can be utilized without limitation to further describe the processes described herein and the compositions comprising $C_6$ to $C_9$ monocarboxylic acid secondary $C_6$ to $C_{12}$ esters isolated by separating the catalyst and/or unconverted reagents (e.g., unconverted olefin feedstock, unconverted carboxylic acid feedstock) from the mixture comprising $C_6$ to $C_9$ monocarboxylic acid secondary $C_6$ to $C_{12}$ esters.

Disclosed herein are wellbore treatment fluids comprising any composition comprising $C_6$ to $C_9$ monocarboxylic acid secondary $C_6$ to $C_{12}$ esters described herein. In an embodiment, a composition comprising $C_6$ to $C_9$ monocarboxylic acid secondary $C_6$ to $C_{12}$ esters disclosed herein can be incorporated into any suitable wellbore treatment fluid. The wellbore treatment fluid can be any fluid utilized in a wellbore servicing operation. Thus, the wellbore treatment fluid can serve as, for example, a drilling fluid, a work-over fluid, a fracturing fluid, a completion fluid, or a sweeping fluid. In an embodiment, the wellbore treatment fluid can be a drilling fluid. Drilling fluids, also termed drilling muds, can be used to maintain pressure, cool drill bits and lift cuttings from the holes. Generally, the wellbore treatment fluids can comprise any $C_6$ to $C_9$ monocarboxylic acid secondary $C_6$ to $C_{12}$ esters described herein.

In an embodiment, the wellbore treatment fluid can comprise i) a composition comprising at least 75 mol %, at least 80 mol %, at least 85 mol %, at least 90 mol %, or at least 92 mol % heptanoic acid secondary hexyl esters; ii) a composition comprising at least 75 mol %, at least 80 mol %, at least 85 mol %, at least 90 mol %, or at least 92 mol % heptanoic acid secondary octyl esters; iii) a composition comprising at least 75 mol %, at least 80 mol %, at least 85 mol %, at least 90 mol %, or at least 92 mol % heptanoic acid secondary decyl esters; iv) a composition comprising at least 75 mol %, at least 80 mol %, at least 85 mol %, at least 90 mol %, or at least 92 mol % heptanoic acid secondary dodecyl esters; or combinations thereof.

In a non-limiting embodiment, the wellbore treatment fluid can comprise a composition comprising at least 75 mol %, at least 80 mol %, at least 85 mol %, at least 90 mol %, or at least 92 mol % $C_6$ to $C_9$ monocarboxylic acid secondary $C_6$ to $C_{12}$ esters, wherein the $C_6$ to $C_9$ monocarboxylic acid secondary $C_6$ to $C_{12}$ esters can comprise at least 20 mol %, at least 25 mol %, or at least 30 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof.

In another non-limiting embodiment, the wellbore treatment fluid can comprise a composition comprising i) $C_6$ to $C_9$ monocarboxylic acid secondary $C_6$ esters comprising from 45 mol % to 75 mol % of a $C_6$ to $C_9$ monocarboxylic acid 2-hexyl ester and from 25 mol % to 55 mol % of a $C_6$ to $C_9$ monocarboxylic acid 3-hexyl ester; ii) $C_6$ to $C_9$ monocarboxylic acid secondary $C_8$ esters comprising (a) from 30 mol % to 60 mol % of a $C_6$ to $C_9$ monocarboxylic acid 2-octyl ester and (b) from 40 mol % to 70 mol % of a $C_6$ to $C_9$ monocarboxylic acid 3-octyl ester, and/or a $C_6$ to $C_9$ monocarboxylic acid 4-octyl ester; iii) $C_6$ to $C_9$ monocarboxylic acid secondary $C_{10}$ esters comprising (a) from 25 mol % to 55 mol % of a $C_6$ to $C_9$ monocarboxylic acid 2-decyl ester and (b) from 45 mol % to 75 mol % of a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester; iv) $C_6$ to $C_9$ monocarboxylic acid secondary $C_{12}$ esters comprising (a) from 20 mol % to 50 mol % of a $C_6$ to $C_9$ monocarboxylic acid 2-dodecyl ester and (b) from 50 mol % to 80 mol % of a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester; or combinations thereof.

In an embodiment, the wellbore treatment fluid can comprise (i) a composition comprising at least 75 mol %, at least 80 mol %, at least 85 mol %, at least 90 mol %, or at least 92 mol % heptanoic acid secondary hexyl esters, (ii) a composition comprising at least 75 mol %, at least 80 mol %, at least 85 mol %, at least 90 mol %, or at least 92 mol % heptanoic acid secondary octyl esters, (iii) a composition comprising at least 75 mol %, at least 80 mol %, at least 85 mol %, at least 90 mol %, or at least 92 mol % heptanoic acid secondary dodecyl esters, or (iv) combinations thereof; alternatively, (i) a composition comprising at least 75 mol %, at least 80 mol %, at least 85 mol %, at least 90 mol %, or at least 92 mol % heptanoic acid secondary octyl esters, (ii) a composition comprising at least 75 mol %, at least 80 mol %, at least 85 mol %, at least 90 mol %, or at least 92 mol % heptanoic acid secondary dodecyl esters, or (iii) combinations thereof; alternatively, at least 75 mol %, at least 80 mol %, at least 85 mol %, at least 90 mol %, or at least 92 mol % heptanoic acid secondary hexyl esters; alternatively, at least 75 mol %, at least 80 mol %, at least 85 mol %, at least 90 mol %, or at least 92 mol % heptanoic acid secondary octyl esters; or alternatively, at least 75 mol %, at least 80 mol %, at least 85 mol %, at least 90 mol %, or at least 92 mol % heptanoic acid secondary dodecyl esters. In one embodiment, a wellbore treatment fluid comprising (i) a composition comprising heptanoic acid secondary octyl esters and (ii) a composition comprising heptanoic acid secondary dodecyl esters can comprise a ratio of (i) the composition comprising heptanoic acid secondary octyl esters to (ii) the composition comprising heptanoic acid secondary dodecyl esters ranging from 9:1 to 0.1:1, from 5:1 to 0.1:1, from 2:1 to 0.15:1, from 1.5:1 to 0.15:1, or from 1.5:1 to 0.2:1.

In an embodiment, the wellbore treatment fluid can comprise i) a composition comprising at least 80 mol % heptanoic acid secondary hexyl esters, less than 5 mol % heptanoic acid 1-hexyl ester, and less than or equal to 14 mol % $C_{12}$ olefins, wherein the heptanoic acid secondary hexyl esters comprise from 45 mol % to 75 mol % of a heptanoic acid 2-hexyl ester and from 25 mol % to 55 mol % of a heptanoic acid 3-hexyl ester; ii) a composition comprising at least 80 mol % heptanoic acid secondary octyl esters, less than 5 mol % heptanoic acid 1-octyl ester, and less than or equal to 14 mol % $C_{16}$ olefins, wherein the heptanoic acid secondary octyl esters comprise from 30 mol % to 60 mol % of a heptanoic acid 2-octyl ester, from 20 mol % to 40 mol % of a heptanoic acid 3-octyl ester, and from 15 mol % to 30 mol % of a heptanoic acid 4-octyl ester; iii) a composition comprising at least 80 mol % heptanoic acid secondary decyl esters, less than 5 mol % heptanoic acid 1-decyl ester, and less than or equal to 14 mol % $C_{20}$ olefins, wherein the heptanoic acid secondary decyl esters comprise from 25 mol % to 55 mol % of a heptanoic acid 2-decyl ester, from 15 mol % to 35 mol % of a heptanoic acid 3-decyl ester, from 10 mol % to 30 mol % of a heptanoic acid 4-decyl ester, and from 5 mol % to 25 mol % of a heptanoic acid 5-decyl ester; iv) a composition comprising at least 80 mol % heptanoic acid secondary dodecyl esters, less than 5 mol % heptanoic acid 1-dodecyl ester, and less than or equal to 14 mol % $C_{24}$ olefins, wherein the heptanoic acid secondary dodecyl esters comprise from 20 mol % to 50 mol % of a heptanoic acid 2-dodecyl ester, from 10 mol % to 30 mol % of a heptanoic acid 3-dodecyl ester, from 5 mol % to 25 mol % of a heptanoic acid 4-dodecyl ester, from 5 mol % to 25 mol % of a heptanoic acid 5-dodecyl ester, and from 5 mol % to 25 mol % of a heptanoic acid 6-dodecyl ester; or combinations thereof. The present disclosure provides further descriptions of the secondary esters that can be present in the compositions comprising $C_6$ to $C_9$ monocarboxylic acid secondary $C_6$ to $C_{12}$ esters, the amounts of primary monocarboxylic acid esters, and the amounts of and carbon number of olefins, and these secondary ester descriptions, amounts of primary monocarboxylic acid esters, and amounts of and carbon number of olefins can be utilized without limitation to further describe the wellbore treatment fluid.

In an embodiment, the wellbore treatment fluid can be a drilling fluid or drilling mud. In some embodiments, the treatment fluid can be a water-based drilling fluid or a non-aqueous-based drilling fluid. In other embodiments, the treatment fluid can be an invert emulsion drilling fluid.

In an embodiment, the wellbore treatment fluid can be a water-based drilling fluid comprising any suitable non-oleaginous liquid, such as for example an aqueous liquid, fresh water, sea water, a brine containing organic and/or inorganic dissolved salts, liquids containing water-miscible organic compounds, or combinations thereof. In an embodiment, the wellbore treatment fluid can be formulated as a water-based drilling mud comprising any composition comprising $C_6$ to $C_9$ monocarboxylic acid secondary $C_6$ to $C_{12}$ esters described herein.

In an embodiment, the wellbore treatment fluid can be a non-aqueous-based drilling fluid comprising an oleaginous liquid, such as for example any composition comprising $C_6$ to $C_9$ monocarboxylic acid secondary $C_6$ to $C_{12}$ esters described herein. The oleaginous liquid can further comprise a natural or synthetic oil, diesel oil, mineral oil, synthetic oil, kerosene, fuel oil, crude oil, an olefin, an organic ester, a linear paraffin, a branched paraffin, an acetal, derivatives thereof, or combinations thereof.

In an embodiment, the wellbore treatment fluid can be formulated as an invert emulsion drilling fluid. Generally, an invert emulsion is an emulsion having an oleaginous continuous or external phase and an aqueous discontinuous or internal phase.

In an embodiment, the invert emulsion drilling fluid can comprise a continuous phase comprising a composition comprising the monocarboxylic acid secondary ester, and a discontinuous phase comprising an aqueous liquid (e.g., water). In such embodiment, the invert emulsion drilling fluid can further comprise a weighting material.

In an embodiment, the invert emulsion drilling fluid can comprise (i) a continuous phase comprising any composition comprising $C_6$ to $C_9$ monocarboxylic acid secondary $C_6$ to $C_{12}$ esters described herein, (ii) a weighting material, and (iii) water. In such embodiment, the composition comprising $C_6$ to $C_9$ monocarboxylic acid secondary $C_6$ to $C_{12}$ esters described herein can comprise at least 75 mol %, at least 80 mol %, at least 85 mol %, at least 90 mol %, or at least 92 mol % $C_6$ to $C_9$ monocarboxylic acid secondary $C_6$ to $C_{12}$ esters. The present disclosure provides further descriptions of the compositions comprising $C_6$ to $C_9$ monocarboxylic acid secondary $C_6$ to $C_{12}$ esters and the secondary esters that can be present in the compositions comprising $C_6$ to $C_9$ monocarboxylic acid secondary $C_6$ to $C_{12}$ esters, and these descriptions of the compositions comprising $C_6$ to $C_9$ monocarboxylic acid secondary $C_6$ to $C_{12}$ esters and the secondary esters present in the compositions comprising $C_6$ to $C_9$ monocarboxylic acid secondary $C_6$ to $C_{12}$ esters can be utilized without limitation to further describe the invert emulsion drilling muds.

In an embodiment, the continuous phase comprising any composition comprising $C_6$ to $C_9$ monocarboxylic acid secondary $C_6$ to $C_{12}$ esters described herein of the invert emulsion drilling fluid can comprise from 15 wt. % to 50 wt. %, from 20 wt. % to 45 wt. %, or from 25 wt. % to 40 wt. %, of the invert emulsion drilling fluid based upon the total weight of the invert emulsion drilling fluid. In some embodiments, the continuous phase can comprise at least 20 wt. %, at least 25 wt. %, at least 30 wt. %, at least 35 wt. %, at least 40 wt. %, or at least 45 wt. %, of any composition comprising $C_6$ to $C_9$ monocarboxylic acid secondary $C_6$ to $C_{12}$ esters described herein. Other components which can form part of the continuous phase of the invert emulsion drilling fluid can include paraffins, mineral oils, internal olefins, isomerized alpha olefin, alpha olefins, water-insoluble ethers, and other esters not disclosed in this document. In some embodiments, any composition comprising $C_6$ to $C_9$ monocarboxylic acid secondary $C_6$ to $C_{12}$ esters described herein can form substantially all of the continuous phase of the invert emulsion drilling fluid.

In an embodiment, the discontinuous phase of the invert emulsion drilling fluid can comprise from 5 wt. % to 45 wt. %, from 5 wt. % to 25 wt. %, or from 10 wt. % to 25 wt. %, of the invert emulsion drilling fluid based upon the total weight of the invert emulsion drilling fluid. In some embodiments, the invert emulsion drilling fluid can comprise from 5 wt. % to 45 wt. %, from 5 wt. % to 25 wt. %, or from 10 wt. % to 25 wt. % water.

In an embodiment, the drilling fluid can further comprise a weighting material. Generally, a weighting material is a high-specific gravity solid material used to increase density of a drilling fluid. Non-limiting examples of weighting materials suitable for use in the present disclosure include barite, hematite, ilmenite, siderite, carbonates such as calcium carbonates, dolomite, or combinations thereof. In an embodiment, the weighting material can be present in the invert emulsion drilling fluid in an amount of from 0 wt. % to 70 wt. %, from 5 wt. % to 70 wt. %, from 10 wt. % to 65 wt. %, or from 15 wt. % to 60 wt. %, based on the total weight of the invert emulsion drilling fluid.

In an embodiment, the invert emulsion drilling fluid and can further comprise emulsifiers and emulsifier systems for stabilizing the emulsion. For purposes of the disclosure herein, the terms "emulsifier," emulsifying agent," and "surfactant" can be used interchangeably. The emulsifying agent serves to lower the interfacial tension of the liquids so that the non-oleaginous liquid can form a stable dispersion of fine droplets in the oleaginous liquid. Emulsifiers that can be used in the fluids disclosed herein include, for example, fatty acids, soaps of fatty acids, amidoamines, polyamides, polyamines, oleate esters, such as sorbitan monooleate, sorbitan dioleate, imidazoline derivatives or alcohol derivatives, derivatives thereof, or combinations thereof. Additionally, the invert emulsion drilling fluid can further contain surfactants that can be characterized as wetting agents. Wetting agents that can be suitable for use in the wellbore treatment fluids disclosed herein include crude tall oil, oxidized crude tall oil, organic phosphate esters, modified imidazolines and amidoamines, alkyl aromatic sulfates and sulfonates, derivatives thereof, or combinations thereof.

In an embodiment, the invert emulsion drilling fluid can further comprise additives as deemed appropriate by one skilled in the art for improving the properties of the fluid. Such additives can vary depending on the intended use of the fluid in the wellbore. In an embodiment, the invert emulsion drilling fluid can further comprise fluid loss additives, glass fibers, carbon fibers, hollow glass beads, ceramic beads, suspending agents, conditioning agents, retarders, dispersants, water softeners, emulsifiers, surfactants, defoamers, wetting agents, oxidation inhibitors, corrosion inhibitors, bactericides, thinners, clays, organic polymers, viscosifiers, scale inhibitors, friction reducers, temperature stability agents, pH-control additives, calcium reducers, shale control materials, or combinations thereof. These additives can be included singularly or in combination. Any suitable methodology for introducing these additives and their effective amounts can be employed. In some embodiments, the invert emulsion drilling fluid can comprise a total of from 0 wt. % to 35 wt. %, from 2 wt. % to 35 wt. %, from 4 wt. % to 30 wt. %, from 4 wt. % to 25 wt. %, or from 4 wt. % to 20 wt. % additives, emulsifiers, and/or wetting agents selected from those described herein.

In an embodiment, the wellbore treatment fluid can be characterized by a plastic viscosity at 120° F. ranging from 20 cP to 45 cP, from 22 cP to 43 cP, or from 25 cP to 40 cP. Generally, plastic viscosity of a wellbore treatment fluid (e.g., drilling fluid) represents the viscosity when extrapolated to an infinite shear rate. Plastic viscosity is an absolute flow property indicating the flow resistance of certain types of fluids and is a measure of shear stress.

In an embodiment, the wellbore treatment fluid can be characterized by a yield point at 120° F. ranging from 7 lb/100 sq. ft. to 20 lb/100 sq. ft., from 8 lb/100 sq. ft. to 17 lb/100 sq. ft., or from 10 lb/100 sq. ft. to 15 lb/100 sq. ft. Generally, the yield point of a wellbore treatment fluid (e.g., drilling fluid) represents the yield stress extrapolated to a shear rate of zero. The yield point refers to the resistance of the drilling fluid to initial flow, or represents the stress required to start fluid movement. Practically, the yield point is related to the attractive force among colloidal particles in drilling mud.

In an embodiment, the wellbore treatment fluid can be prepared by using any suitable methodology. In an embodiment, a process for preparing a wellbore treatment fluid can comprise (a) producing any composition comprising $C_6$ to $C_9$ monocarboxylic acid secondary $C_6$ to $C_{12}$ esters described herein (using any process to prepare the $C_6$ to $C_9$ monocarboxylic acid secondary $C_6$ to $C_{12}$ ester described herein); and (b) forming a wellbore treatment fluid.

In an embodiment, a process for preparing a wellbore treatment fluid can comprise (a) producing any composition comprising $C_6$ to $C_9$ monocarboxylic acid secondary $C_6$ to $C_{12}$ esters described herein; and (b) contacting the composition with a weighting material and water to form the wellbore treatment fluid. In such embodiment, the wellbore treatment fluid can comprise an invert emulsion drilling fluid.

In an embodiment, a process for preparing a wellbore treatment fluid can comprise a) contacting i) a carboxylic acid feedstock comprising a $C_6$ to $C_9$ monocarboxylic acid, ii) an olefin feedstock comprising $C_6$ to $C_{12}$ monoolefins, and iii) a solid acid catalyst; b) forming, in the substantial absence of water, a mixture comprising $C_6$ to $C_9$ monocarboxylic acid secondary $C_6$ to $C_{12}$ esters; c) isolating a composition comprising $C_6$ to $C_9$ monocarboxylic acid secondary $C_6$ to $C_{12}$ esters from the mixture; and d) using the isolated composition comprising $C_6$ to $C_9$ monocarboxylic acid secondary $C_6$ to $C_{12}$ esters to prepare the wellbore treatment fluid. In such embodiment, the wellbore treatment fluid can be formed by contacting the isolated composition comprising $C_6$ to $C_9$ monocarboxylic acid secondary $C_6$ to $C_{12}$ esters with a weighting material and water. The present disclosure provides further descriptions of the compositions comprising $C_6$ to $C_9$ monocarboxylic acid secondary $C_6$ to $C_{12}$ esters and the secondary esters that can be present in the compositions comprising $C_6$ to $C_9$ monocarboxylic acid secondary $C_6$ to $C_{12}$ esters, and these descriptions of the compositions comprising $C_6$ to $C_9$ monocarboxylic acid secondary $C_6$ to $C_{12}$ esters and the secondary esters present in the compositions comprising $C_6$ to $C_9$ monocarboxylic acid secondary $C_6$ to $C_{12}$ esters can be utilized without limitation to further describe the process to prepare the wellbore treatment fluid.

In an embodiment, a process for preparing a wellbore treatment fluid can comprise a) contacting i) a carboxylic acid feedstock comprising a $C_6$ to $C_9$ monocarboxylic acid, ii) an olefin feedstock comprising $C_6$ to $C_{12}$ monoolefins, and iii) a solid acid catalyst; b) forming, in the substantial absence of water, a mixture comprising $C_6$ to $C_9$ monocarboxylic acid secondary $C_6$ to $C_{12}$ esters; c) isolating a composition comprising at least 75 mol % $C_6$ to $C_9$ monocarboxylic acid secondary $C_6$ to $C_{12}$ esters from the mixture; and d) using the isolated composition comprising at least 75 mol % $C_6$ to $C_9$ monocarboxylic acid secondary $C_6$ to $C_{12}$ esters to prepare the wellbore treatment fluid. The present disclosure provides further descriptions of the compositions comprising $C_6$ to $C_9$ monocarboxylic acid secondary $C_6$ to $C_{12}$ esters and the secondary esters that can be present in the compositions comprising $C_6$ to $C_9$ monocarboxylic acid secondary $C_6$ to $C_{12}$ esters, and these descriptions of the compositions comprising $C_6$ to $C_9$ monocarboxylic acid secondary $C_6$ to $C_{12}$ esters and the secondary esters present in the compositions comprising $C_6$ to $C_9$ monocarboxylic acid secondary $C_6$ to $C_{12}$ esters can be utilized without limitation to further describe the process to prepare the wellbore treatment fluid.

In an embodiment, the components of the wellbore treatment fluid (e.g., any composition comprising $C_6$ to $C_9$ monocarboxylic acid secondary $C_6$ to $C_{12}$ esters described herein, among other components) can be contacted or combined to yield the wellbore treatment fluid by using any suitable mixing means, such as for example a mixer, a blender, a shaker, or combinations thereof.

Disclosed herein is a method comprising introducing a wellbore treatment fluid to a wellbore, wherein the wellbore treatment fluid can be any wellbore treatment fluid (general or specific) described herein. In an embodiment, a method of the present disclosure can comprise introducing a wellbore treatment fluid to a wellbore, wherein the wellbore treatment fluid is a drilling fluid. In such embodiment, the drilling fluid can be introduced to a wellbore during a drilling operation.

In an embodiment, the wellbore treatment fluid is a drilling fluid, which could be used in any suitable oil field operation (e.g., a drilling operation) occurring in a wellbore and/or subterranean formation. It is to be understood that "subterranean formation" encompasses both areas below exposed earth or areas below earth covered by water such as sea or ocean water. In particular, the drilling fluid comprising $C_6$ to $C_9$ monocarboxylic acid secondary $C_6$ to $C_{12}$ esters as disclosed herein can be displaced into a wellbore and used to service the wellbore in accordance with suitable procedures. For example, the drilling fluid can be circulated down through a hollow drill stem or a drill string and out through a drill bit attached thereto while rotating the drill stem to thereby drill the wellbore. The drilling fluid can flow back to the surface to carry drill cuttings to the surface.

In an embodiment, compositions comprising $C_6$ to $C_9$ monocarboxylic acid secondary $C_6$ to $C_{12}$ esters and processes for producing and using same as disclosed herein advantageously display improvements in one or more characteristics when compared to other ester compositions lacking secondary esters elements of the type disclosed herein. For example, when compared to a conventional standard, the $LC_{50}$ sediment toxicological ratio can be less than 1, indicating that the compositions comprising $C_6$ to $C_9$ monocarboxylic acid secondary $C_6$ to $C_{12}$ esters as disclosed herein can be advantageously less toxic than the $C_{16}$ and $C_{18}$ internal olefin standard. Additional advantages of the compositions of the type disclosed herein and processes for producing and using same as disclosed herein can be apparent to one of skill in the art viewing this disclosure.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner.

The 1-hexene, 1-octene, 1-decene, and 1-dodecene were obtained from Chevron Phillips Chemical Company, LP, and utilized as received.

The n-heptanoic acid (96%) was obtained from Sigma-Aldrich and utilized as received.

The n-nonanoic acid (96%) was obtained from Sigma-Aldrich and utilized as received.

AMBERLYST™ 15 ion exchange resin was obtained from Sigma-Aldrich. The AMBERLYST™ 15 ion exchange resin was dried at 90° C. for at least 12 hours prior to being utilized in a reaction.

Kinematic viscosity was measured in accordance with ASTM D445-12.

Flash point (Cleveland Open Cup (COC)) was measured with ATSM D92. Generally, the flash point represents the lowest temperature at which application of a flame to a test chamber of a tester causes vapors of a sample in the chamber to ignite.

Pour point was measured in accordance with ASTM D97-12.

Density was measured on an Anton Parr SVM 3000.

Specific gravity can be defined as a dimensionless unit which is the ratio of density of a material (e.g., liquid) to the density of water at a given temperature.

Example 1

An equimolar mixture of 1-octene and n-nonanoic acid was contacted with dry AMBERLYST™ 15 ion exchange resin (12 wt. % based on mass of liquid) at 90° C., until the mixture contained about 35 wt. % esters. The mixture was cooled, and a liquid was isolated by filtration. The composition comprising the n-nonanoic acid secondary octyl esters was then isolated by distilling n-nonanoic acid and unreacted $C_8$ olefins overhead. The composition comprising n-nonanoic acid secondary octyl esters was analyzed by gas chromatography and found to contain 42.5 wt. % nonanoic acid 2-octyl ester, 31.4 wt. % nonanoic acid 3-octyl ester, 21.6 wt. % nonanoic acid 4-octyl ester, and about 4 wt. % $C_{16}$ olefins. The compositional make-up of the nonanoic acid secondary octyl esters in the composition comprising n-nonanoic acid secondary octyl esters was 44.6 wt. % nonanoic acid 2-octyl ester, 32.9 mol % nonanoic acid 3-octyl ester, and 22.6 wt. % nonanoic acid 4-octyl ester.

Example 2

An equimolar mixture of 1-hexene and n-heptanoic acid was contacted with dry AMBERLYST™ 15 ion exchange resin (12 wt. % based on mass of liquid) at 75° C., until the mixture contained about 50 wt. % esters. The mixture was cooled, and a liquid was isolated by filtration. The composition comprising n-heptanoic acid secondary hexyl esters was then isolated by distilling n-heptanoic acid and unreacted $C_6$ olefins overhead. The composition comprising n-heptanoic acid secondary hexyl esters was analyzed by gas chromatography and found to contain a trace of 0.2 wt. % of heptanoic acid 1-hexyl ester, 59 wt. % heptanoic acid 2-hexyl ester, and 41 wt. % heptanoic acid 3-hexyl ester. The compositional make-up of the heptanoic acid secondary hexyl esters in the composition comprising n-heptanoic acid secondary hexyl esters was 59 wt. % heptanoic acid 2-hexyl ester and 41 wt. % heptanoic acid 3-hexyl ester.

Example 3

An equimolar mixture of 1-octene and n-heptanoic acid was contacted with dry AMBERLYST™ 15 ion exchange resin (12 wt. % based on mass of liquid) at 90° C., until the mixture contained about 40 wt. % esters. The mixture was cooled, and a liquid was isolated by filtration. The composition comprising the n-heptanoic acid secondary octyl esters was then isolated by distilling n-heptanoic acid and unreacted $C_8$ olefins overhead. The composition comprising n-heptanoic acid secondary octyl esters was analyzed by gas chromatography and found to contain 43.1 wt. % heptanoic acid 2-octyl ester, 29.1 wt. % heptanoic acid 3-octyl ester, 22.6 wt. % heptanoic acid 4-octyl ester, and 5.2 wt. % $C_{16}$ olefins. The compositional make-up of the heptanoic acid secondary octyl esters in the composition comprising n-heptanoic acid secondary octyl esters was 45.5 wt. % heptanoic acid 2-octyl ester, 30.7 mol % heptanoic acid 3-octyl ester, and 23.8 wt. % heptanoic acid 4-octyl ester.

Example 4

An equimolar mixture of 1-decene and n-heptanoic acid was contacted with dry AMBERLYST™ 15 ion exchange resin (12 wt. % based on mass of liquid) at 90° C., until the mixture contained about 35 wt. % esters. The mixture was cooled, and a liquid was isolated by filtration. The liquid was analyzed by gas chromatography to determine the compositional make-up of the heptanoic acid secondary decyl esters. The heptanoic acid secondary decyl esters contained 43 wt. % heptanoic acid 2-decyl ester, 27 wt. % heptanoic acid 3-decyl ester, and 30 wt. % heptanoic acid 4-dodecyl ester and heptanoic acid 5-dodecyl ester based upon the total amount of heptanoic acid secondary decyl esters.

Example 5

An equimolar mixture of 1-dodecene and n-heptanoic acid was contacted with dry AMBERLYST™ 15 ion exchange resin (12 wt. % based on mass of liquid) at 90° C., until the mixture contained about 35 wt. % esters. The mixture was cooled, and a liquid was isolated by filtration. The composition comprising n-heptanoic acid secondary dodecyl esters was then isolated by distilling 1-heptanoic acid and unreacted $C_{12}$ olefins overhead. The composition comprising n-heptanoic acid secondary dodecyl esters was analyzed by gas chromatography and found to contain 31.7 wt. % heptanoic acid 2-dodecyl ester, 19.7 wt. % heptanoic acid 3-dodecyl ester, 14.9 wt. % heptanoic acid 4-dodecyl ester, 14.6 wt. % heptanoic acid 5-dodecyl ester, 14.6 wt. % heptanoic acid 6-dodecyl ester, and 4.6 wt. % $C_{24}$ olefins. The compositional make-up of the heptanoic acid secondary dodecyl esters in the composition comprising n-heptanoic acid secondary dodecyl esters was 33.2 wt. % heptanoic acid 2-dodecyl ester, 20.6 wt. % heptanoic acid 3-dodecyl ester, 15.6 wt. % heptanoic acid 4-dodecyl ester, 15.3 wt. % heptanoic acid 5-dodecyl ester, and 15.3 wt. % heptanoic acid 6-dodecyl ester.

The physical properties of the compositions comprising secondary esters of Examples 1-3 and 5, two different mixtures of the secondary esters of Examples 3 and 5, a composition comprising propionic acid secondary hexadecyl esters prepared using the method described in Example 11 of U.S. Pat. No. 6,100,223, a composition comprising propionic acid secondary tetradecyl esters prepared using the method described in Example 11 of U.S. Pat. No. 6,100,223, and $C_{16}$ and $C_{18}$ internal olefin toxicological standard are provided in Table 1.

The physical property data provided in Table 1 show that the composition comprising heptanoic acid secondary octyl esters produced in Example 3 has a kinematic viscosity similar to the industry standard C16/18 internal olefin (which is also the $C_{16}$ and $C_{18}$ internal olefin toxicological standard), while the pour point of the composition comprising heptanoic acid secondary octyl esters produced in Example 3 is considerably lower than that of the industry standard C16/18 internal olefin. Furthermore, the composition comprising heptanoic acid secondary hexyl esters produced in Example 2 has a pour point and kinematic viscosities that are lower than those of the industry standard C16/18 internal olefin. Reduced viscosity in the non-aqueous base fluid permits formulation of an invert emulsion drilling fluid with reduced viscosity that permits increased drilling rates relative to those of an invert emulsion formulated with a base fluid of higher viscosity. It should additionally be noted that the compositions of monocarboxylic acid secondary esters of Examples 1 and 5 along with the blend of the compositions of monocarboxylic acid secondary esters of Example 3 and Example 5 (i.e., 50:50 (w:w) composition of heptanoic acid secondary octyl esters:composition of heptanoic acid secondary dodecyl esters and the 25:75 (w:w) composition of heptanoic acid secondary octyl esters:composition of heptanoic acid secondary dodecyl esters) have excellent pour point properties. Further, the compositions of monocarboxylic acid secondary esters of Examples 1 and 3 and the 50:50 (w:w) blend of the compositions of monocarboxylic acid secondary esters of Examples 3 and 5 have kinematic viscosities lower than tetradecyl propionates, which have been used in invert emulsion drilling fluids.

The $LC_{50}$ sediment toxicological ratios of compositions comprising secondary esters of Examples 2-3 and 5 were investigated. More specifically, the toxicity of a composition comprising heptanoic acid secondary hexyl ester, a composition comprising heptanoic acid secondary octyl ester, and a composition comprising heptanoic acid secondary dodecyl esters were investigated. The $LC_{50}$ sediment toxicological ratio was determined for the compositions comprising secondary esters of Examples 2-3 and 5 in accordance with the Method for Conducting a Sediment Toxicity Test with *Leptocheirus plumulosus* and Non Aqueous Fluid of Syn-

TABLE 1

|  | Kinematic Viscosities (cSt) | | | | Flash Point | Pour Point |
| --- | --- | --- | --- | --- | --- | --- |
|  | 0° C. | 25° C. | 40° C. | 100° C. | (COC, ° C.) | (° C.) |
| Hexadecyl Propionates | 21.33 | 10.51 | 6.64 | 2.29 | 181 | −18 |
| Tetradecyl Propionates | 13.10 | 5.34 | 3.87 | 1.45 | 158 | −38 |
| Nonanoic Acid Secondary Octyl Esters (Example 1) | — | — | 3.55 | 1.34 | 161 | ≤−90 |
| Heptanoic Acid Secondary Hexyl Esters (Example 2) | — | 2.48 | 1.88 | 0.86 | 119 | ≤−90 |
| Heptanoic Acid Secondary Octyl Esters (Example 3) | 7.71 | 3.79 | 2.74 | 1.13 | 146 | ≤−90 |
| Heptanoic Acid Secondary Dodecyl Esters (Example 5) | — | 7.14 | 4.79 | 1.66 | 173 | ≤−90 |
| 50:50 (w:w) Heptanoic Acid Secondary Octyl Esters:Heptanoic Acid Secondary Dodecyl Esters | 11.48 | 5.15 | 3.58 | 1.35 | 148 | ≤−90 |
| 25:75 (w:w) Heptanoic Acid Secondary Octyl Esters:Heptanoic Acid Secondary Dodecyl Esters | 14.48 | 6.20 | 4.20 | 1.51 | 160 | ≤−90 |
| C16/18 Internal Olefins (65:35, w:w) | 7.93 | 3.95 | 2.86 | 1.29 | 145 | <−10 | thetic Base Drilling Muds (Appendix A) of the Requirements for NPDES General Permit for New and Existing Sources and New Dischargers in the Offshore Subcategory of the Oil and Gas Extraction Category for the Western Portion of the Outer Continental Shelf of the Gulf of Mexico (GMG290000) using ASTM E1367-92. The $LC_{50}$ sediment toxicological ratio refers to a ratio of an $LC_{50}$ sediment toxicity value for a $C_{16}$ and $C_{18}$ Internal Olefin standard synthetic reference fluid (i.e., a 65/35 blend, proportioned by mass, of internal hexadecenes (Chemical Abstract Service No. 26952-14-7) and internal octadecenes (Chemical Abstract Service No. 27070-568-2), respectively) divided by an $LC_{50}$ sediment toxicity value for the studied sample. Table 2 provides the Sediment Toxicological Ratio for the compositions comprising secondary esters of Examples 2-3 and 5 along with the Sediment Toxicological Ratio for several other compounds/compositions.

TABLE 2

| Material | Sediment Toxicity Ratio |
| --- | --- |
| Heptanoic Acid Secondary Hexyl Esters (Example 2) | 0.2, 0.4 |
| Heptanoic Acid Secondary Octyl Esters (Example 3) | 0.4, 0.4, 0.4, 0.3, 0.3, 0.3 |
| Heptanoic Acid Secondary Dodecyl Esters (Example 5) | 0.3, 0.4 |
| 50:50 (w:w) Heptanoic Acid Secondary Octyl Esters:Heptanoic Acid Secondary Dodecyl Esters | 0.3, 0.3 |
| 25:75 (w:w) Heptanoic Acid Secondary Octyl Esters:Heptanoic Acid Secondary Dodecyl Esters | <0.2, 0.3 |
| 1-Dodecene | >3.2 |
| 1-Tetradecene | >3.2 |
| 1-Hexadecene | 0.7-1.0 |
| 1-Octadecene | 0.7-1.0 |
| C16/18 Internal Olefins | 1.0 |
| C20/24 Internal Olefins | 0.4 |

As illustrated in Table 2, the compositions comprising heptanoic acid secondary hexyl esters (composition of Example 2), heptanoic acid secondary octyl esters (composition of Example 3), heptanoic acid secondary dodecyl esters (composition of Example 5), unexpectedly had sediment toxicological ratios significantly lower than 1 and appear to be insensitive to molecular weight. As expected, linear alpha olefins having a molecular weight less than either component of the toxicological ratio standard reference fluid (i.e., $C_{16}$ and $C_{18}$ Internal Olefin) routinely fail the sediment toxicological ratio test (i.e., their sediment toxicological ratio exceeds 1.0). The low toxicity of the compositions comprising heptanoic acid secondary esters of Examples 2-3 and 5 allows the completely unexpected opportunity for the use of these compositions as a non-aqueous base fluid for wellbore treatment fluids (e.g., as all or part of the continuous phase of an invert emulsion drilling fluid).

Examples 6 and 7

The properties of wellbore treatment fluids prepared with compositions of the type disclosed herein were investigated. More specifically, an invert emulsion drilling fluid, Example 6, was prepared using the composition comprising heptanoic acid secondary octyl ester of Example 3 and an invert emulsion drilling fluid, Example 7, was prepared using the composition comprising heptanoic acid secondary dodecyl esters of Example 5. Table 3 provides the composition of the invert emulsion drilling fluids of Examples 6 and 7.

TABLE 3

Invert Emulsion Drilling Fluid Compositions of Example 6 and Example 7

| Component | Example 6 Base Fluid Composition Comprising Heptanoic Acid Secondary Octyl Esters from Example 3 | Example 7 Base Fluid Composition Comprising Heptanoic Acid Secondary Dodecyl Esters from Example 5 |
| --- | --- | --- |
| Base fluid, grams | 170.79 | 170.59 |
| Organoclay Viscosifier, grams | 3.00 | 3.00 |
| Emulsion Stabilizer, grams | 8.00 | 8.00 |
| Emulsifier, grams | 4.00 | 4.00 |
| Water, grams | 37.10 | 37.10 |
| Calcium Chloride, grams | 13.10 | 13.10 |
| Lime, grams | 3.00 | 3.00 |
| Fluid Loss Additive, grams | 10.00 | 10.00 |
| Rheological Modifier, grams | 0.50 | 0.50 |
| Barite, grams | 334.00 | 334.00 |
| Simulated Drill Solids, grams | 20.00 | 20.00 |

Once all the components were added, the composition was mixed on a Hamilton Beach mixer on low speed for 30 minutes.

Table 4 provides the initial rheological properties of the invert emulsion drilling fluid of Example 6 and Example 7 at 120° F. (48.9° C.) and 150° F. (65.6° C.).

TABLE 4

Properties of Invert Emulsion Drilling Fluids of Examples 6 and 7 at 120° F. (48.9° C.) and 150° F. (65.6° C.)

|  | Example 6 Invert Emulsion Drilling Fluid | | Example 7 Invert Emulsion Drilling Fluid | |
| --- | --- | --- | --- | --- |
|  | 120° F. | 150° F. | 120° F. | 150° F. |
| Density*, gr/mL | 1.694 | — | 1.689 | — |
| Density*, ppg | 14.14 | — | 14.10 | — |
| Fann dial reading @ 600 RPM | 59 | 47 | 96 | 70 |
| Fann dial reading @ 300 RPM | 35 | 27 | 56 | 41 |
| Fann dial reading @ 200 RPM | 27 | 24 | 42 | 32 |
| Fann dial reading @ 100 RPM | 18 | 15 | 28 | 22 |
| Fann dial reading @ 6 RPM | 8 | 7 | 11 | 11 |
| Fann dial reading @ 3 RPM | 7 | 6 | 10 | 10 |
| Plastic Viscosity, cP @ 120° F. | 24 | 20 | 40 | 29 |
| Yield Point, lb/100 sq. ft. | 11 | 7 | 16 | 12 |
| 10 sec gel, lb/100 sq. ft. | 12 | 10 | 17 | 16 |
| 10 min gel, lb/100 sq. ft. | 21 | 17 | 31 | 27 |
| Electrical Stability @120° F. | 744 | 657 | 883 | 888 |
| Basic Alkalinity Demand (BAD) | 1.04 | — | 1.04 | — |
| Drilling mud alkalinity (Pom) | 1.640 | — | 1.610 | — |
| Excess Lime, lb/bbl | 2.13 | — | 2.09 | — |

*Densities are the average of four runs subjected to pycnometry using standard invert emulsion drilling mud practices.

The initial rheological properties of the resulting invert emulsion drilling fluids of Example 6 and Example 7 were measured using a coaxial cylinder rotational (FANN 35 style) viscometer at 3, 6, 100, 200, 300, and 600 RPM. The viscosity spring deflection of a standard bob and sleeve at each mixing speed, plastic viscosity (centipoise (cP)), and yield point (lbs/100 ft$^2$) were measured in accordance with API Recommended Practices 10B, Bingham Plastic Model. The electrical stability refers to a measure of invert emulsion stability and can be measured in accordance with API 13B-2 (2005). The gelling properties were also recorded at 10 seconds and 10 minutes. Basis alkalinity demand, drilling mud alkalinity, and excess lime were measured using industry standard practices. The invert emulsion drilling fluids of Example 6 and Example 7 were aged by hot rolling using a hot air rolling oven and aging cells for 16 hours at 150° F. to study temperature stability of the invert emulsion drilling fluids. Over time, high temperatures can degrade the components of an invert emulsion drilling fluid, and alter its performance. High-temperature aging of the invert emulsion drilling fluid (e.g., hot rolling) can be conducted to assess the impact that high temperatures have on performance. The invert emulsion drilling fluid can be aged dynamically, wherein the invert emulsion drilling fluid can be rolled in a pressurized cell at the desired test temperature to simulate the invert emulsion drilling fluid under drilling conditions. After undergoing aging, the invert emulsion drilling fluid can be evaluated using the same tests that are applied to non-aged invert emulsion drilling fluid.

The invert emulsion drilling fluids of Example 6 and Example 7 were tested for performance at 120° F. (48.9° C.) and 150° F. (65.6° C.) after hot rolling at 150° F. (65.6° C.) for 16 hours. The performance data for the invert emulsion drilling fluids of Example 6 and Example 7 are summarized in Table 5.

TABLE 5

Properties of Invert Emulsion Drilling Fluids of Examples 6 and 7 at 120° F. (48.9° C.) and 150° F. (65.6° C.) after Hot Rolling at 150° F. (65.6° C.) for 16 hours

| Property | Example 6 Invert Emulsion Drilling Fluid | | Example 7 Invert Emulsion Drilling Fluid | |
| --- | --- | --- | --- | --- |
|  | 120° F. | 150° F. | 120° F. | 150° F. |
| Fann dial reading @ 600 RPM | 58 | 48 | 91 | 67 |
| Fann dial reading @ 300 RPM | 34 | 26 | 53 | 39 |
| Fann dial reading @ 200 RPM | 26 | 20 | 40 | 30 |
| Fann dial reading @ 100 RPM | 18 | 14 | 26 | 21 |
| Fann dial reading @ 6 RPM | 8 | 7 | 10 | 9 |
| Fann dial reading @ 3 RPM | 7 | 6 | 9 | 8 |
| Plastic Viscosity, cP @120° F. | 24 | 22 | 38 | 28 |
| Yield Point, lb/100 sq. ft. | 10 | 4 | 15 | 11 |
| 10 sec gel, lb/100 sq. ft. | 12 | 11 | 15 | 13 |
| 10 min gel, lb/100 sq. ft. | 20 | 18 | 27 | 23 |
| HTHP filtrate @ 300° F., 500 psi | 3.2 | — | 1.0 | — |
| Water, mls | 0.0 | — | 0.0 | — |
| Cake thickness, HTHP, 32nd | 3 | — | 3 | — |
| Electrical Stability @120° F. | 712 | 663 | 840 | 832 |

The fluid loss properties of an invert emulsion drilling fluid can be determined using a standard high temperature high pressure (HTHP) fluid loss test, according to the specifications of the American Petroleum Institute (API), as described in "Recommended Practice Standard Procedure for Field Testing Oil-Based Drilling Fluids." The test employs a pressurized cell fitted with a standard hardened filter paper as a filtration medium. The filtration behavior of the invert emulsion drilling fluid can be determined with a standard pressure differential across the filter paper of 500 psi (3.45 MPa). A filter cake is allowed to build up on the filter paper for 30 minutes and the volume of filtrate collected after this 30 minute period is then recorded. Generally, the test temperature can be in the range from about 50° C. to about 200° C. The filter cake thickness can be measured and reported as well, along with the volume of water that is lost.

The data in Table 6 indicate that aging the invert emulsion drilling fluids of Example 6 and Example 7 did not impact the properties (e.g., rheological properties) of the fluid significantly.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior invention.

In any application before the United States Patent and Trademark Office, the Abstract of this application is provided for the purpose of satisfying the requirements of 37 C.F.R. §1.72 and the purpose stated in 37 C.F.R. §1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that can be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

ADDITIONAL DISCLOSURE

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

Group A

Embodiment 1

A composition comprising at least 75 mol %, at least 80 mol %, at least 85 mol %, at least 90 mol %, or at least 92 mol % $C_6$ to $C_9$ monocarboxylic acid secondary $C_6$ to $C_{12}$ esters.

Embodiment 2

The composition of embodiment 1, wherein the $C_6$ to $C_9$ monocarboxylic acid secondary $C_6$ to $C_{12}$ esters comprise $C_6$ to $C_9$ monocarboxylic acid linear secondary $C_6$ to $C_{12}$ esters.

Embodiment 3

The composition of embodiment 1, wherein the $C_6$ to $C_9$ monocarboxylic acid secondary $C_6$ to $C_{12}$ esters comprise at least 90 mol %, at least 92 mol %, at least 94 mol %, at least 96 mol %, or at least 98 mol % $C_6$ to $C_9$ monocarboxylic acid linear secondary $C_6$ to $C_{12}$ esters.

Embodiment 4

The composition of any one of embodiments 1 to 3, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof; alternatively, a $C_6$ to $C_9$ monocarboxylic acid 2-hexyl ester, a $C_6$ to $C_9$ monocarboxylic acid 2-octyl ester, a $C_6$ to $C_9$ monocarboxylic acid 2-decyl ester, a $C_6$ to $C_9$ monocarboxylic acid 2-dodecyl ester, or combinations thereof; alternatively, a $C_6$ to $C_9$ monocarboxylic acid 2-hexyl ester; alternatively, a $C_6$ to $C_9$ monocarboxylic acid 2-octyl ester; alternatively, a $C_6$ to $C_9$ monocarboxylic acid 2-decyl ester; or alternatively, a $C_6$ to $C_9$ monocarboxylic acid 2-dodecyl ester.

Embodiment 5

The composition of any one of embodiments 1 to 4, wherein the $C_6$ to $C_9$ monocarboxylic acid secondary $C_6$ to $C_{12}$ esters comprise at least 10 mol % of a $C_6$ to $C_9$ monocarboxylic acid 3-hexyl ester, a $C_6$ to $C_9$ monocarboxylic acid 3-heptyl ester, a $C_6$ to $C_9$ monocarboxylic acid 3-octyl ester, a $C_6$ to $C_9$ monocarboxylic acid 3-nonyl ester, a $C_6$ to $C_9$ monocarboxylic acid 3-decyl ester, a $C_6$ to $C_9$ monocarboxylic acid 3-undecyl ester, a $C_6$ to $C_9$ monocarboxylic acid 3-dodecyl ester, or combinations thereof; alternatively, a $C_6$ to $C_9$ monocarboxylic acid 3-hexyl ester, a $C_6$ to $C_9$ monocarboxylic acid 3-octyl ester, a $C_6$ to $C_9$ monocarboxylic acid 3-decyl ester, a $C_6$ to $C_9$ monocarboxylic acid 3-dodecyl ester, or combinations thereof; alternatively, a $C_6$ to $C_9$ monocarboxylic acid 3-hexyl ester; alternatively, a $C_6$ to $C_9$ monocarboxylic acid 3-octyl ester; alternatively, a $C_6$ to $C_9$ monocarboxylic acid 3-decyl ester; or alternatively, a $C_6$ to $C_9$ monocarboxylic acid 3-dodecyl ester.

Embodiment 6

The composition of any one of embodiments 1 to 5, wherein the $C_6$ to $C_9$ monocarboxylic acid secondary $C_6$ to $C_{12}$ esters comprise at least 7 mol % of a $C_6$ to $C_9$ monocarboxylic acid 4-octyl ester, a $C_6$ to $C_9$ monocarboxylic acid 4-nonyl ester, a $C_6$ to $C_9$ monocarboxylic acid 4-decyl ester, a $C_6$ to $C_9$ monocarboxylic acid 4-undecyl ester, a $C_6$ to $C_9$ monocarboxylic acid 4-dodecyl ester, or combinations thereof; alternatively, a $C_6$ to $C_9$ monocarboxylic acid 4-octyl ester, a $C_6$ to $C_9$ monocarboxylic acid 4-decyl ester, a $C_6$ to $C_9$ monocarboxylic acid 4-dodecyl ester, or combinations thereof; alternatively, a $C_6$ to $C_9$ monocarboxylic acid 4-octyl ester; alternatively, a $C_6$ to $C_9$ monocarboxylic acid 4-decyl ester; or alternatively, a $C_6$ to $C_9$ monocarboxylic acid 4-dodecyl ester.

Embodiment 7

The composition of any one of embodiments 1 to 6, wherein (i) the $C_6$ to $C_9$ monocarboxylic acid secondary $C_6$ esters comprise a $C_6$ to $C_9$ monocarboxylic acid 2-hexyl ester and a $C_6$ to $C_9$ monocarboxylic acid 3-hexyl ester; (ii) the $C_6$ to $C_9$ monocarboxylic acid secondary $C_7$ esters comprise a $C_6$ to $C_9$ monocarboxylic acid 2-heptyl ester, a $C_6$ to $C_9$ monocarboxylic acid 3-heptyl ester, and a $C_6$ to $C_9$ monocarboxylic acid 4-heptyl ester; (iii) the $C_6$ to $C_9$ monocarboxylic acid secondary $C_8$ esters comprise a $C_6$ to $C_9$ monocarboxylic acid 2-octyl ester, a $C_6$ to $C_9$ monocarboxylic acid 3-octyl ester, and a $C_6$ to $C_9$ monocarboxylic acid 4-octyl ester; (iv) the $C_6$ to $C_9$ monocarboxylic acid secondary $C_9$ esters comprise a $C_6$ to $C_9$ monocarboxylic acid 2-nonyl ester, a $C_6$ to $C_9$ monocarboxylic acid 3-nonyl ester, a $C_6$ to $C_9$ monocarboxylic acid 4-nonyl ester, and a $C_6$ to $C_9$ monocarboxylic acid 5-nonyl ester; (v) the $C_6$ to $C_9$ monocarboxylic acid secondary $C_{10}$ esters comprise a $C_6$ to $C_9$ monocarboxylic acid 2-decyl ester, a $C_6$ to $C_9$ monocarboxylic acid 3-decyl ester, a $C_6$ to $C_9$ monocarboxylic acid 4-decyl ester, and a $C_6$ to $C_9$ monocarboxylic acid 5-decyl ester; (vi) the $C_6$ to $C_9$ monocarboxylic acid secondary $C_{11}$ esters comprise a $C_6$ to $C_9$ monocarboxylic acid 2-undecyl ester, a $C_6$ to $C_9$ monocarboxylic acid 3-undecyl ester, a $C_6$ to $C_9$ monocarboxylic acid 4-undecyl ester, a $C_6$ to $C_9$ monocarboxylic acid 5-undecyl ester, and a $C_6$ to $C_9$ monocarboxylic acid 6-undecyl ester; and/or (vii) the $C_6$ to $C_9$ monocarboxylic acid secondary $C_{12}$ esters comprise a $C_6$ to $C_9$ monocarboxylic acid 2-dodecyl ester, a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and a $C_6$ to $C_9$ monocarboxylic acid 6-dodecyl ester.

Embodiment 8

The composition of any one of embodiments 1 to 7, comprising less than 5 mol %, less than 4 mol %, less than 3 mol %, less than 2 mol %, or less than 1 mol % of a $C_6$ to $C_9$ monocarboxylic acid primary $C_6$ to $C_{12}$ ester; alternatively, a $C_6$ to $C_9$ monocarboxylic acid linear primary $C_6$ to $C_{12}$ ester; alternatively, a $C_6$ to $C_9$ monocarboxylic acid 1-hexyl ester, a $C_6$ to $C_9$ monocarboxylic acid 1-heptyl ester, a $C_6$ to $C_9$ monocarboxylic acid 1-octyl ester, a $C_6$ to $C_9$ monocarboxylic acid 1-nonyl ester, a $C_6$ to $C_9$ monocarboxylic acid 1-decyl ester, a $C_6$ to $C_9$ monocarboxylic acid 1-undecyl ester, a $C_6$ to $C_9$ monocarboxylic acid 1-dodecyl ester, or combinations thereof; alternatively, a $C_6$ to $C_9$ monocarboxylic acid 1-hexyl ester, a $C_6$ to $C_9$ monocarboxylic acid 1-octyl ester, a $C_6$ to $C_9$ monocarboxylic acid 1-decyl ester, a $C_6$ to $C_9$ monocarboxylic acid 1-dodecyl ester, or combinations thereof; alternatively, a $C_6$ to $C_9$ monocarboxylic acid 1-hexyl ester; alternatively, a $C_6$ to $C_9$ monocarboxylic acid 1-octyl ester; alternatively, a $C_6$ to $C_9$ monocarboxylic acid 1-decyl ester; or alternatively, a $C_6$ to $C_9$ monocarboxylic acid 1-dodecyl ester.

Embodiment 9

The composition of any one of embodiments 1 to 8, comprising less than or equal to 14 mol %, less than or equal to 12 mol %, less than or equal to 10 mol %, less than or equal to 8 mol %, or less than or equal to 6 mol % $C_{12}$ to $C_{24}$ olefins; from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{12}$ to $C_{24}$ olefins.

Embodiment 10

The composition of any one of embodiments 1 to 3, wherein the monocarboxylic acid secondary esters are $C_6$ to $C_9$ monocarboxylic acid secondary hexyl esters, and wherein the $C_6$ to $C_9$ monocarboxylic acid secondary hexyl esters comprise from 45 mol % to 75 mol % of a $C_6$ to $C_9$ monocarboxylic acid 2-hexyl ester and from 25 mol % to 55 mol % of a $C_6$ to $C_9$ monocarboxylic acid 3-hexyl ester; alternatively, from 50 mol % to 70 mol % of a $C_6$ to $C_9$ monocarboxylic acid 2-hexyl ester and from 30 mol % to 50 mol % of a $C_6$ to $C_9$ monocarboxylic acid 3-hexyl ester; or alternatively, from 55 mol % to 65 mol % of a $C_6$ to $C_9$ monocarboxylic acid 2-hexyl ester and from 35 mol % to 45 mol % of a $C_6$ to $C_9$ monocarboxylic acid 3-hexyl ester.

Embodiment 11

The composition of embodiment 10, comprising less than 5 mol %, less than 4 mol %, less than 3 mol %, less than 2 mol %, or less than 1 mol % $C_6$ to $C_9$ monocarboxylic acid primary $C_6$ esters; or alternatively, a $C_6$ to $C_9$ monocarboxylic acid 1-hexyl ester.

Embodiment 12

The composition of embodiments 10 or 11, comprising less than or equal to 14 mol %, less than or equal to 12 mol %, less than or equal to 10 mol %, less than or equal to 8 mol %, less than or equal to 6 mol % $C_{12}$ olefins, less than or equal to 5 mol %, less than or equal to 4 mol %, less than or equal to 3 mol %, less than or equal to 2 mol %, less than or equal to 1 mol %, less than or equal to 0.5 mol %, or less than or equal to 0.25 mol %; from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{12}$ olefins.

Embodiment 13

The composition of any one of embodiments 1 to 3, wherein the monocarboxylic acid secondary esters are $C_6$ to $C_9$ monocarboxylic acid secondary octyl esters, and wherein the $C_6$ to $C_9$ monocarboxylic acid secondary octyl esters comprise (a) from 30 mol % to 60 mol %, from 35 mol % to 55 mol %, or from 40 mol % to 50 mol % of a $C_6$ to $C_9$ monocarboxylic acid 2-octyl ester and (b) from 40 mol % to 70 mol %, from 45 mol % to 65 mol %, or from 50 mol % to 60 mol % of a $C_6$ to $C_9$ monocarboxylic acid 3-octyl ester and/or a $C_6$ to $C_9$ monocarboxylic acid 4-octyl ester; alternatively, from 30 mol % to 60 mol % of a $C_6$ to $C_9$ monocarboxylic acid 2-octyl ester, from 20 mol % to 40 mol % of a $C_6$ to $C_9$ monocarboxylic acid 3-octyl ester, and from 15 mol % to 30 mol % of a $C_6$ to $C_9$ monocarboxylic acid 4-octyl ester; alternatively, from 35 mol % to 55 mol % of a $C_6$ to $C_9$ monocarboxylic acid 2-octyl ester, from 22.5 mol % to 37.5 mol % of a $C_6$ to $C_9$ monocarboxylic acid 3-octyl ester, and from 17.5 mol % to 27.5 mol % of a $C_6$ to $C_9$ monocarboxylic acid 4-octyl ester; or alternatively, from 40 mol % to 50 mol % of a $C_6$ to $C_9$ monocarboxylic acid 2-octyl ester, from 25 mol % to 35 mol % of a $C_6$ to $C_9$ monocarboxylic acid 3-octyl ester, and from 20 mol % to 25 mol % of a $C_6$ to $C_9$ monocarboxylic acid 4-octyl ester.

Embodiment 14

The composition of embodiment 13, comprising less than 5 mol %, less than 4 mol %, less than 3 mol %, less than 2 mol %, or less than 1 mol % $C_6$ to $C_9$ monocarboxylic acid primary $C_8$ esters; or a $C_6$ to $C_9$ monocarboxylic acid 1-octyl ester.

Embodiment 15

The composition of embodiments 13 or 14, comprising less than or equal to 14 mol %, less than or equal to 12 mol %, less than or equal to 10 mol %, less than or equal to 8 mol %, or less than or equal to 6 mol % $C_{16}$ olefins; from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{16}$ olefins.

Embodiment 16

The composition of any one of embodiments 1 to 3, wherein the monocarboxylic acid secondary esters are $C_6$ to $C_9$ monocarboxylic acid secondary decyl esters, and wherein the $C_6$ to $C_9$ monocarboxylic acid secondary decyl esters comprise (a) from 25 mol % to 55 mol %, from 30 mol % to 50 mol %, or from 35 mol % to 45 mol % of a $C_6$ to $C_9$ monocarboxylic acid 2-decyl ester and (b) from 45 mol % to 75 mol %, from 50 mol % to 70 mol %, or from 55 mol % to 65 mol % of a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester; alternatively, from 25 mol % to 55 mol % of a $C_6$ to $C_9$ monocarboxylic acid 2-decyl ester, from 15 mol % to 35 mol % of a $C_6$ to $C_9$ monocarboxylic acid 3-decyl ester, from 10 mol % to 30 mol % of a $C_6$ to $C_9$ monocarboxylic acid 4-decyl ester, and from 5 mol % to 25 mol % of a $C_6$ to $C_9$ monocarboxylic acid 5-decyl ester; alternatively, from 30 mol % to 50 mol % of a $C_6$ to $C_9$ monocarboxylic acid 2-decyl ester, from 17.5 mol % to 32.5 mol % of a $C_6$ to $C_9$ monocarboxylic acid 3-decyl ester, from 12.5 mol % to 27.5 mol % of a $C_6$ to $C_9$ monocarboxylic acid 4-decyl ester, and from 7.5 mol % to 22.5 mol % of a $C_6$ to $C_9$ monocarboxylic acid 5-decyl ester; or alternatively, from 35 mol % to 45 mol % of a $C_6$ to $C_9$ monocarboxylic acid 2-decyl ester, from 20 mol % to 30 mol % of a $C_6$ to $C_9$ monocarboxylic acid 3-decyl ester, from 15 mol % to 25 mol % of a $C_6$ to $C_9$ monocarboxylic acid 4-decyl ester, and from 10 mol % to 20 mol % of a $C_6$ to $C_9$ monocarboxylic acid 5-decyl ester.

Embodiment 17

The composition of embodiment 16, comprising less than 5 mol %, less than 4 mol %, less than 3 mol %, less than 2 mol %, or less than 1 mol % $C_6$ to $C_9$ monocarboxylic acid primary $C_{10}$ esters; or alternatively, a $C_6$ to $C_9$ monocarboxylic acid 1-decyl ester.

Embodiment 18

The composition of embodiment 16 or 17, comprising less than or equal to 14 mol %, less than or equal to 12 mol %, less than or equal to 10 mol %, less than or equal to 8 mol %, or less than or equal to 6 mol % $C_{20}$ olefins; from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{20}$ olefins.

Embodiment 19

The composition of any one of embodiments 1 to 3, wherein the monocarboxylic acid secondary esters are $C_6$ to $C_9$ monocarboxylic acid secondary dodecyl esters, and wherein the $C_6$ to $C_9$ monocarboxylic acid secondary dodecyl esters comprise (a) from 20 mol % to 50 mol %, from 25 mol % to 45 mol %, or from 30 mol % to 40 mol % of a $C_6$ to $C_9$ monocarboxylic acid 2-dodecyl ester and (b) from 50 mol % to 80 mol %, from 55 mol % to 75 mol %, or from 60 mol % to 70 mol % of a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester; alternatively, from 20 mol % to 50 mol % of a $C_6$ to $C_9$ monocarboxylic acid 2-dodecyl ester, from 10 mol % to 30 mol % of a $C_6$ to $C_9$ monocarboxylic acid 3-dodecyl ester, from 5 mol % to 25 mol % of a $C_6$ to $C_9$ monocarboxylic acid 4-dodecyl ester, from 5 mol % to 25 mol % of a $C_6$ to $C_9$ monocarboxylic acid 5-dodecyl ester, and from 5 mol % to 25 mol % of a $C_6$ to $C_9$ monocarboxylic acid 6-dodecyl ester; alternatively, from 25 mol % to 45 mol % of a $C_6$ to $C_9$ monocarboxylic acid 2-dodecyl ester, from 12.5 mol % to 27.5 mol % of a $C_6$ to $C_9$ monocarboxylic acid 3-dodecyl ester, from 7.5 mol % to 22.5 mol % of a $C_6$ to $C_9$ monocarboxylic acid 4-dodecyl ester, from 7.5 mol % to 22.5 mol % of a $C_6$ to $C_9$ monocarboxylic acid 5-dodecyl ester, and from 7.5 mol % to 22.5 mol % of a $C_6$ to $C_9$ monocarboxylic acid 6-dodecyl ester; or alternatively, from 30 mol % to 40 mol % of a $C_6$ to $C_9$ monocarboxylic acid 2-dodecyl ester, from 15 mol % to 25 mol % of a $C_6$ to $C_9$ monocarboxylic acid 3-dodecyl ester, from 10 mol % to 20 mol % of a $C_6$ to $C_9$ monocarboxylic acid 4-dodecyl ester, from 10 mol % to 20 mol % of a $C_6$ to $C_9$ monocarboxylic acid 5-dodecyl ester, and from 10 mol % to 20 mol % of a $C_6$ to $C_9$ monocarboxylic acid 6-dodecyl ester.

Embodiment 20

The composition of embodiment 19, comprising less than 5 mol %, less than 4 mol %, less than 3 mol %, less than 2 mol %, or less than 1 mol % $C_6$ to $C_9$ monocarboxylic acid primary $C_{12}$ esters; or alternatively, a $C_6$ to $C_9$ monocarboxylic acid 1-dodecyl ester.

Embodiment 21

The composition of embodiment 19 or 20, comprising less than or equal to 14 mol %, less than or equal to 12 mol %, less than or equal to 10 mol %, less than or equal to 8 mol %, or less than or equal to 6 mol % $C_{24}$ olefins; from 1 mol % to 14 mol %, from 1 mol % to 12 mol %, from 2 mol % to 12 mol %, from 2 mol % to 10 mol %, from 3 mol % to 10 mol %, or from 3 mol % to 8 mol % $C_{24}$ olefins.

Embodiment 22

The composition of any one of embodiments 1 to 21, wherein the monocarboxylic acid of the $C_6$ to $C_9$ monocarboxylic acid secondary $C_6$ to $C_{12}$ esters is a hexanoic acid, a heptanoic acid, an octanoic acid, a nonanoic acid, or combinations thereof; alternatively, a heptanoic acid, an octanoic acid, a nonanoic acid, or combinations thereof; alternatively, a hexanoic acid; alternatively, a heptanoic acid; alternatively, an octanoic acid; or alternatively, a nonanoic acid.

Embodiment 23

The composition of embodiment 22, wherein the monocarboxylic acid of the $C_6$ to $C_9$ monocarboxylic acid secondary $C_6$ to $C_{12}$ esters comprise at least 80 mol %, at least 85 mol %, at least 90 mol %, or at least 95 mol % n-hexanoic acid, n-heptanoic acid, n-octanoic acid, n-nonanoic acid, or combinations thereof; alternatively, n-heptanoic acid, n-octanoic acid, n-nonanoic acid, or combinations thereof; alternatively, n-hexanoic acid; alternatively, n-heptanoic acid; alternatively, n-octanoic acid; or alternatively, n-nonanoic acid.

Embodiment 24

The composition of any one of embodiments 1 to 23, having a pour point (as measured in accordance with ASTM D97-12) of below −40° C., below −50° C., below −60° C., below −70° C., or below −80° C.

Embodiment 25

The composition of any one of embodiments 1 to 24, having a 100° C. kinematic viscosity (as measured in accordance with ASTM D445-12) of from 0.7 cSt to 2.5 cSt, from 0.75 cSt to 2.25 cSt, or from 0.8 cSt to 2 cSt.

Embodiment 26

The composition of any one of embodiments 1 to 25, having a $LC_{50}$ sediment toxicological ratio less than 1, less than 0.9, less than 0.8, less than 0.7, less than 0.6, or less than 0.5 when tested in accordance with ASTM E1367-92.

Embodiment 27

A process comprising: (a) contacting i) a carboxylic acid feedstock comprising, consisting essentially of, or consisting of, a $C_6$ to $C_9$ monocarboxylic acid, ii) an olefin feedstock comprising, consisting essentially of, or consisting of, $C_6$ to $C_{12}$ monoolefins, and iii) a solid acid catalyst; and (b) forming, in the substantial absence of water, a mixture comprising $C_6$ to $C_9$ monocarboxylic acid secondary $C_6$ to $C_{12}$ esters.

Embodiment 28

The process of embodiment 27, wherein carboxylic acid feedstock comprises, consists essentially of, or consists of, at least 80 mol %, at least 85 mol %, at least 90 mol %, or at least 95 mol % of a hexanoic acid, a heptanoic acid, an octanoic acid, a nonanoic acid, or combinations thereof; alternatively, a heptanoic acid, an octanoic acid, a nonanoic acid, or combinations thereof; alternatively, a hexanoic acid; alternatively, a heptanoic acid; alternatively, an octanoic acid; alternatively, a nonanoic acid; alternatively, n-hexanoic acid, n-heptanoic acid, n-octanoic acid, n-nonanoic acid, or combinations thereof; alternatively, n-heptanoic acid, n-octanoic acid, n-nonanoic acid, or combinations thereof; alternatively, n-hexanoic acid; alternatively, n-heptanoic acid; alternatively, n-octanoic acid; or alternatively, n-nonanoic acid.

Embodiment 29

The process of embodiment 27 or 28, wherein the carboxylic acid is prepared by the hydroformylation of a $C_5$ to $C_8$ monoolefin; alternatively, a linear $C_5$ to $C_8$ monoolefin; alternatively, a linear pentene, a linear hexene, a linear heptene, a linear octene, or combinations thereof; alternatively, a linear hexene, a linear heptene, a linear octene, or combinations thereof; alternatively, a linear hexene, a linear octene, or combinations thereof; alternatively, a linear pentene; alternatively, a linear hexene; alternatively, a linear heptene; alternatively, a linear octene; alternatively, 1-pentene, 1-hexene, 1-heptene, 1-octene, or combinations thereof; alternatively, 1-hexene, 1-heptene, 1-octene, or combinations thereof; alternatively, 1-hexene, 1-octene, or combinations thereof; alternatively, 1-pentene; alternatively, 1-hexene; alternatively, 1-heptene; or alternatively, 1-octene.

Embodiment 30

The process of any one of embodiment 27 or 29, wherein the olefin feedstock comprises, consists essentially of, or consists of, at least 80 mol %, at least 85 mol %, at least 90 mol %, or at least 95 mol % of a $C_6$ to $C_{12}$ monoolefin; alternatively, a linear $C_6$ to $C_{12}$ monoolefin; alternatively, a hexene, a heptene, an octene, a nonene, a decene, an undecene, a dodecene, or combinations thereof; alternatively, a hexene, an octene, a decene, a dodecene, or combinations thereof; alternatively, an octene, a decene, a dodecene, or combinations thereof; alternatively, a hexene, an octene, or combinations thereof; alternatively, an octene, a decene, or combinations thereof; alternatively, a decene, a dodecene, or combinations thereof; alternatively, a hexene; alternatively, an octene; alternatively, a decene; alternatively, a dodecene; alternatively, a linear hexene, a linear heptene, a linear octene, a linear nonene, a linear decene, a linear undecene, a linear dodecene, or combinations thereof; alternatively, a linear hexene, a linear octene, a linear decene, a linear dodecene, or combinations thereof; alternatively, a linear octene, a linear decene, a linear dodecene, or combinations thereof; alternatively, a linear hexene, a linear octene, or combinations thereof; alternatively, an linear octene, a linear decene, or combinations thereof; alternatively, a linear decene, a linear dodecene, or combinations thereof; alternatively, a linear hexene; alternatively, a linear octene; alternatively, a linear decene; alternatively, a linear dodecene; alternatively, 1-hexene, 1-heptene, 1-octene, 1-nonene, 1-decene, 1-undecene, 1-dodecene, or combinations thereof; alternatively, 1-hexene, 1-octene, 1-decene, 1-dodecene, or combinations thereof; alternatively, 1-hexene, 1-octene, 1-decene, or combinations thereof; alternatively, 1-octene, 1-decene, 1-dodecene, or combinations thereof; alternatively, 1-hexene, 1-octene, or combinations thereof; alternatively, 1-octene, 1-decene, or combinations thereof; alternatively, 1-decene, 1-dodecene, or combinations thereof; alternatively, 1-hexene; alternatively, 1-octene; alternatively, 1-decene; or alternatively, 1-dodecene.

Embodiment 31

The process of any one of embodiments 27 to 30, wherein the solid acid catalyst comprises, consist essentially of, or is, a tetrafluoroethylene polymer resin modified with perfluorovinyl ether groups terminated with sulfonate groups, a macroreticular, sulfonated, crosslinked copolymer of styrene and divinyl benzene, an acid washed clay, or combinations thereof; alternatively, a tetrafluoroethylene polymer resin modified with perfluorovinyl ether groups terminated with sulfonate groups; alternatively, a macroreticular, sulfonated, crosslinked copolymer of styrene and divinyl benzene; or alternatively, an acid washed clay.

Embodiment 32

The process of any one of embodiments 27 to 31, wherein the olefin feedstock and the carboxylic acid feedstock are contacted at a olefin to carboxylic acid molar ratio ranging from 0.2:1 to 9:1, from 0.4:1 to 6:1, from 0.5:1 to 3:1, from 0.6:1 to 2:1, from 0.7:1 to 1.5:1, from 0.75:1 to 1.25:1, from 0.8:1 to 1.2:1, from 0.85:1 to 1.15:1, from 0.9:1 to 1.1:1, or from 0.95:1 to 1.05:1.

Embodiment 33

The process of any one of embodiments 27 to 32, wherein the $C_6$ to $C_9$ monocarboxylic acid secondary $C_6$ to $C_{12}$ esters are formed at a temperature of from 40° C. to 120° C., from 50° C. to 110° C., from 60° C. to 105° C., from 70° C. to 100° C., or from 80° C. to 100° C.

Embodiment 34

The process of any one of embodiments 27 to 33, wherein the $C_6$ to $C_9$ monocarboxylic acid secondary $C_6$ to $C_{12}$ esters are formed in a reaction zone comprising a fixed bed reactor, a continuous stirred tank reactor, a plug flow reactor, or

Embodiment 35

The process of embodiment 34, wherein the $C_6$ to $C_9$ monocarboxylic acid secondary $C_6$ to $C_{12}$ esters are formed in a reaction zone comprising a fixed bed reactor at a weight hourly space velocity (WHSV) of from 0.1 to 5, from 0.1 to 4, from 0.2 to 3, from 0.2 to 2.5, from 0.3 to 2.5, from 0.4 to 3, or from 0.5 to 2.

Embodiment 36

The process of embodiment 34 or 35, further comprising separating at least a portion of the unconverted olefin feedstock and/or at least a portion of the unconverted carboxylic acid feedstock from the mixture comprising the $C_6$ to $C_9$ monocarboxylic acid secondary $C_6$ to $C_{12}$ esters and optionally recycling at least a portion of the unconverted olefin feedstock and at least a portion of the unconverted carboxylic acid to the reaction zone.

Embodiment 37

The process of any of embodiments 27 to 36, further comprising isolating a composition comprising at least 75 mol %, at least 80 mol %, at least 85 mol %, at least 90 mol %, or at least 92 mol % $C_6$ to $C_9$ monocarboxylic acid secondary $C_6$ to $C_{12}$ esters from the mixture.

Embodiment 38

The process of any one of embodiments 27 to 37, wherein process produces the composition of any one of embodiments 1 to 26.

Embodiment 39

The composition of any of embodiments 1 to 26 produced by the process of any one of embodiments 27 to 37.

Embodiment 40

A wellbore treatment fluid, comprising the composition of any one of embodiments 1 to 26.

Embodiment 41

The wellbore treatment fluid of embodiment 40, comprising a composition comprising (i) a composition comprising at least 75 mol %, at least 80 mol %, at least 85 mol %, at least 90 mol %, or at least 92 mol % heptanoic acid secondary hexyl esters, (ii) a composition comprising at least 75 mol %, at least 80 mol %, at least 85 mol %, at least 90 mol %, or at least 92 mol % heptanoic acid secondary octyl esters, (iii) a composition comprising at least 75 mol %, at least 80 mol %, at least 85 mol %, at least 90 mol %, or at least 92 mol % heptanoic acid secondary dodecyl esters, or (iv) combinations thereof; alternatively, (i) a composition comprising at least 75 mol %, at least 80 mol %, at least 85 mol %, at least 90 mol %, or at least 92 mol % heptanoic acid secondary octyl esters, (ii) a composition comprising at least 75 mol %, at least 80 mol %, at least 85 mol %, at least 90 mol %, or at least 92 mol % heptanoic acid secondary dodecyl esters, or (iii) combinations thereof; alternatively, at least 75 mol %, at least 80 mol %, at least 85 mol %, at least 90 mol %, or at least 92 mol % heptanoic acid secondary hexyl esters; alternatively, at least 75 mol %, at least 80 mol %, at least 85 mol %, at least 90 mol %, or at least 92 mol % heptanoic acid secondary octyl esters; or alternatively, at least 75 mol %, at least 80 mol %, at least 85 mol %, at least 90 mol %, or at least 92 mol % heptanoic acid secondary dodecyl esters.

Embodiment 42

The wellbore treatment fluid of embodiment 41, wherein a ratio of heptanoic acid secondary octyl esters to heptanoic acid secondary dodecyl esters ranges from 9:1 to 0.1:1, from 5:1 to 0.1:1, from 2:1 to 0.15:1, from 1.5:1 to 0.15:1, or from 1.5:1 to 0.2:1.

Embodiment 43

The wellbore treatment fluid of any one of embodiments 40 to 42, wherein the treatment fluid is a drilling fluid.

Embodiment 44

The wellbore treatment fluid of embodiment 43, wherein the treatment fluid is a water-based drilling fluid or a non-aqueous-based drilling fluid.

Embodiment 45

The wellbore treatment fluid of embodiment 44, wherein the drilling fluid comprises a weighting material.

Embodiment 46

The wellbore treatment fluid of embodiment 43, wherein the treatment fluid is formulated as an invert emulsion drilling fluid.

Embodiment 47

The wellbore treatment fluid of embodiment 46, wherein the invert emulsion drilling fluid comprises (i) a continuous phase comprising the composition comprising the monocarboxylic acid secondary ester, (ii) a weighting material, and (iii) water.

Embodiment 48

The wellbore treatment fluid of embodiment 46 or 47, wherein the continuous phase comprises from 15 wt. % to 50 wt. % of the wellbore treatment fluid.

Embodiment 49

The wellbore treatment fluid of any one of embodiments 46 to 48, wherein the treatment fluid is characterized by a plastic viscosity at 120° F. ranging from 20 cP to 45 cP.

Embodiment 50

The wellbore treatment fluid of any one of embodiments 46 to 49, wherein the treatment fluid is characterized by a yield point at 120° F. ranging from 7 lb/100 sq. ft. to 20 lb/100 sq. ft.

Embodiment 51

The wellbore treatment fluid of any one of embodiments 43 to 50, further comprising fluid loss additives, glass fibers, carbon fibers, hollow glass beads, ceramic beads, suspending agents, conditioning agents, retarders, dispersants, water softeners, emulsifiers, surfactants, defoamers, wetting agents, oxidation inhibitors, corrosion inhibitors, bactericides, thinners, clays, organic polymers, viscosifiers, scale inhibitors, friction reducers, temperature stability agents, pH-control additives, calcium reducers, shale control materials, or combinations thereof.

Embodiment 52

A process for preparing a wellbore treatment fluid comprising: (a) producing a composition of any one of embodiments 1 to 26 by the process of any one of embodiments 27 to 38; and (b) forming a wellbore treatment fluid of any one of embodiments 40 to 43 by using the composition of any one of embodiments 1 to 26.

Embodiment 53

A process for preparing a wellbore treatment fluid comprising: (a) producing a composition of any one of embodiments 1 to 26 by the process of any one of embodiments 27 to 38; and (b) contacting the composition of any one of embodiments 1 to 26 with a weighting material and water to form the wellbore treatment fluid of any one of embodiments 44 to 51.

Embodiment 54

The method of embodiment 52 or 53, wherein the wellbore treatment fluid comprises a drilling fluid.

Embodiment 55

The method of embodiment 54, wherein the wellbore treatment fluid is formulated as an invert emulsion drilling fluid comprising a continuous phase comprising the composition of any one of embodiments 1 to 26.

Embodiment 56

The method of embodiment 54, wherein the drilling fluid is formulated as a water-based drilling mud comprising the composition of any one of embodiments 1 to 26.

Group B

A first embodiment, which is a composition comprising at least 75 mol % $C_6$ to $C_9$ monocarboxylic acid secondary $C_6$ to $C_{12}$ esters, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof.

A second embodiment, which is the composition of the first embodiment, wherein the $C_6$ to $C_9$ monocarboxylic acid secondary $C_6$ to $C_{12}$ esters further comprise at least 10 mol % of a $C_6$ to $C_9$ monocarboxylic acid 3-hexyl ester, a $C_6$ to $C_9$ monocarboxylic acid 3-heptyl ester, a $C_6$ to $C_9$ monocarboxylic acid 3-octyl ester, a $C_6$ to $C_9$ monocarboxylic acid 3-nonyl ester, a $C_6$ to $C_9$ monocarboxylic acid 3-decyl ester, a $C_6$ to $C_9$ monocarboxylic acid 3-undecyl ester, a $C_6$ to $C_9$ monocarboxylic acid 3-dodecyl ester, or combinations thereof.

A third embodiment, which is the composition of any one of the first and the second embodiments, wherein the composition comprises from 1 mol % to 14 mol % $C_{12}$ to $C_{24}$ olefins.

A fourth embodiment, which is the composition of any one of the first through the third embodiments, wherein the composition comprises less than 5 mol % of a $C_6$ to $C_9$ monocarboxylic acid primary $C_6$ to $C_{12}$ ester.

A fifth embodiment, which is the composition of any one of the first through the fourth embodiments, wherein the $C_6$ to $C_9$ monocarboxylic acid secondary $C_6$ to $C_{12}$ esters are $C_6$ to $C_9$ monocarboxylic acid secondary $C_6$ esters, $C_6$ to $C_9$ monocarboxylic acid secondary $C_8$ esters, $C_6$ to $C_9$ monocarboxylic acid secondary $C_{10}$ esters, $C_6$ to $C_9$ monocarboxylic acid secondary $C_{12}$ esters, or combinations thereof.

A sixth embodiment, which is the composition of the fifth embodiment, wherein i) the $C_6$ to $C_9$ monocarboxylic acid secondary $C_6$ esters comprise from 45 mol % to 75 mol % of a $C_6$ to $C_9$ monocarboxylic acid 2-hexyl ester and from 25 mol % to 55 mol % of a $C_6$ to $C_9$ monocarboxylic acid 3-hexyl ester; ii) the $C_6$ to $C_9$ monocarboxylic acid secondary $C_8$ esters comprise (a) from 30 mol % to 60 mol % of a $C_6$ to $C_9$ monocarboxylic acid 2-octyl ester and (b) from 40 mol % to 70 mol % of a $C_6$ to $C_9$ monocarboxylic acid 3-octyl ester, and/or a $C_6$ to $C_9$ monocarboxylic acid 4-octyl ester; iii) the $C_6$ to $C_9$ monocarboxylic acid secondary $C_{10}$ esters comprise (a) from 25 mol % to 55 mol % of a $C_6$ to $C_9$ monocarboxylic acid 2-decyl ester and (b) from 45 mol % to 75 mol % of a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester; and iv) the $C_6$ to $C_9$ monocarboxylic acid secondary $C_{12}$ esters comprise (a) from 20 mol % to 50 mol % of a $C_6$ to $C_9$ monocarboxylic acid 2-dodecyl ester and (b) from 50 mol % to 80 mol % of a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester.

A seventh embodiment, which is the composition of any one of the first through the sixth embodiments, wherein the composition comprises i) at least 80 mol % heptanoic acid secondary hexyl esters, less than 5 mol % heptanoic acid 1-hexyl ester, and less than or equal to 14 mol % $C_{12}$ olefins, and wherein the heptanoic acid secondary hexyl esters comprise from 45 mol % to 75 mol % of a heptanoic acid 2-hexyl ester, and from 25 mol % to 55 mol % of a heptanoic acid 3-hexyl ester; ii) at least 80 mol % heptanoic acid secondary octyl esters, less than 5 mol % heptanoic acid 1-octyl ester, and less than or equal to 14 mol % $C_{16}$ olefins, and wherein the heptanoic acid secondary octyl esters comprise from 30 mol % to 60 mol % of a heptanoic acid 2-octyl ester, from 20 mol % to 40 mol % of a heptanoic acid 3-octyl ester, and from 15 mol % to 30 mol % of a heptanoic acid 4-octyl ester; iii) at least 80 mol % heptanoic acid secondary decyl esters, less than 5 mol % heptanoic acid 1-decyl ester, and less than or equal to 14 mol % $C_{20}$ olefins, and wherein the heptanoic acid secondary decyl esters comprise from 25 mol % to 55 mol % of a heptanoic acid 2-decyl ester, from 15 mol % to 35 mol % of a heptanoic acid 3-decyl ester, from 10 mol % to 30 mol % of a heptanoic acid 4-decyl ester, and from 5 mol % to 25 mol % of a heptanoic acid 5-decyl ester; or iv) at least 80 mol % heptanoic acid secondary dodecyl esters, less than 5 mol % heptanoic acid 1-dodecyl ester, and less than or equal to 14 mol % $C_{24}$ olefins, and wherein the heptanoic acid secondary dodecyl esters comprise from 20 mol % to 50 mol % of a heptanoic acid 2-dodecyl ester, from 10 mol % to 30 mol % of a heptanoic acid 3-dodecyl ester, from 5 mol % to 25 mol % of a heptanoic acid 4-dodecyl ester, from 5 mol % to 25 mol % of a heptanoic acid 5-dodecyl ester, and from 5 mol % to 25 mol % of a heptanoic acid 6-dodecyl ester.

An eighth embodiment, which is the composition of any one of the first through the seventh embodiments, wherein the composition is characterized as having a $LC_{50}$ sediment toxicological ratio less than 0.8 when tested in accordance with ASTM E1367-92.

A ninth embodiment, which is a process comprising (a) contacting i) a carboxylic acid feedstock comprising a $C_6$ to $C_9$ monocarboxylic acid, ii) an olefin feedstock comprising $C_6$ to $C_{12}$ monoolefins, and iii) a solid acid catalyst; (b) forming, in the substantial absence of water, a mixture comprising $C_6$ to $C_9$ monocarboxylic acid secondary $C_6$ to $C_{12}$ esters; and (c) isolating a composition comprising at least 75 mol % $C_6$ to $C_9$ monocarboxylic acid secondary $C_6$ to $C_{12}$ esters from the mixture, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof.

A tenth embodiment, which is the process of the ninth embodiment, wherein the carboxylic acid feedstock comprises at least 80 mol % of n-hexanoic acid, n-heptanoic acid, n-octanoic acid, n-nonanoic acid, or combinations thereof; and wherein the $C_6$ to $C_{12}$ monoolefins comprise at least 80 mol % of a linear $C_6$ to $C_{12}$ monoolefin.

An eleventh embodiment, which is the process of any one of the ninth and the tenth embodiments, wherein the $C_6$ to $C_9$ monocarboxylic acid is prepared by hydroformylation of a linear $C_5$ to $C_8$ monoolefin.

A twelfth embodiment, which is the process of any one of the ninth through the eleventh embodiments, wherein the solid acid catalyst comprises a tetrafluoroethylene polymer resin modified with perfluorovinyl ether groups terminated with sulfonate groups; a macroreticular, sulfonated, cross-linked copolymer of styrene and divinyl benzene; an acid washed clay; or combinations thereof.

A thirteenth embodiment, which is the process of any one of the ninth through the twelfth embodiments, wherein the mixture comprises $C_{12}$ to $C_{24}$ olefins, and a $C_6$ to $C_9$ monocarboxylic acid primary $C_6$ to $C_{12}$ ester.

A fourteenth embodiment, which is the process of any one of the ninth through the thirteenth embodiments, wherein the isolated composition comprises i) $C_6$ to $C_9$ monocarboxylic acid secondary $C_6$ esters comprising from 45 mol % to 75 mol % of a $C_6$ to $C_9$ monocarboxylic acid 2-hexyl ester and from 25 mol % to 55 mol % of a $C_6$ to $C_9$ monocarboxylic acid 3-hexyl ester; ii) $C_6$ to $C_9$ monocarboxylic acid secondary $C_8$ esters comprising (a) from 30 mol % to 60 mol % of a $C_6$ to $C_9$ monocarboxylic acid 2-octyl ester and (b) from 40 mol % to 70 mol % of a $C_6$ to $C_9$ monocarboxylic acid 3-octyl ester, and/or a $C_6$ to $C_9$ monocarboxylic acid 4-octyl ester; iii) $C_6$ to $C_9$ monocarboxylic acid secondary $C_{10}$ esters comprising (a) from 25 mol % to 55 mol % of a $C_6$ to $C_9$ monocarboxylic acid 2-decyl ester and (b) from 45 mol % to 75 mol % of a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester; iv) $C_6$ to $C_9$ mono-carboxylic acid secondary $C_{12}$ esters comprising (a) from 20 mol % to 50 mol % of a $C_6$ to $C_9$ monocarboxylic acid 2-dodecyl ester and (b) from 50 mol % to 80 mol % of a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester; or combinations thereof.

A fifteenth embodiment, which is the process of any one of the ninth through the fourteenth embodiments, wherein the isolated composition comprises i) at least 80 mol % heptanoic acid secondary hexyl esters, less than 5 mol % heptanoic acid 1-hexyl ester, and less than or equal to 14 mol % $C_{12}$ olefins, and wherein the heptanoic acid secondary hexyl esters comprise from 45 mol % to 75 mol % of a heptanoic acid 2-hexyl ester, and from 25 mol % to 55 mol % of a heptanoic acid 3-hexyl ester; ii) at least 80 mol % heptanoic acid secondary octyl esters, less than 5 mol % heptanoic acid 1-octyl ester, and less than or equal to 14 mol % $C_{16}$ olefins, and wherein the heptanoic acid secondary octyl esters comprise from 30 mol % to 60 mol % of a heptanoic acid 2-octyl ester, from 20 mol % to 40 mol % of a heptanoic acid 3-octyl ester, and from 15 mol % to 30 mol % of a heptanoic acid 4-octyl ester; iii) at least 80 mol % heptanoic acid secondary decyl esters, less than 5 mol % heptanoic acid 1-decyl ester, and less than or equal to 14 mol % $C_{20}$ olefins, and wherein the heptanoic acid secondary decyl esters comprise from 25 mol % to 55 mol % of a heptanoic acid 2-decyl ester, from 15 mol % to 35 mol % of a heptanoic acid 3-decyl ester, from 10 mol % to 30 mol % of a heptanoic acid 4-decyl ester, and from 5 mol % to 25 mol % of a heptanoic acid 5-decyl ester; or iv) at least 80 mol % heptanoic acid secondary dodecyl esters, less than 5 mol % heptanoic acid 1-dodecyl ester, and less than or equal to 14 mol % $C_{24}$ olefins, and wherein the heptanoic acid secondary dodecyl esters comprise from 20 mol % to 50 mol % of a heptanoic acid 2-dodecyl ester, from 10 mol % to 30 mol % of a heptanoic acid 3-dodecyl ester, from 5 mol % to 25 mol % of a heptanoic acid 4-dodecyl ester, from 5 mol % to 25 mol % of a heptanoic acid 5-dodecyl ester, and from 5 mol % to 25 mol % of a heptanoic acid 6-dodecyl ester.

A sixteenth embodiment, which is a wellbore treatment fluid comprising a composition comprising at least 75 mol % $C_6$ to $C_9$ monocarboxylic acid secondary $C_6$ to $C_{12}$ esters, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof.

A seventeenth embodiment, which is the wellbore treatment fluid of the sixteenth embodiment, wherein the composition comprises i) $C_6$ to $C_9$ monocarboxylic acid secondary $C_6$ esters comprising from 45 mol % to 75 mol % of a $C_6$ to $C_9$ monocarboxylic acid 2-hexyl ester and from 25 mol % to 55 mol % of a $C_6$ to $C_9$ monocarboxylic acid 3-hexyl ester; ii) $C_6$ to $C_9$ monocarboxylic acid secondary $C_8$ esters comprising (a) from 30 mol % to 60 mol % of a $C_6$ to $C_9$ monocarboxylic acid 2-octyl ester and (b) from 40 mol % to 70 mol % of a $C_6$ to $C_9$ monocarboxylic acid 3-octyl ester, and/or a $C_6$ to $C_9$ monocarboxylic acid 4-octyl ester; iii) $C_6$ to $C_9$ monocarboxylic acid secondary $C_{10}$ esters comprising (a) from 25 mol % to 55 mol % of a $C_6$ to $C_9$ monocarboxylic acid 2-decyl ester and (b) from 45 mol % to 75 mol % of a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester; iv) $C_6$ to $C_9$ monocarboxylic acid secondary $C_{12}$ esters comprising (a) from 20 mol % to 50 mol % of a $C_6$ to $C_9$ monocarboxylic acid 2-dodecyl ester and (b) from 50 mol % to 80 mol % of a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester; or combinations thereof.

An eighteenth embodiment, which is the wellbore treatment fluid of any one of the sixteenth and the seventeenth embodiments, wherein the composition comprises i) a composition comprising at least 75 mol % heptanoic acid secondary hexyl esters, ii) a composition comprising at least 75 mol % heptanoic acid secondary octyl esters, iii) a composition comprising at least 75 mol % heptanoic acid secondary decyl esters, iv) a composition comprising at least 75 mol % heptanoic acid secondary dodecyl esters, or combinations thereof.

A nineteenth embodiment, which is the wellbore treatment fluid of any one of the sixteenth through the eighteenth embodiments, wherein the composition is i) a composition comprising at least 80 mol % heptanoic acid secondary hexyl esters, less than 5 mol % heptanoic acid 1-hexyl ester, and less than or equal to 14 mol % $C_{12}$ olefins, and wherein the heptanoic acid secondary hexyl esters comprise from 45 mol % to 75 mol % of a heptanoic acid 2-hexyl ester, and from 25 mol % to 55 mol % of a heptanoic acid 3-hexyl ester; ii) a composition comprising at least 80 mol % heptanoic acid secondary octyl esters, less than 5 mol % heptanoic acid 1-octyl ester, and less than or equal to 14 mol % $C_{16}$ olefins, and wherein the heptanoic acid secondary octyl esters comprise from 30 mol % to 60 mol % of a heptanoic acid 2-octyl ester, from 20 mol % to 40 mol % of a heptanoic acid 3-octyl ester, and from 15 mol % to 30 mol % of a heptanoic acid 4-octyl ester; iii) a composition comprising at least 80 mol % heptanoic acid secondary decyl esters, less than 5 mol % heptanoic acid 1-decyl ester, and less than or equal to 14 mol % $C_{20}$ olefins, and wherein the heptanoic acid secondary decyl esters comprise from 25 mol % to 55 mol % of a heptanoic acid 2-decyl ester, from 15 mol % to 35 mol % of a heptanoic acid 3-decyl ester, from 10 mol % to 30 mol % of a $C_7$ to $C_9$ heptanoic acid 4-decyl ester, and from 5 mol % to 25 mol % of a heptanoic acid 5-decyl ester; iv) a composition comprising at least 80 mol % heptanoic acid secondary dodecyl esters, less than 5 mol % heptanoic acid 1-dodecyl ester, and less than or equal to 14 mol % $C_{24}$ olefins, and wherein the heptanoic acid secondary dodecyl esters comprise from 20 mol % to 50 mol % of a heptanoic acid 2-dodecyl ester, from 10 mol % to 30 mol % of a heptanoic acid 3-dodecyl ester, from 5 mol % to 25 mol % of a heptanoic acid 4-dodecyl ester, from 5 mol % to 25 mol % of a heptanoic acid 5-dodecyl ester, and from 5 mol % to 25 mol % of a heptanoic acid 6-dodecyl ester; or combinations thereof.

A twentieth embodiment, which is the wellbore treatment fluid of any one of the sixteenth through the nineteenth embodiments, wherein the treatment fluid is a water-based drilling fluid or a non-aqueous-based drilling fluid.

A twenty-first embodiment, which is the wellbore treatment fluid of any one of the sixteenth through the twentieth embodiments, wherein the treatment fluid is an invert emulsion drilling fluid comprising (i) a continuous phase comprising the composition comprising at least 75 mol % $C_6$ to $C_9$ monocarboxylic acid secondary $C_6$ to $C_{12}$ esters, (ii) a weighting material, and (iii) water.

A twenty-second embodiment, which is a method comprising introducing a wellbore treatment fluid to a wellbore, wherein the wellbore treatment fluid comprises a composition comprising at least 75 mol % $C_6$ to $C_9$ monocarboxylic acid secondary $C_6$ to $C_{12}$ esters, and wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof.

A twenty-third embodiment, which is the method of the twenty-second embodiment, wherein the composition comprises i) $C_6$ to $C_9$ monocarboxylic acid secondary $C_6$ esters comprising from 45 mol % to 75 mol % of a $C_6$ to $C_9$ monocarboxylic acid 2-hexyl ester and from 25 mol % to 55 mol % of a $C_6$ to $C_9$ monocarboxylic acid 3-hexyl ester; ii) $C_6$ to $C_9$ monocarboxylic acid secondary $C_8$ esters comprising (a) from 30 mol % to 60 mol % of a $C_6$ to $C_9$ monocarboxylic acid 2-octyl ester and (b) from 40 mol % to 70 mol % of a $C_6$ to $C_9$ monocarboxylic acid 3-octyl ester, and/or a $C_6$ to $C_9$ monocarboxylic acid 4-octyl ester; iii) $C_6$ to $C_9$ monocarboxylic acid secondary $C_{10}$ esters comprising (a) from 25 mol % to 55 mol % of a $C_6$ to $C_9$ monocarboxylic acid 2-decyl ester and (b) from 45 mol % to 75 mol % of a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester; iv) $C_6$ to $C_9$ monocarboxylic acid secondary $C_{12}$ esters comprising (a) from 20 mol % to 50 mol % of a $C_6$ to $C_9$ monocarboxylic acid 2-dodecyl ester and (b) from 50 mol % to 80 mol % of a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester; or combinations thereof.

A twenty-fourth embodiment, which is the method of any one of the twenty-second and the twenty-third embodiments, wherein the composition comprises i) a composition comprising at least 75 mol % heptanoic acid secondary hexyl esters, ii) a composition comprising at least 75 mol % heptanoic acid secondary octyl esters, iii) a composition comprising at least 75 mol % heptanoic acid secondary decyl esters, iv) a composition comprising at least 75 mol % heptanoic acid secondary dodecyl esters, or combinations thereof.

A twenty-fifth embodiment, which is the method of any one of the twenty-second through the twenty-fourth embodiments, wherein the composition is i) a composition comprising at least 80 mol % heptanoic acid secondary hexyl esters, less than 5 mol % heptanoic acid 1-hexyl ester, and less than or equal to 14 mol % $C_{12}$ olefins, and wherein the heptanoic acid secondary hexyl esters comprise from 45 mol % to 75 mol % of a heptanoic acid 2-hexyl ester, and from 25 mol % to 55 mol % of a heptanoic acid 3-hexyl ester; ii) a composition comprising at least 80 mol % heptanoic acid secondary octyl esters, less than 5 mol % heptanoic acid 1-octyl ester, and less than or equal to 14 mol % $C_{16}$ olefins, and wherein the heptanoic acid secondary octyl esters comprise from 30 mol % to 60 mol % of a heptanoic acid 2-octyl ester, from 20 mol % to 40 mol % of a heptanoic acid 3-octyl ester, and from 15 mol % to 30 mol % of a heptanoic acid 4-octyl ester; iii) a composition comprising at least 80 mol % heptanoic acid secondary decyl esters, less than 5 mol % heptanoic acid 1-decyl ester, and less than or equal to 14 mol % $C_{20}$ olefins, and wherein the heptanoic acid secondary decyl esters comprise from 25 mol % to 55 mol % of a heptanoic acid 2-decyl ester, from 15 mol % to 35 mol % of a heptanoic acid 3-decyl ester, from 10 mol % to 30 mol % of a $C_7$ to $C_9$ heptanoic acid 4-decyl ester, and from 5 mol % to 25 mol % of a heptanoic acid 5-decyl ester; iv) a composition comprising at least 80 mol % heptanoic acid secondary dodecyl esters, less than 5 mol % heptanoic acid 1-dodecyl ester, and less than or equal to 14 mol % $C_{24}$ olefins, and wherein the heptanoic acid secondary dodecyl esters comprise from 20 mol % to 50 mol % of a heptanoic acid 2-dodecyl ester, from 10 mol % to 30 mol % of a heptanoic acid 3-dodecyl ester, from 5 mol % to 25 mol % of a heptanoic acid 4-dodecyl ester, from 5 mol % to 25 mol % of a heptanoic acid 5-dodecyl ester, and from 5 mol % to 25 mol % of a heptanoic acid 6-dodecyl ester; or combinations thereof.

A twenty-sixth embodiment, which is the method of any one of the twenty-second through the twenty-fifth embodiments, wherein the treatment fluid is a water-based drilling fluid or a non-aqueous-based drilling fluid.

A twenty-seventh embodiment, which is the method of any one of the twenty-second through the twenty-sixth embodiments, wherein the treatment fluid is an invert emulsion drilling fluid comprising (i) a continuous phase comprising the composition comprising at least 75 mol % $C_6$ to $C_9$ monocarboxylic acid secondary $C_6$ to $C_{12}$ esters, (ii) a weighting material, and (iii) water.

A twenty-eighth embodiment, which is a process for preparing a wellbore treatment fluid comprising (a) contacting i) a carboxylic acid feedstock comprising a $C_6$ to $C_9$ monocarboxylic acid, ii) an olefin feedstock comprising $C_6$ to $C_{12}$ monoolefins, and iii) a solid acid catalyst, to form, in the substantial absence of water, a composition comprising at least 75 mol % $C_6$ to $C_9$ monocarboxylic acid secondary $C_6$ to $C_{12}$ esters, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof; and (b) using the composition comprising at least 75 mol % $C_6$ to $C_9$ monocarboxylic acid secondary $C_6$ to $C_{12}$ esters to prepare the wellbore treatment fluid.

A twenty-ninth embodiment, which is the process of the twenty-eighth embodiment, wherein the wellbore treatment fluid is formed by contacting the composition comprising at least 75 mol % $C_6$ to $C_9$ monocarboxylic acid secondary $C_6$ to $C_{12}$ esters with a weighting material and water.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A composition comprising at least 75 mol % $C_6$ to $C_9$ monocarboxylic acid secondary $C_6$ to $C_{12}$ esters, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof.

2. The composition of claim 1, wherein the $C_6$ to $C_9$ monocarboxylic acid secondary $C_6$ to $C_{12}$ esters further comprise at least 10 mol % of a $C_6$ to $C_9$ monocarboxylic acid 3-hexyl ester, a $C_6$ to $C_9$ monocarboxylic acid 3-heptyl ester, a $C_6$ to $C_9$ monocarboxylic acid 3-octyl ester, a $C_6$ to $C_9$ monocarboxylic acid 3-nonyl ester, a $C_6$ to $C_9$ monocarboxylic acid 3-decyl ester, a $C_6$ to $C_9$ monocarboxylic acid 3-undecyl ester, a $C_6$ to $C_9$ monocarboxylic acid 3-dodecyl ester, or combinations thereof.

3. The composition of claim 1, wherein the composition comprises from 1 mol % to 14 mol % $C_{12}$ to $C_{24}$ olefins.

4. The composition of claim 1, wherein the composition comprises less than 5 mol % of a $C_6$ to $C_9$ monocarboxylic acid primary $C_6$ to $C_{12}$ ester.

5. The composition of claim 1, wherein the $C_6$ to $C_9$ monocarboxylic acid secondary $C_6$ to $C_{12}$ esters are $C_6$ to $C_9$ monocarboxylic acid secondary $C_6$ esters, $C_6$ to $C_9$ monocarboxylic acid secondary $C_8$ esters, $C_6$ to $C_9$ monocarboxylic acid secondary $C_{10}$ esters, $C_6$ to $C_9$ monocarboxylic acid secondary $C_{12}$ esters, or combinations thereof.

6. The composition of claim 5, wherein i) the $C_6$ to $C_9$ monocarboxylic acid secondary $C_6$ esters comprise from 45 mol % to 75 mol % of a $C_6$ to $C_9$ monocarboxylic acid 2-hexyl ester and from 25 mol % to 55 mol % of a $C_6$ to $C_9$ monocarboxylic acid 3-hexyl ester; ii) the $C_6$ to $C_9$ monocarboxylic acid secondary $C_8$ esters comprise (a) from 30 mol % to 60 mol % of a $C_6$ to $C_9$ monocarboxylic acid 2-octyl ester and (b) from 40 mol % to 70 mol % of a $C_6$ to $C_9$ monocarboxylic acid 3-octyl ester and/or a $C_6$ to $C_9$ monocarboxylic acid 4-octyl ester; iii) the $C_6$ to $C_9$ monocarboxylic acid secondary $C_{10}$ esters comprise (a) from 25 mol % to 55 mol % of a $C_6$ to $C_9$ monocarboxylic acid 2-decyl ester and (b) from 45 mol % to 75 mol % of a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester; and iv) the $C_6$ to $C_9$ monocarboxylic acid secondary $C_{12}$ esters comprise (a) from 20 mol % to 50 mol % of a $C_6$ to $C_9$ monocarboxylic acid 2-dodecyl ester and (b) from 50 mol % to 80 mol % of a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester.

7. The composition of claim 1, wherein the composition comprises i) at least 80 mol % heptanoic acid secondary hexyl esters, less than 5 mol % heptanoic acid 1-hexyl ester, and less than or equal to 14 mol % $C_{12}$ olefins, and wherein the heptanoic acid secondary hexyl esters comprise from 45 mol % to 75 mol % of a heptanoic acid 2-hexyl ester, and from 25 mol % to 55 mol % of a heptanoic acid 3-hexyl ester; ii) at least 80 mol % heptanoic acid secondary octyl esters, less than 5 mol % heptanoic acid 1-octyl ester, and less than or equal to 14 mol % $C_{16}$ olefins, and wherein the heptanoic acid secondary octyl esters comprise from 30 mol % to 60 mol % of a heptanoic acid 2-octyl ester, from 20 mol % to 40 mol % of a heptanoic acid 3-octyl ester, and from 15 mol % to 30 mol % of a heptanoic acid 4-octyl ester; iii) at least 80 mol % heptanoic acid secondary decyl esters, less than 5 mol % heptanoic acid 1-decyl ester, and less than or equal to 14 mol % $C_{20}$ olefins, and wherein the heptanoic acid secondary decyl esters comprise from 25 mol % to 55 mol % of a heptanoic acid 2-decyl ester, from 15 mol % to 35 mol % of a heptanoic acid 3-decyl ester, from 10 mol % to 30 mol % of a heptanoic acid 4-decyl ester, and from 5 mol % to 25 mol % of a heptanoic acid 5-decyl ester; or iv) at least 80 mol % heptanoic acid secondary dodecyl esters, less than 5 mol % heptanoic acid 1-dodecyl ester, and less than or equal to 14 mol % $C_{24}$ olefins, and wherein the heptanoic acid secondary dodecyl esters comprise from 20 mol % to 50 mol % of a heptanoic acid 2-dodecyl ester, from 10 mol % to 30 mol % of a heptanoic acid 3-dodecyl ester, from 5 mol % to 25 mol % of a heptanoic acid 4-dodecyl ester, from 5 mol % to 25 mol % of a heptanoic acid 5-dodecyl ester, and from 5 mol % to 25 mol % of a heptanoic acid 6-dodecyl ester.

8. The composition claim 1 having a $LC_{50}$ sediment toxicological ratio less than 0.8 when tested in accordance with ASTM E1367-92.

9. A process comprising:
a) contacting i) a carboxylic acid feedstock comprising a $C_6$ to $C_9$ monocarboxylic acid, ii) an olefin feedstock comprising $C_6$ to $C_{12}$ monoolefins, and iii) a solid acid catalyst;
b) forming, in the substantial absence of water, a mixture comprising $C_6$ to $C_9$ monocarboxylic acid secondary $C_6$ to $C_{12}$ esters; and
c) isolating a composition comprising at least 75 mol % $C_6$ to $C_9$ monocarboxylic acid secondary $C_6$ to $C_{12}$ esters from the mixture, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof.

10. The process of claim 9, wherein the carboxylic acid feedstock comprises at least 80 mol % of n-hexanoic acid, n-heptanoic acid, n-octanoic acid, n-nonanoic acid, or combinations thereof; and wherein the $C_6$ to $C_{12}$ monoolefins comprise at least 80 mol % of a linear $C_6$ to $C_{12}$ monoolefin.

11. The process of claim 9, wherein the $C_6$ to $C_9$ monocarboxylic acid is prepared by hydroformylation of a linear $C_5$ to $C_8$ monoolefin.

12. The process of claim 9, wherein the solid acid catalyst comprises a tetrafluoroethylene polymer resin modified with perfluorovinyl ether groups terminated with sulfonate groups; a macroreticular, sulfonated, crosslinked copolymer of styrene and divinyl benzene; an acid washed clay; or combinations thereof.

13. The process of claim 9, wherein the mixture comprises $C_{12}$ to $C_{24}$ olefins, and a $C_6$ to $C_9$ monocarboxylic acid primary $C_6$ to $C_{12}$ ester.

14. The process of claim 9, wherein the isolated composition comprises i) $C_6$ to $C_9$ monocarboxylic acid secondary $C_6$ esters comprising from 45 mol % to 75 mol % of a $C_6$ to $C_9$ monocarboxylic acid 2-hexyl ester and from 25 mol % to 55 mol % of a $C_6$ to $C_9$ monocarboxylic acid 3-hexyl ester; ii) $C_6$ to $C_9$ monocarboxylic acid secondary $C_8$ esters comprising (a) from 30 mol % to 60 mol % of a $C_6$ to $C_9$ monocarboxylic acid 2-octyl ester and (b) from 40 mol % to 70 mol % of a $C_6$ to $C_9$ monocarboxylic acid 3-octyl ester and/or a $C_6$ to $C_9$ monocarboxylic acid 4-octyl ester; iii) $C_6$ to $C_9$ monocarboxylic acid secondary $C_{10}$ esters comprising (a) from 25 mol % to 55 mol % of a $C_6$ to $C_9$ monocarboxylic acid 2-decyl ester and (b) from 45 mol % to 75 mol % of a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester; iv) $C_6$ to $C_9$ monocarboxylic acid secondary $C_{12}$ esters comprising (a) from 20 mol % to 50 mol % of a $C_6$ to $C_9$ monocarboxylic acid 2-dodecyl ester and (b) from 50 mol % to 80 mol % of a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester; or combinations thereof.

15. The process of claim 9, wherein the isolated composition comprises i) at least 80 mol % heptanoic acid secondary hexyl esters, less than 5 mol % heptanoic acid 1-hexyl ester, and less than or equal to 14 mol % $C_{12}$ olefins, and wherein the heptanoic acid secondary hexyl esters comprise from 45 mol % to 75 mol % of a heptanoic acid 2-hexyl ester, and from 25 mol % to 55 mol % of a heptanoic acid 3-hexyl ester; ii) at least 80 mol % heptanoic acid secondary octyl esters, less than 5 mol % heptanoic acid 1-octyl ester, and less than or equal to 14 mol % $C_{16}$ olefins, and wherein the heptanoic acid secondary octyl esters comprise from 30 mol % to 60 mol % of a heptanoic acid 2-octyl ester, from 20 mol % to 40 mol % of a heptanoic acid 3-octyl ester, and from 15 mol % to 30 mol % of a heptanoic acid 4-octyl ester; iii) at least 80 mol % heptanoic acid secondary decyl esters, less than 5 mol % heptanoic acid 1-decyl ester, and less than or equal to 14 mol % $C_{20}$ olefins, and wherein the heptanoic acid secondary decyl esters comprise from 25 mol % to 55 mol % of a heptanoic acid 2-decyl ester, from 15 mol % to 35 mol % of a heptanoic acid 3-decyl ester, from 10 mol % to 30 mol % of a heptanoic acid 4-decyl ester, and from 5 mol % to 25 mol % of a heptanoic acid 5-decyl ester; or iv) at least 80 mol % heptanoic acid secondary dodecyl esters, less than 5 mol % heptanoic acid 1-dodecyl ester, and less than or equal to 14 mol % $C_{24}$ olefins, and wherein the heptanoic acid secondary dodecyl esters comprise from 20 mol % to 50 mol % of a heptanoic acid 2-dodecyl ester, from 10 mol % to 30 mol % of a heptanoic acid 3-dodecyl ester, from 5 mol % to 25 mol % of a heptanoic acid 4-dodecyl ester, from 5 mol % to 25 mol % of a heptanoic acid 5-dodecyl ester, and from 5 mol % to 25 mol % of a heptanoic acid 6-dodecyl ester.

16. A wellbore treatment fluid comprising a composition comprising at least 75 mol % $C_6$ to $C_9$ monocarboxylic acid secondary $C_6$ to $C_{12}$ esters, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof.

17. The wellbore treatment fluid of claim 16, wherein the composition comprises i) $C_6$ to $C_9$ monocarboxylic acid secondary $C_6$ esters comprising from 45 mol % to 75 mol % of a $C_6$ to $C_9$ monocarboxylic acid 2-hexyl ester and from 25 mol % to 55 mol % of a $C_6$ to $C_9$ monocarboxylic acid 3-hexyl ester; ii) $C_6$ to $C_9$ monocarboxylic acid secondary $C_8$ esters comprising (a) from 30 mol % to 60 mol % of a $C_6$ to $C_9$ monocarboxylic acid 2-octyl ester and (b) from 40 mol % to 70 mol % of a $C_6$ to $C_9$ monocarboxylic acid 3-octyl ester and/or a $C_6$ to $C_9$ monocarboxylic acid 4-octyl ester; iii) $C_6$ to $C_9$ monocarboxylic acid secondary $C_{10}$ esters comprising (a) from 25 mol % to 55 mol % of a $C_6$ to $C_9$ monocarboxylic acid 2-decyl ester and (b) from 45 mol % to 75 mol % of a $C_6$ to $C_9$ monocarboxylic acid 3-decyl ester, a $C_6$ to $C_9$ monocarboxylic acid 4-decyl ester, and/or a $C_6$ to $C_9$ monocarboxylic acid 5-decyl ester; iv) $C_6$ to $C_9$ monocarboxylic acid secondary $C_{12}$ esters comprising (a) from 20 mol % to 50 mol % of a $C_6$ to $C_9$ monocarboxylic acid 2-dodecyl ester and (b) from 50 mol % to 80 mol % of a $C_6$ to $C_9$ monocarboxylic acid 3-dodecyl ester, a $C_6$ to $C_9$ monocarboxylic acid 4-dodecyl ester, a $C_6$ to $C_9$ monocarboxylic acid 5-dodecyl ester, and/or a $C_6$ to $C_9$ monocarboxylic acid 6-dodecyl ester; or combinations thereof.

18. The wellbore treatment fluid of claim 16, wherein the composition comprises i) a composition comprising at least 75 mol % heptanoic acid secondary hexyl esters, ii) a composition comprising at least 75 mol % heptanoic acid secondary octyl esters, iii) a composition comprising at least 75 mol % heptanoic acid secondary decyl esters, iv) a composition comprising at least 75 mol % heptanoic acid secondary dodecyl esters, or combinations thereof.

19. The wellbore treatment fluid of claim 16, wherein the composition is i) a composition comprising at least 80 mol % heptanoic acid secondary hexyl esters, less than 5 mol % heptanoic acid 1-hexyl ester, and less than or equal to 14 mol % $C_{12}$ olefins, and wherein the heptanoic acid secondary hexyl esters comprise from 45 mol % to 75 mol % of a heptanoic acid 2-hexyl ester, and from 25 mol % to 55 mol % of a heptanoic acid 3-hexyl ester; ii) a composition comprising at least 80 mol % heptanoic acid secondary octyl esters, less than 5 mol % heptanoic acid 1-octyl ester, and less than or equal to 14 mol % $C_{16}$ olefins, and wherein the heptanoic acid secondary octyl esters comprise from 30 mol % to 60 mol % of a heptanoic acid 2-octyl ester, from 20 mol % to 40 mol % of a heptanoic acid 3-octyl ester, and from 15 mol % to 30 mol % of a heptanoic acid 4-octyl ester; iii) a composition comprising at least 80 mol % heptanoic acid secondary decyl esters, less than 5 mol % heptanoic acid 1-decyl ester, and less than or equal to 14 mol % $C_{20}$ olefins, and wherein the heptanoic acid secondary decyl esters comprise from 25 mol % to 55 mol % of a heptanoic acid 2-decyl ester, from 15 mol % to 35 mol % of a heptanoic acid 3-decyl ester, from 10 mol % to 30 mol % of a $C_7$ to $C_9$ heptanoic acid 4-decyl ester, and from 5 mol % to 25 mol % of a heptanoic acid 5-decyl ester; iv) a composition comprising at least 80 mol % heptanoic acid secondary dodecyl esters, less than 5 mol % heptanoic acid 1-dodecyl ester, and less than or equal to 14 mol % $C_{24}$ olefins, and wherein the heptanoic acid secondary dodecyl esters comprise from 20 mol % to 50 mol % of a heptanoic acid 2-dodecyl ester, from 10 mol % to 30 mol % of a heptanoic acid 3-dodecyl ester, from 5 mol % to 25 mol % of a heptanoic acid 4-dodecyl ester, from 5 mol % to 25 mol % of a heptanoic acid 5-dodecyl ester, and from 5 mol % to 25 mol % of a heptanoic acid 6-dodecyl ester; or combinations thereof.

20. The wellbore treatment fluid of claim 16, wherein the treatment fluid is a water-based drilling fluid or a non-aqueous-based drilling fluid.

21. The wellbore treatment fluid of claim 16, wherein the treatment fluid is an invert emulsion drilling fluid comprising (i) a continuous phase comprising the composition comprising at least 75 mol % $C_6$ to $C_9$ monocarboxylic acid secondary $C_6$ to $C_{12}$ esters, (ii) a weighting material, and (iii) water.

22. A process for preparing a wellbore treatment fluid comprising:
   a) contacting i) a carboxylic acid feedstock comprising a $C_6$ to $C_9$ monocarboxylic acid, ii) an olefin feedstock comprising $C_6$ to $C_{12}$ monoolefins, and iii) a solid acid catalyst, to form, in the substantial absence of water, a composition comprising at least 75 mol % $C_6$ to $C_9$ monocarboxylic acid secondary $C_6$ to $C_{12}$ esters, wherein the $C_6$ to $C_9$ monocarboxylic acid secondary $C_6$ to $C_{12}$ esters comprise at least 20 mol % of a $C_6$ to $C_9$ monocarboxylic acid 2-hexyl ester, a $C_6$ to $C_9$ monocarboxylic acid 2-heptyl ester, a $C_6$ to $C_9$ monocarboxylic acid 2-octyl ester, a $C_6$ to $C_9$ monocarboxylic acid 2-nonyl ester, a $C_6$ to $C_9$ monocarboxylic acid 2-decyl ester, a $C_6$ to $C_9$ monocarboxylic acid 2-undecyl ester, a $C_6$ to $C_9$ monocarboxylic acid 2-dodecyl ester, or combinations thereof; and
   b) using the composition comprising at least 75 mol % $C_6$ to $C_9$ monocarboxylic acid secondary $C_6$ to $C_{12}$ esters to prepare the wellbore treatment fluid.

23. The process of claim 22, wherein the wellbore treatment fluid is formed by contacting the composition comprising at least 75 mol % $C_6$ to $C_9$ monocarboxylic acid secondary $C_6$ to $C_{12}$ esters with a weighting material and water.

* * * * *